US011739711B2

(12) United States Patent
VandeVoorde et al.

(10) Patent No.: US 11,739,711 B2
(45) Date of Patent: Aug. 29, 2023

(54) ENERGY CONVERSION APPARATUS

(71) Applicant: Hyliion Holdings Corp., Cedar Park, TX (US)

(72) Inventors: Kevin Michael VandeVoorde, Cincinnati, OH (US); Joshua Tyler Mook, Cincinnati, OH (US); Michael Thomas Gansler, Mason, OH (US); Scott Douglas Waun, Loveland, OH (US); Aigbedion Akwara, Cincinnati, OH (US); Michael Robert Notarnicola, Cincinnati, OH (US); Jason Joseph Bellardi, Fairfield, OH (US); Mohammed El Hacin Sennoun, West Chester, OH (US); Mary Kathryn Thompson, Fairfield Township, OH (US); Mohamed Osama, Garching (DE); Victor Luis Marrero Ortiz, Cincinnati, OH (US)

(73) Assignee: Hyliion Holdings Corp., Cedar Park, TX (US)

( * ) Notice: Subject to any disclaimer, the term of this patent is extended or adjusted under 35 U.S.C. 154(b) by 0 days.

(21) Appl. No.: 17/503,494

(22) Filed: Oct. 18, 2021

(65) Prior Publication Data
US 2022/0034281 A1 Feb. 3, 2022

Related U.S. Application Data

(63) Continuation of application No. 16/878,858, filed on May 20, 2020, now Pat. No. 11,174,814.
(Continued)

(51) Int. Cl.
*F02G 1/055* (2006.01)
*F02G 1/04* (2006.01)
(Continued)

(52) U.S. Cl.
CPC .............. *F02G 1/055* (2013.01); *B33Y 80/00* (2014.12); *F02G 1/04* (2013.01); *F02G 1/043* (2013.01);
(Continued)

(58) Field of Classification Search
CPC . F02G 1/055; F02G 1/04; F02G 1/044; F02G 1/05; F02G 1/053; F02G 1/057;
(Continued)

(56) References Cited

U.S. PATENT DOCUMENTS 3,015,475 A 1/1962 Meijer et al.
3,027,717 A 4/1962 Conklin et al.
(Continued)

FOREIGN PATENT DOCUMENTS

DE 3444995 A1 6/1985
DE 3629443 A1 7/1987
(Continued)

OTHER PUBLICATIONS

Machine translation of JP 07279758 A. Dated Oct. 1995. Ishino.*
(Continued)

*Primary Examiner* — Mickey H France
(74) *Attorney, Agent, or Firm* — Dority & Manning, P.A.

(57) ABSTRACT

An engine body may include a piston body comprising a piston chamber and a regenerator body comprising a regenerator conduit. An engine body may include a working-fluid heat exchanger body comprising a plurality of working-fluid pathways fluidly communicating between the piston chamber and the regenerator conduit. Additionally, or alternatively, an engine body may include a heater body comprising a plurality of heating fluid pathways and the plurality of working-fluid pathways. The heating fluid pathways may have a heat transfer relationship with the working fluid pathways. The working-fluid pathways may fluidly commu-
(Continued)

nicate between the piston chamber and the regenerator conduit. The engine body may include a monolithic body defined at least in part by the piston body, the regenerator body, and the working-fluid heat exchanger body, and/or defined at least in part by the piston body, the regenerator body, and the heater body.

20 Claims, 26 Drawing Sheets

Related U.S. Application Data

(60) Provisional application No. 62/850,623, filed on May 21, 2019, provisional application No. 62/850,701, filed on May 21, 2019, provisional application No. 62/850,678, filed on May 21, 2019, provisional application No. 62/850,599, filed on May 21, 2019, provisional application No. 62/850,692, filed on May 21, 2019.

(51) Int. Cl.

| | |
|---|---|
| *F28D 9/04* | (2006.01) |
| *F28F 7/02* | (2006.01) |
| *F28F 13/00* | (2006.01) |
| *F28F 13/14* | (2006.01) |
| *F02G 1/053* | (2006.01) |
| *F02G 1/057* | (2006.01) |
| *F02G 1/047* | (2006.01) |
| *F02G 1/05* | (2006.01) |
| *F02G 1/044* | (2006.01) |
| *B33Y 80/00* | (2015.01) |
| *F23R 3/00* | (2006.01) |
| *F02G 3/00* | (2006.01) |
| *F02G 1/043* | (2006.01) |
| *F28D 21/00* | (2006.01) |

(52) U.S. Cl.
CPC ............ *F02G 1/044* (2013.01); *F02G 1/047* (2013.01); *F02G 1/05* (2013.01); *F02G 1/053* (2013.01); *F02G 1/057* (2013.01); *F02G 3/00* (2013.01); *F23R 3/005* (2013.01); *F28D 9/04* (2013.01); *F28F 7/02* (2013.01); *F28F 13/003* (2013.01); *F28F 13/14* (2013.01); *F02G 1/0435* (2013.01); *F02G 2243/00* (2013.01); *F02G 2244/00* (2013.01); *F02G 2244/08* (2013.01); *F02G 2244/50* (2013.01); *F02G 2244/52* (2013.01); *F02G 2250/00* (2013.01); *F02G 2254/10* (2013.01); *F02G 2254/18* (2013.01); *F02G 2257/00* (2013.01); *F02G 2258/10* (2013.01); *F02G 2270/80* (2013.01); *F02G 2280/10* (2013.01); *F28D 2021/0026* (2013.01); *F28F 2210/10* (2013.01); *F28F 2250/04* (2013.01)

(58) Field of Classification Search
CPC .......... F02G 3/00; F02G 1/0435; F02G 1/047; F02G 2243/00; F02G 2244/00; F02G 2244/08; F02G 2244/50; F02G 2244/52; F02G 2250/00; F02G 2254/10; F02G 2254/18; F02G 2257/00; F02G 2258/10; F02G 2270/80; F02G 2280/10; B33Y 80/00; F23R 3/005; F28D 9/04; F28D 2021/0026; F28F 7/02; F28F 13/003; F28F 13/14; F28F 2210/10; F28F 2250/04

See application file for complete search history.

(56) References Cited

U.S. PATENT DOCUMENTS

| | | |
|---|---|---|
| 3,296,808 A | 1/1967 | Malik |
| 3,456,438 A | 7/1969 | Meijer et al. |
| 3,552,120 A | 1/1971 | Beale |
| 3,777,718 A | 12/1973 | Pattas |
| 3,782,457 A | 1/1974 | Troy |
| 4,026,114 A | 5/1977 | Belaire |
| 4,030,297 A | 6/1977 | Kantz et al. |
| 4,077,216 A | 3/1978 | Cooke-Yarborough |
| 4,102,632 A | 7/1978 | Hastings |
| 4,183,214 A | 1/1980 | Beale et al. |
| 4,199,945 A | 4/1980 | Finkelstein |
| 4,277,942 A | 7/1981 | Egnell et al. |
| 4,345,426 A | 8/1982 | Egnell et al. |
| 4,387,568 A | 6/1983 | Dineen |
| 4,392,350 A * | 7/1983 | Marks ............... F01B 9/04 74/53 |
| 4,395,880 A * | 8/1983 | Berchowitz ........... F02G 1/044 74/401 |
| 4,522,030 A * | 6/1985 | Corey ................ F02G 1/053 60/517 |
| 4,545,738 A | 10/1985 | Young |
| 4,611,655 A | 9/1986 | Molignoni |
| 4,625,514 A * | 12/1986 | Tanaka ............... F02G 1/055 60/517 |
| 4,633,667 A * | 1/1987 | Watanabe ............ F02G 1/055 60/517 |
| 4,644,851 A | 2/1987 | Young |
| 4,662,176 A * | 5/1987 | Fujiwara ............ F02G 1/053 60/517 |
| 4,717,405 A | 1/1988 | Budliger |
| 4,723,411 A | 2/1988 | Darooka et al. |
| 4,883,117 A | 11/1989 | Dobbs et al. |
| 5,003,778 A * | 4/1991 | Erber ................. F02G 1/055 431/247 |
| 5,005,349 A | 4/1991 | Momose et al. |
| 5,088,284 A * | 2/1992 | Momose ............. F04B 35/00 60/517 |
| 5,172,784 A | 12/1992 | Varela, Jr. |
| 5,294,410 A | 3/1994 | White |
| 5,429,177 A | 7/1995 | Yaron et al. |
| 5,675,974 A | 10/1997 | Heikrodt et al. |
| 5,755,100 A * | 5/1998 | Lamos ............... F02G 1/043 60/524 |
| 6,283,712 B1 | 9/2001 | Dziech et al. |
| 6,293,101 B1 | 9/2001 | Conrad |
| 6,390,185 B1 | 5/2002 | Proeschel |
| 6,656,409 B1 | 12/2003 | Keicher et al. |
| 7,134,279 B2 | 11/2006 | White et al. |
| 7,171,811 B1 | 2/2007 | Berchowitz et al. |
| 8,359,744 B2 | 1/2013 | Hislop et al. |
| 8,720,198 B2 | 5/2014 | Wood |
| 8,721,981 B2 | 5/2014 | Freund et al. |
| 8,820,068 B2 | 9/2014 | Dadd |
| 9,689,344 B1 | 6/2017 | Gedeon |
| 9,992,917 B2 | 6/2018 | Yanke et al. |
| 2003/0121259 A1* | 7/2003 | Conrad ............... F02G 1/0445 60/508 |
| 2003/0163990 A1 | 9/2003 | Maceda et al. |
| 2003/0230440 A1 | 12/2003 | Kamen et al. |
| 2004/0079087 A1 | 4/2004 | Chandran et al. |
| 2005/0183419 A1* | 8/2005 | LaRocque ............ F02G 1/055 60/520 |
| 2005/0250062 A1 | 11/2005 | Kombluth et al. |
| 2005/0268606 A1 | 12/2005 | Wood |
| 2006/0179833 A1 | 8/2006 | Qiu et al. |
| 2006/0179835 A1 | 8/2006 | Qiu et al. |
| 2008/0122408 A1 | 5/2008 | Keiter et al. |
| 2009/0025388 A1 | 1/2009 | Silver et al. |
| 2011/0226284 A1 | 9/2011 | Taylor et al. |
| 2011/0302902 A1 | 12/2011 | Kelly et al. |
| 2012/0260668 A1 | 10/2012 | Rogers et al. |
| 2013/0042607 A1 | 2/2013 | Berchowitz |
| 2013/0233526 A1 | 9/2013 | Hislop |

(56) References Cited

U.S. PATENT DOCUMENTS

| | | | | |
|---|---|---|---|---|
| 2014/0000235 | A1* | 1/2014 | Kamen | F28F 1/42 |
| | | | | 60/39.6 |
| 2015/0023778 | A1 | 1/2015 | Berg et al. | |
| 2017/0010046 | A1 | 1/2017 | Hofbauer | |
| 2017/0030651 | A1 | 2/2017 | Rock, Jr. et al. | |
| 2017/0059163 | A1 | 3/2017 | Ott et al. | |
| 2017/0122258 | A1 | 5/2017 | Bellomi et al. | |
| 2017/0133244 | A1 | 5/2017 | Knayzikk et al. | |
| 2017/0234543 | A1 | 8/2017 | Plante et al. | |
| 2017/0276358 | A1 | 9/2017 | Berry et al. | |
| 2018/0231254 | A1 | 8/2018 | Maurer et al. | |
| 2018/0274780 | A1 | 9/2018 | Kim et al. | |
| 2018/0281064 | A1 | 10/2018 | Takahashi et al. | |
| 2018/0283319 | A1* | 10/2018 | Yates | F02G 1/055 |
| 2019/0063842 | A1 | 2/2019 | Lopes | |

FOREIGN PATENT DOCUMENTS

| | | | | |
|---|---|---|---|---|
| EP | 1091089 | A3 | 12/2003 | |
| EP | 3301287 | A1 | 4/2018 | |
| JP | H01240757 | A | 9/1989 | |
| JP | H05264181 | A | 10/1993 | |
| JP | H06308825 | A | 11/1994 | |
| JP | 07279758 | A | * 10/1995 | F02G 1/043 |
| JP | H07279757 | A | 10/1995 | |
| JP | H08105353 | A | 4/1996 | |
| JP | 2590364 | B2 | 3/1997 | |
| JP | 2006/138591 | A | 6/2006 | |
| WO | WO92/18346 | A1 | 10/1992 | |
| WO | WO02/057612 | A1 | 7/2002 | |
| WO | WO2006/008540 | A1 | 1/2006 | |
| WO | WO2006/023872 | A2 | 3/2006 | |
| WO | WO2009/099343 | A1 | 8/2009 | |
| WO | WO2011/003038 | A2 | 1/2011 | |
| WO | WO2012/066311 | A2 | 5/2012 | |
| WO | WO2018/023142 | A1 | 2/2018 | |

OTHER PUBLICATIONS

Adamski, Ventilation Systems with Longitudinal Counterfow Spiral Recuperators, Department of Heat Engineering, AIVC.org, Technical University, Bialystok, Poland, 6 Pages. https://www.aivc.org/sites/default/files/members_area/medias/pdf/Conf/2004/2004015_Adamski.pdf.

Adamski, Heat Transfer Correlations and NTU Number for the Longitudinal Flow Spiral Recuperators, Applied Thermal Engineering, ScienceDirect, vol. 29, Issues 2-3, Feb. 2009, pp. 591-596. (Abstract Only) https://www.sciencedirect.com/science/article/pii/S1359431108001634.

Adamski, Ventilation System with Spiral Recuperator, Energy and Buildings, ScienceDirect, vol. 42, Issue 5, May 2010, pp. 674-677. (Abstract Only) https://www.sciencedirect.com/science/article/pii/S0378778809002898.

American Stirling Company, Regenerators, 10 Pages. https://www.stirlingengine.com/regenerators/.

Antoine et al., The ACTE Spiral Recuperator for Gas Turbine Engines, GT2002-30405, ASME Turbo Expo 2002: Power for Land, Sea, and Air, Conference International Gas Turbine Institute Jun. 3-6, 2002, vol. 1, pp. 1025-1031. (Abstract Only) https://proceedings.asmedigitalcollection.asme.org/proceeding.aspx?articleid=1574940.

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Bright Hub Engineering, Oil Piston Cooling, Oct. 19, 2009, 6 Pages. https://www.brighthubengineering.com/marine-engines-machinery/52783-how-are-marine-pistons-cooled-with-oil/.

Cai et al., An optimal design approach for the annular involute-profile cross wavy primary surface recuperator in microturbine and an application case study, Energy, Science Direct, vol. 153, Issue 15, Jun. 2018, pp. 80-89. (Abstract Only) https://www.sciencedirect.com/science/article/abs/pii/S0360544218306066.

Conner, 3D Printed Stirling Engine, Solar Heat Engines, Simulate, Analyze, Design, Build, and Test Solar-Powered Engines, Oct. 29, 2012, 12 Pages. http://www.solarheatengines.com/2012/10/29/3d-printed-stirling-engine/.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarheatengines.com/2012/12/18/a-regenerator-for-the-3d-printed-pe-2-stirling-engine/.

Cordova et al., High Effectiveness, Low Pressure Drop Recuperator for High Speed and Power Oil-Free Turbogenerator, GT2015-43718, ASME Turbo Expo 2015 Turbine Technical Conference and Exposition Jun. 15-19, 2015, vol. 8 Microturbines, Turbochargers and Small Turbomachines; Steam Turbines, Canada, 10 pages. (Abstract Only) https://proceedings.asmedigitalcollection.asme.org/proceeding.aspx?articleid=2428685.

Deetlefs, Design, Simulation, Manufacture and Testing of a Free-Piston Stirling Engine, Thesis, Department of Mechatronic Engineering Stellenbosch University, Scholar Sun, South Africa, Dec. 2014, 138 Pages. https://scholar.sun.ac.za/bitstream/handle/10019.1/95922/deetlefs_design_2014.pdf?sequence=3&isAllowed=y.

Defense Visual Information Distributed Service (DVIDS), Mod II Automotive Stirling Engine, NASA 01986-3704, Washington, DC, 2 Pages. https://www.dvidshub.net/image/853653/modi-ii-automotive-stirling-engine.

Defense Visual Information Distributed Service (DVIDS), Mod II Automotive Stirling Engine, NASA C-1986-3705, Washington, DC, 2 Pages. https://www.dvidshub.net/image/750295/modi-ii-automotive-stirling-engine.

Defense Visual Information Distributed Service (DVIDS), Mod II Automotive Stirling Engine, NASA C-1986-3706, Washington, DC, 2 pages. https://www.dvidshub.net/image/844058/modi-ii-automotive-stirling-engine.

Defense Visual Information Distributed Service (DVIDS), Mod II Automotive Stirling Engine, NASA C-1986-3707, Washington, DC, 2 pages. https://www.dvidshub.net/image/835929/modi-ii-automotive-stirling-engine.

Defense Visual Information Distributed Service (DVIDS), Mod II Automotive Stirling Engine, NASA C-1986-3708, Washington, DC, 2 pages. https://www.dvidshub.net/image/836353/modi-ii-automotive-stirling-engine.

Defense Visual Information Distributed Service (DVIDS), Mod II Automotive Stirling Engine, NASA C-1986-3709, Washington, DC, 2 pages https://www.dvidshub.net/image/831862/modi-ii-automotive-stirling-engine.

Defense Visual Information Distributed Service (DVIDS), Mod II Automotive Stirling Engine, NASA C-1986-3710, Washington, DC, 2 pages https://www.dvidshub.net/image/758633/modi-ii-automotive-stirling-engine.

Defense Visual Information Distributed Service (DVIDS), Mod II Automotive Stirling Engine, NASA C-1986-3711, Washington, DC, 2 pages https://www.dvidshub.net/image/755174/modi-ii-automotive-stirling-engine.

Defense Visual Information Distributed Service (DVIDS), Mod II Automotive Stirling Engine, NASA C-1986-3712, Washington, DC, 2 pages https://www.dvidshub.net/image/832968/modi-ii-automotive-stirling-engine.

Defense Visual Information Distributed Service (DVIDS), Mod II Automotive Stirling Engine, NASA C-1986-3713, Washington, DC, 2 pages https://www.dvidshub.net/image/838183/modi-ii-automotive-stirling-engine.

Defense Visual Information Distributed Service (DVIDS), Mod II Automotive Stirling Engine, NASA C-1986-3714, Washington, DC, 2 pages https://www.dvidshub.net/image/752721/modi-ii-automotive-stirling-engine Defense Visual Information Distributed Service (DVIDS), Mod II Automotive Stirling Engine, NASA C-1986-3715, Washington, DC, 2 pages https://www.dvidshub.net/image/853040/modi-ii-automotive-stirling-engine.

(56) References Cited

OTHER PUBLICATIONS

Defense Visual Information Distributed Service (DVIDS), Mod II Automotive Stirling Engine, NASA C-1986-3716, Washington, DC, 2 pages https://www.dvidshub.net/image/754701/modi-ii-automotive-stirling-engine.
Defense Visual Information Distributed Service (DVIDS), Mod II Automotive Stirling Engine, NASA C-1986-3717, Washington, DC, 2 pages https://www.dvidshub.net/image/838670/modi-ii-automotive-stirling-engine.
Defense Visual Information Distributed Service (DVIDS), Mod II Automotive Stirling Engine, NASA C-1986-3718, Washington, DC, 2 pages https://www.dvidshub.net/image/841231/modi-ii-automotive-stirling-engine.
Defense Visual Information Distributed Service (DVIDS), Mod II Automotive Stirling Engine, NASA C-1986-3719, Washington, DC, 2 pages https://www.dvidshub.net/image/856096/modi-ii-automotive-stirling-engine.
Defense Visual Information Distributed Service (DVIDS), Mod II Automotive Stirling Engine, NASA C-1986-3720, Washington, DC, 2 pages https://www.dvidshub.net/image/842778/modi-ii-automotive-stirling-engine.
Defense Visual Information Distributed Service (DVIDS), Mod II Automotive Stirling Engine, NASA C-1986-3721, Washington, DC, 2 pages. https://www.dvidshub.net/image/836739/modi-ii-automotive-stirling-engine.
Defense Visual Information Distributed Service (DVIDS), Mod II Automotive Stirling Engine, NASA C-1986-3722, Washington, DC, 2 pages https://www.dvidshub.net/image/829783/modi-ii-automotive-stirling-engine.
Defense Visual Information Distributed Service (DVIDS), Mod II Automotive Stirling Engine, NASA C-1986-3724, Washington, DC, 2 pages https://www.dvidshub.net/image/841262/modi-ii-automotive-stirling-engine.
Defense Visual Information Distributed Service (DVIDS), Mod II Automotive Stirling Engine, NASA C-1986-3725, Washington, DC, 2 pages https://www.dvidshub.net/image/759360/modi-ii-automotive-stirling-engine.
Defense Visual Information Distributed Service (DVIDS), Mod II Automotive Stirling Engine, NASA C-1986-3726, Washington, DC, 2 pages https://www.dvidshub.net/image/840688/modi-ii-automotive-stirling-engine.
Defense Visual Information Distributed Service (DVIDS), Mod II Automotive Stirling Engine, NASA C-1986-3727, Washington, DC, 2 pages https://www.dvidshub.net/image/859381/modi-ii-automotive-stirling-engine.
Defense Visual Information Distributed Service (DVIDS), Mod II Automotive Stirling Engine, NASA C-1986-3729, Washington, DC, 2 pages https://www.dvidshub.net/image/834290/modi-ii-automotive-stirling-engine.
Defense Visual Information Distributed Service (DVIDS), Mod II Automotive Stirling Engine, NASA C-1986-3731, Washington, DC, 2 pages https://www.dvidshub.net/image/860486/modi-ii-automotive-stirling-engine.
Defense Visual Information Distributed Service (DVIDS), Mod II Automotive Stirling Engine, NASA C-1986-3732, Washington, DC, 2 pages https://www.dvidshub.net/image/749381/modi-ii-automotive-stirling-engine.
Devitt, Restriction and Compensation of Gas Bearings—Bently Bearings by Newway, Aston, PA, 5 Pages. https://bentlybearings.com/restriction-and-compensation/.
Direct Industry, Micro-Turbine Hear Recuperator/ For Exhaust Gas. For Gas Turbines/ Stainless Steel (Web Link Only) http://www.directindustry.com/prod/acte/product-158841-1644809.html.
Driscoll et al., Role of Swirl in Flame Stabilization, AIAA-2011-108, 49$^{th}$ AIAA Aerospace Sciences Meeting including the New Horizons Forum and Aerospace Exposition, Orlando Florida, Jan. 4-7, 2011, 11 Pages.
Dudareva et al., Thermal Protection of Internal Combustion Engines Pistols, Science Direct, Procedia Engineering, vol. 206, 2017, pp. 1382-1387. https://www.sciencedirect.com/science/article/pii/S1877705817353341.
Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.
Elizondo-Luna, Investigation of Porous Metals as Improved Efficiency Regenerators, The University of Sheffield, Doctor of Philosophy Thesis, Mar. 2016, 261 Pages. https://etheses.whiterose.ac.uk/13111/1/Thesis%20Elizondo-Luna.pdf.
Enerlyt Stirling Engine, Enerlyt, Glowing-Isothermal-Mechanical-Stirling-Arranged-Motor, Enerlyt Technik GmbH, Potsdam, 2012, 13 Pages. http://www.enerlyt.de/english/pdf/en_motorbeschreibung_040413.pdf.
Engine Basics, Ball Type, Rochester Image, 1 Page. http://www.enginebasics.com/Engine%20Basics%20Root%20Folder/Images/Fuel%20Injector3.jpg.
Ernst et al., Automotive Stirling Engine Development Program, NASA-CR-174972, DOE/NASA/0032-26, MTI-85ASE476SA8, Semi-annual Technical Progress Report for Period Jan. 1-Jun. 30, 1985, Lewis Research Center, Published February 1986, 114 Pages. https://ntrs.nasa.gov/archive/nasa/casi.ntrs.nasa.gov/19870010704.pdf.
Ernst et al., Automotive Stirling Engine Development Program, NASA-CR-175045, DOE/NASA-0032-27, MTI-86ASE507SA9, NASA, Automotive Stirling Engine Developmental Program, Semi-annual Technical Progress Report for Jul. 1-Dec. 1985, Lewis Research Center, Published in May 1986, 66 Pages. https://ntrs.nasa.gov/archive/nasa/casi.ntrs.nasa.gov/19860021107.pdf.
Fargo et al., Setting the Bar on Efficient Electrical Power Generation, ADI Thermal Power Corporation, 11 Pages. http://www.adisolarthermal.com/stirling/Technology.html.
Farrell, et al., Automotive Stirling Engine Development Program, NASA-CR-180839, DOE/NASA-0032-30, MTI-87ASE555SA11, NASA, Semiannual Technical Progress Report for Period Jul. 1-Dec. 31, 1986, Lewis Research Center, Published February 1988, 66 Pages. https://ntrs.nasa.gov/archive/nasa/casi.ntrs.nasa.gov/19900002338.pdf.
Fluent, 22.8.2 The Pressure-Swirl Atomizer Model, Fluent 6.3 User's Guide, 6 pages. https://www.sharcnet.ca/Software/Fluent6/html/ug/node825.htm.
Folsom et al., Combustion Modification—An Economic Alternative for Boiler NOx Control, GER-4192, GE Power Systems, Apr. 2001, 24 Pages. https://www.ge.com/content/dam/gepower-pgpd/global/en_US/documents/technical/ger/ger-4192-combustion-mod-economic-alterative-boiler-nox-control.pdf.
Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.
Free-Piston Engine Range Extender Technology, Sir Joseph Swan Centre for Energy Research, 2016. (Video) https://www.youtube.com/watch?v=u4b0_6byuFU.
Fung et al., External Characteristics of Unsteady Spray Atomization from a Nasal Spray Device, Journal of Pharmaceutical Sciences, ScienceDirect, vol. 102, Issue 3, Mar. 2013, pp. 1024-1035. (Abstract Only) https://www.sciencedirect.com/science/article/pii/S002235491531193X.
Garcia-Santamaria et al., A German Inverse Woodpile Structure with a Large Photonic Band Gap, Advanced Materials Communication, Wiley InterScience, 2007, Adv. Mater. 0000,00, pp. 1-5. http://colloids.matse.illinois.edu/articles/garcia_advmatt_2007.pdf.
General Electric—GE Power, Breaking the Power Plant Efficiency Record, 2016, 4 Pages. https://www.ge.com/power/about/insights/articles/2016/04/power-plant-efficiency-record.
Georgescu, Rotary Engine, 2007. (Video Only) https://www.youtube.com/watch?v=ckuQugFH68o.
Gibson, et al., Cellular Solids Structure and Properties, Cambridge University Press, 2$^{nd}$ Edition, 1997. (Web Link Only) https://doi.org/10.1017/CBO9781139878326.
Giphy, Engine Piston GIF, 1 Page. https://giphy.com/gifs/engine-hybrid-piston-10YyqVUCHx2HC.

(56) References Cited

OTHER PUBLICATIONS

Green Car Congress, New Toroidal Internal Combustion Engine Promises 20:1 Power-to-Weight-Ratio Energy, Technologies, Issues and Polices for Sustainable Mobility, Apr. 2006, 2 Pages. https://www.greencarcongress.com/2006/04/new_toroidal_in.html.

HiETA Technologies LTD, HiETA Celebrates Growth with New Website, Video and Brochure, United Kingdom, Sep. 5, 2018, 5 Pages. https://www.hieta.biz.hieta-celebrates-growth-with-new-website-video-and-brochure/.

Hoegel et al., Theoretical Investigation of the Performance of an Alpha Stirling Engine for Low Temperature Applications, Conference: ISEC 15$^{th}$ International Stirling Engine Conference, ResearchGate, New Zealand, Jan. 2012, 10 Pages. https://www.researchgate.net/publication/256706755_Theoretical_investigation_of_the_performance_of_an_Alpha_Stirling_engine_for_low_temperature_applications.

Honeywell Aerospace, Ultra Long-Life, Flight Qualified Technology For High Speed Imaging and Sensing Infra-Red Detectors, Stirling Cycle Cryocoolers, Auxiliary Power and Thermal, Honeywell Aerospace, 3 Pages. https://aerospace.honeywell.com/en/products/auxiliary-power-and-thermal/stirling-cycle-cryocoolers.

Howden, Reciprocating Compressor C series—animation, Jun. 2017. (Video Only) https://www.youtube.com/watch?v=owNOdUBL37U&feature=youtu.be.

http://www.hybrid-engine-hope.com/media/pagini/95_0071d630dba777d16e9a770de27060e6.gif (Web Link Only).

Huang, Toroidal Engine Ver:2.0, 2017. (Video Only) https://www.youtube.com/watch?v=n5L0Zc6Ic8Y&feature=youtu.be.

Integrated Publishing, Throttle Body Injection System, Construction Training Manuals, Construction Mechanic Basic, 2 Pages. http://constructionmanuals.tpub.com/14264/css/Throttle-Body-Injection-System-145.htm.

Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08ProjectPt4GtTemp.pdf.

Kannan et al., Exploration of Combustion Efficiency Using Preformed Vortex Patterns: A Study on IC Engine, Lambert Academy Publishing, Dec. 19, 2016. (Abstract, Paperback Purchase Only) https://www.amazon.com/Exploration-Combustion-Efficiency-Performed-Patterns/dp/3330023627.

Kitazaki et al., Development of Zero Emission Generating System Stirling Engine, Yanmar Technical Review, Jan. 27, 2017, 7 Pages. https://www.yanmar.com/ph/technology/technical_review/2017/0127_5.html.

Kulkarni et al., Liquid Sheet Breakup in Gas-Centered Swirl Coaxial Atomizers, Journal of Fluids Engineering, ResearchGate, vol. 132, No. 1, Jan. 2010, 9 Pages. https://www.researchgate.net/publication/245557304_Liquid_Sheet_Breakup_in_Gas-Centered_Swirl_Coaxial_Atomizers.

Linne et al., Ballistic Imaging of the Liquid Core for a Steady Jet in Crossflow, OSA Publishing, Applied Optics, vol. 44, Issue 31, 2005, p. 6627-6634. (Abstract Only) http://proxy.osapublishing.org/ao/ViewMedia.cfm?uri=ao-44-31-6627&seq=0&guid=173840e8-e788-546e-369a-b27a62f3465a&html=true.

Martini, Stirling Engine Design Manual, NASA-CR-168088, Second Edition, Jan. 1983, 410 Pages. https://ntrs.nasa.gov/archive/nasa/casi.ntrs.nasa.gov/19830022057.pdf.

McDonald, Recuperator Considerations for Future Higher Efficiency Microturbines, Applied Thermal Engineering, ScienceDirect, vol. 23, Issue 12, Aug. 2003, pp. 1463-1487. (Abstract Only) https://www.sciencedirect.com/science/article/pii/S1359431103000838.

Microgen Engine Corporation. Technology. (Web Link Only) https://www.microgen-engine.com/technology/technology/.

Microturbines and Micro Gas Turbines, An Introduction and Technical Guide, UK, 11 Pages. http://www.gasturbineworld.co.uk/microturbineguide.html.

Min et al., High temperature heat exchanger studies for applications to gas turbines, Heat and Mass Transfer, SpringerLink, 2009, vol. 46, p. 175. (Abstract Only) https://link.springer.com/article/10.1007/s00231-009-0560-3.

Module Two: Air Flow and Fluid Dynamics, Fluid Mechanics: Properties and Behaviors of Fluids in Motion, 15 Pages. https://media.lanecc.edu/users/driscolln/RT112/Air_Flow_Fluidics/Air_Flow_Fluidics7.html.

Morring, Jr., Flight Tests for Vortex Rocket Combustion, Vortex Rocket Combustion is Vetted, Aviation Week & Space Technology, Nov. 5, 2012, 4 Pages. http://aviationweek.com/awin/flight-tests-vortex-rocket-combustion.

Murphy, IAV Sees Huge Potential With 3D-Printed Pistons, Wards Auto, Apr. 12, 2018, 6 Pgs. https://www.wardsauto.com/engines/iav-sees-huge-potential-3d-printed-pistons.

Nguyen et al., Effect of solid heat conduction on heat transfer performance of a spiral heat exchanger, Applied Thermal Engineering, ScienceDirect, vol. 76, Feb. 5, 2015, pp. 500-409. (Abstract Only) https://www.sciencedirect.com/science/articles/pii/S1359431114010199.

Ni et al., Improved Simple Analytical Model and Experimental Study of a 100 W B-Type Stirling Engine, Applied Energy, vol. 169, 2016, pp. 768-787. https://www.researchgate.net/publication/296632477_Improved_Simple_Analytical_Model_and_experimental_study_of_a_100W_b-type_Stirling_engine/figures?lo=.

Nightingale et al., Automotive Stirling Engine Development Program, NASA-CR-174873, DOE/NASA/0032-25, MTI-85ASE445SA7, NASA, Topical Semiannual Technical Progress Report for Period Jul. 1-Dec. 31, 1984, Lewis Research Center, Published November 1985, 88 Pages. https://ntrs.nasa.gov/archive/nasa/casi.ntrs.nasa.gov/19870020790.pdf.

Nightingale, Automotive Stirling Engine, Mod 11 Design Report, NASA CR-175106, DOE/NASA/0032-28, MTI86ASE588RI, New York, 1986, 54 Pages. https://ntrs.nasa.gov/archive/nasa/casi.ntrs.nasa.gov/19880002196.pdf.

O'Dell, SuperTruck Program Scores Big, Head into Second 5-Year Phase, Trucking.com, 2016, 7 Pages. https://www.trucks.com/2016/10/31/supertruck-program-5-year-phase/.

Ohio University, Chapter 2A Alpha Stirling Engines, Stirling Engine Configurations, Mar. 30, 2013, 5 Pages. https://www.ohio.edu/mechanical/stirling/engines/engines.html.

Owczarek, On the Design of Lubricant Free Piston Compressors, Nonlinear Solid Mechanics, Faculty of Engineering Technology, Thesis, University of Twente, Enschede, Sep. 17, 2010. (Abstract Only) https://research.utwente.nl/en/publications/on-the-design-of-lubricant-free-piston-compressors.

Owkes et al., Turbulent Liquid Jet in Cross-Flow Atomization in YouTube Video, Published May 11, 2013. (Video Link Only) https://www.youtube.com/watch?v=Uciwt794ck.

Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.

Park et al., Thermal/Fluid Characteristics of Isotropic Plain-Weave Screen Laminates as Heat Exchange Surfaces, AIAA 2002-0208, 2002, pp. 1-9 https://wolfweb.unr.edu/~rawirtz/Papers/AIAA2002-0208.pdf.

Penswick et al., Duplex Stirling Machines, Sunpower Incorporated 19$^{th}$ Annual Intersociety Energy Conversion Engineering Conference, QP051082-A, vol. 3, No. CONF-840804, United States, 1984, 7 Pages. https://www.ohio.edu/mechanical/stirling/engines/Duplex-Stirling-Machines.pdf.

Pneumatic Round Body Cylinder—SRG_SRG Series, Parker, Richland MI, 3 Pages. http://ph.parker.com/us/en/pneumatic-round-body-cylinder.srg-srgm-series.

Prabhakaran et al., Effect of temperature on Atomization in Gas Centered Coaxial Injection Systems, Bombay: Indian Institute of Technology, 2009, 8 Pages. https://pdfs.semanticscholar.org/6fb6/98e68d2111ef54ad72d40a9fa106f8b63991.pdf.

Proeschel, Proe 90™ Recuperator for Microturbine Applications, ASME Proceedings, GT2002-30406, Vehicular and Small Turbomachines, ASME Turbo Expo 2002: Power for Land, Sea, and Air Jun. 3-6, 2002, Amsterdam, The Netherlands, vol. 1, pp.

(56) References Cited

OTHER PUBLICATIONS 1033-1044. (Abstract Only) http://proceedings.asmedigitalcollection.asme.org/proceedings.aspx?articleID=1574944.

Qiu et al., Advanced Stirling Power Generation System for CHP Application, ARPA, Temple University, Philadelphia, 5 Pages. https://arpa-e.energy.gov/sites/default/files/Temples_GENSETS_Kickoff.pdf.

Ranieri et al., Efficiency Reduction in Stirling Engines Resulting from Sinusoidal Motions, Energies, vol. 11, No. 11: 2887, 2018, 14 Pages. https://doi.org/10.3390/en11112887.

Renewable Energy, Double-Acting Stirling Engine, Stirling Engine, 1 Page. (Abstract Only) https://sites.google.com/a/emich.edu/cae546816t5/history/types/double---acting-stirling-engine.

Rodriguez Perez, Cellular Nanocomposites: A New Type of Light Weight Advanced Materials with Improved Properties, CellMat Technologies S.L. Transfer Center and Applied Technologies, Valladolid, 35 Pages. http://crono.ubu.es/innovationh2020/pdf/cellmat.pdf.

Schonek, How big are power line losses?, Energy Management/Energy Efficiency, Schneider Electric, Mar. 25, 2013, 2 Pages. https://blog.schneider-electric.com/energy-management-energy-efficiency/2013/03/25/how-big-are-power-line-losses/.

Schwartz, The Natural Gas Heat Pump and Air Conditioner, 2014 Building Technologies Office Peer Review, ThermoLift, Inc., U.S. Department of Energy, Energy Efficiency & Renewable Energy, DE-FOA-0000823, 27 Pages (Refer to Page 7) https://www.energy.gov/sites/prod/files/2014/11/f19/BTO%202014%20Peer%20Review%20Presentation%20-%20ThermoLift%204.4.14.pdf.

Shepard, Bubble Size Effect on Effervescent Atomization, ResearchGate, University of Minnesota Dissertation Thesis, Jun. 2011, 164 Pages. https://www.researchgate.net/publication/295855028_Bubble_Size_Effect_on_Effervescent_Atomization.

Shih et al., Thermal Design and Model Analysis of the Swiss-roll Recuperator for an Innovative Micro Gas Turbine, Applied Thermal Engineering, ScienceDirect, vol. 29, Issues 8-9, Jun. 2009, pp. 1493-1499. (Abstract Only) https://www.sciencedirect.com/science/article/pii/S1359431108002895.

Shimizu, Next Prius Will Have Engine Thermal Efficiency of 40%, XTECH, Solar Plant Business, Nikkei Business Publications, May 22, 2015, 2 Pages. https://tech.nikkeibp.co.jp/dm/english/NEWS_EN/20150522/419560/.

Stirling Engines, Regenerators, What They Are and How They Work, American Stirling Company, 7 Pages. https://www.stirlingengine.com/regenerators/.

Stirling Engines, Solar Cell Central, 3 Pages. http://solarcellcentral.com/stirling_page.html.

Technology, Microgen Engine Corporation, 2016, 4 Pages. https://www.microgen-engine.com/technology/technology/.

Tecpro, Spray Engineening Info, Australia, 7 Pages. https://www.tecpro.com.au/technical-info/spray-enginnering/.

ThermoLift, Technology—Background, The Thermodynamic Process Behind ThermoLift, ThermoLift, Inc., 3 Pages. http://www.tm-lift.com/background/.

Thimsen, Stirling Engine Assessment, 1007317, Electronic Power Research Institute (EPRI ), Palo Alto, California, 2002, 170 Pages. https://www.engr.colostate.edu/~marchese/mech337-10/epri.pdf.

Thomassen, Free Floating Piston Film (mpeg).mpg, Mar. 5, 2010. (Video Only) https://www.youtube.com/watch?v=bHFUi0F0PgA.

Toptica Photonics, 2-Photon Polymerization, FemtoFiber Technology for Two-Photon Polymerization, 2 Pages. https://www.toptica.com/applications/ultrafast-studies/2-photon-polymerization/.

Toyota Motor Corporation, Inline 4 Cylinder 2.5L Injection Gasoline Engine/New Transaxle, Global Website, Dec. 6, 2016, 2 Pages. https://global.toyota/download/14447877/.

Treece et al., Microturbine Recuperator Manufacturing and Operating Experience, GT2002-30404, ASME Proceedings, Vehicular and Small Turbomachines, ASME Turbo Expo 2002: Power for Land, Sea, and Air Jun. 3-6, 2002, Amsterdam, The Netherlands, vol. 1, pp. 1017-1023. (Abstract Only) http://proceedings.asmedigitalcollection.asme.org/proceeding.aspx?articleID=1574937.

Tri Clamp, Tri Clamp Information and Sizing Guide, TriClamp Co., 3 Pages. https://triclamp.co/pages/tri-clamp-information-and-sizing-guide.

Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-notes/MIT3_054S15_L13_Cellular.pdf.

Urieli, Chapter 5B—Regenerator Simple Analysis, Stirling Cycle Machine Analysis, Ohio Edu, Jan. 17, 2010, 5 Pages. https://www.ohio.edu/mechanical/stirling/simple/regen_simple.html.

Vodhanel, Characterization of Performance of a 3D Printed Stirling Engine Through Analysis and Test, Cleveland State University Engaged Scholarship@CSU, ETD Archive, 2016, 91 Pages. https://engagedscholarship.csuohio.edu/cgi/viewcontent.cgi?referer=http://www.google.com/&httpsredir=1&article=1944&context=etdarchive.

Wikipedia, Heat Engine, 8 Pages. https://en.wikipedia.org/wiki/Heat_engine.

Wikipedia, Regenerative Heat Exchanger, 3 Pages. https://en.wikipedia.org/wiki/Regenerative_heat_exchanger.

Wikipedia, Spray Nozzle, 11 Pages. https://en.wikipedia.org/wiki/Spray_nozzle.

Wikipedia, Stirling Engine, 2019, 24 Pages. https://en.wikipedia.org/wiki/Stirling_engine.

Wirtz et al., High Performance Woven Mesh Heat Exchangers, Mechanical Engineering Department, University of Nevada, Reno, 2002, 8 Pages. https://apps.dtic.mil/dtic/tr/fulltext/u2/a408219.pdf.

Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/d1a3/b4ce0baa639cf349d25d1506c3fa6118dc3e.pdf.

Wu et al., Model-based Analysis and Simulation of Regenerative Heat Wheel, ScienceDirect, Energy and Buildings, vol. 38, No. 5, May 2006, pp. 502-514. http://citeseerx.ist.psu.edu/view/doc/download?doi=10.1.1.616.3103&rep=rep1&type=pdf.

Xiao et al, Recuperators for micro gas turbines: A review, Applied Energy, ScienceDirect, vol. 197, Jul. 1, 2017, pp. 83-99. (Abstract Only) https://www.sciencedirect.com/science/article/pii/S0306261917303367.

Xie et al., Investigation on the Performances of the Gas Driven Vuilleumier Heat Pump, International Refrigeration and Air Conditioning Conference, Purdue University, School of Mechanical Engineering, 2008, 7 Pages. https://docs.lib.purdue.edu/cgi/viewcontent.cgi?referer=https://www.google.com/&httpsredir=1&article=1935&context=iracc.

\* cited by examiner

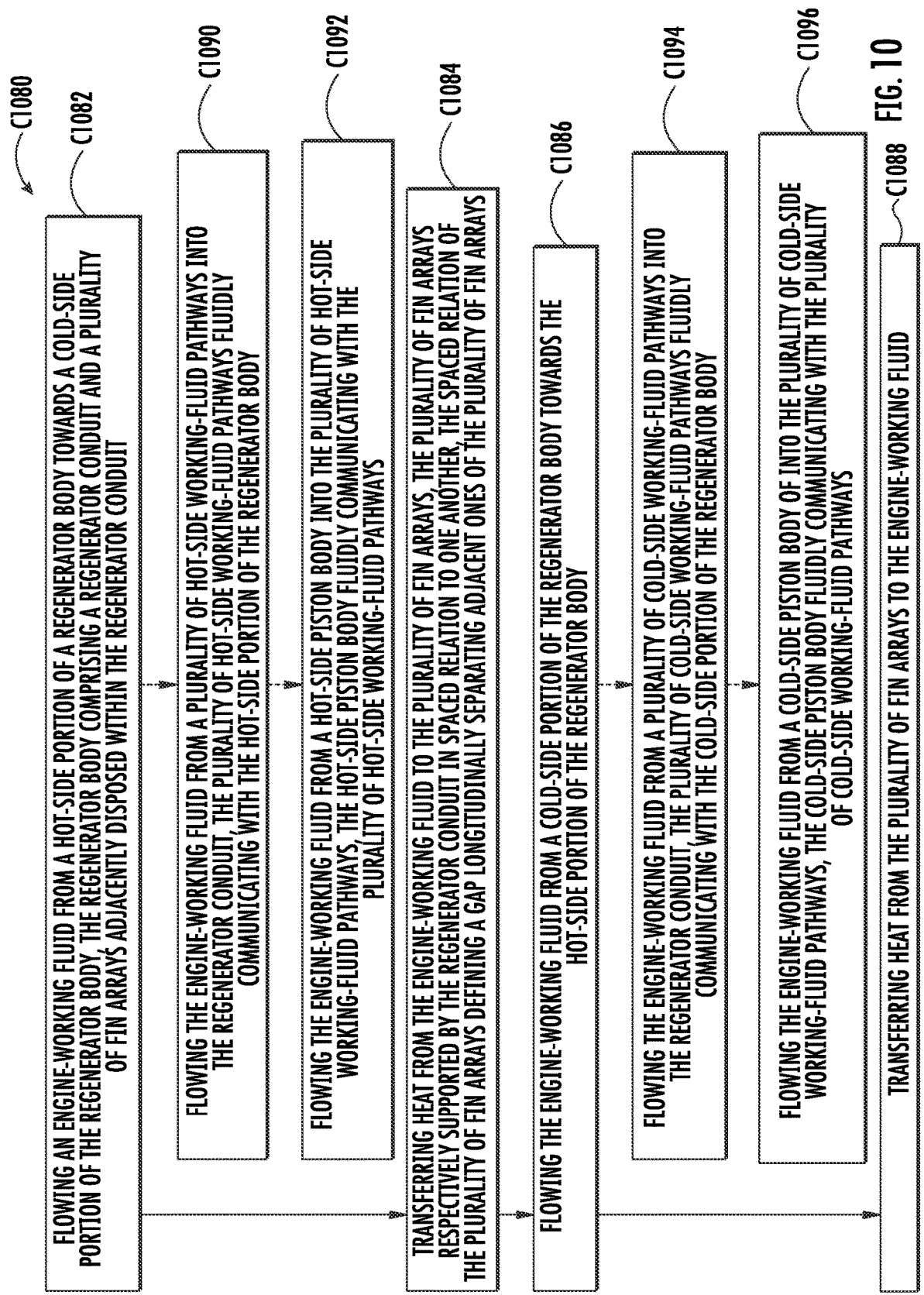

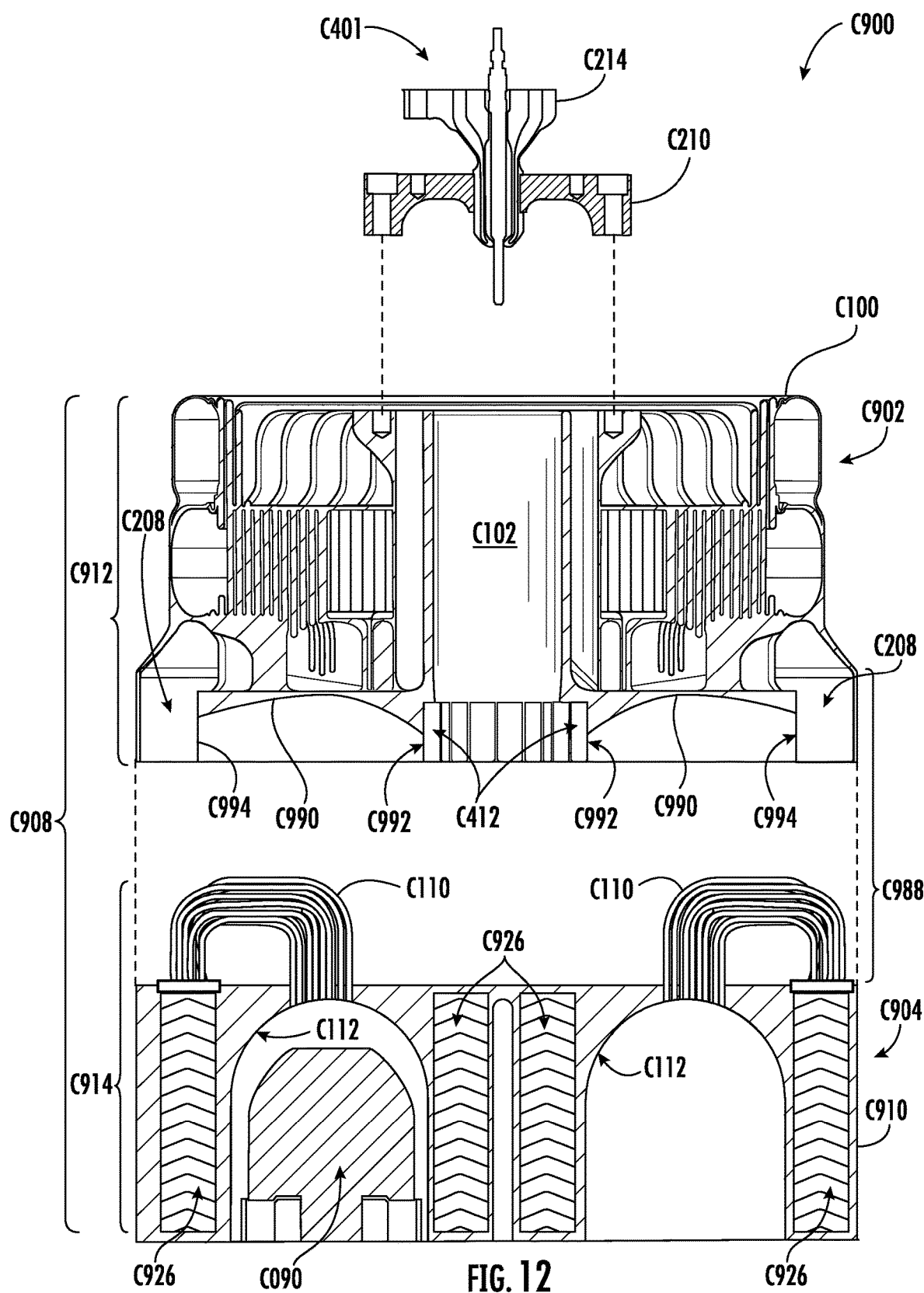

ENERGY CONVERSION APPARATUS

CROSS-REFERENCE TO RELATED APPLICATIONS

The present application is a continuation of U.S. application Ser. No. 16/878,858, filed on May 20, 2020, which claims priority to each of the following U.S. Provisional applications, the contents of which are incorporated herein by reference in their entirety for all purposes as if set forth verbatim: App. No. 62/850,599, filed May 21, 2019; App. No. 62/850,623, filed May 21, 2019; App. No. 62/850,678, filed May 21, 2019; App. No. 62/850,692, filed May 21, 2019; and App. No. 62/850,701, filed May 21, 2019. The present application also incorporates by reference International Patent Application Number 503221-US-2/GE3D-334-1 filed on May 20, 2020 in its entirety for all purposes.

FIELD

The present subject matter relates generally to energy conversion systems, power generation systems, and energy distribution systems. The present subject matter additionally relates to heat exchangers and heat exchanger systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

Furthermore, there is a need for improved control system and methods for operating power generation systems as may include subsystems that collectively may provide improved power generation efficiency or reduced emissions.

BRIEF DESCRIPTION

Aspects and advantages will be set forth in part in the following description, or may be apparent from the description, or may be learned through practicing the presently disclosed subject matter.

In one aspect, the present disclosure embraces monolithic engine assemblies. An exemplary monolithic engine assembly may include an engine body that includes a regenerator body. The engine body and the regenerator body may respectively define at least a portion of a monolithic body, or the engine body may define at least a portion of a first monolithic body-segment and the regenerator body may define at least a portion of a second monolithic body-segment operably coupled or operably couplable to the first monolithic body-segment.

In another aspect, the present disclosure embraces regenerator bodies, such as monolithic regenerator bodies. An exemplary regenerator body may include a regenerator conduit, and a plurality of fin arrays adjacently disposed within the regenerator conduit and respectively supported by the regenerator conduit in spaced relation to one another. The spaced relation of the plurality of fin arrays may define a gap longitudinally separating adjacent ones of the plurality of fin arrays.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure including the best mode, directed to one of ordinary skill in the art, is set forth in the specification, which makes reference to the appended figures, in which:

FIG. 10 shows a flowchart depicting an exemplary method of regenerating heat in an engine-working fluid;

FIG. 12 schematically depicts an enlarged partial exploded view of another exemplary engine assembly according to aspects of the present disclosure.

Figure 1:
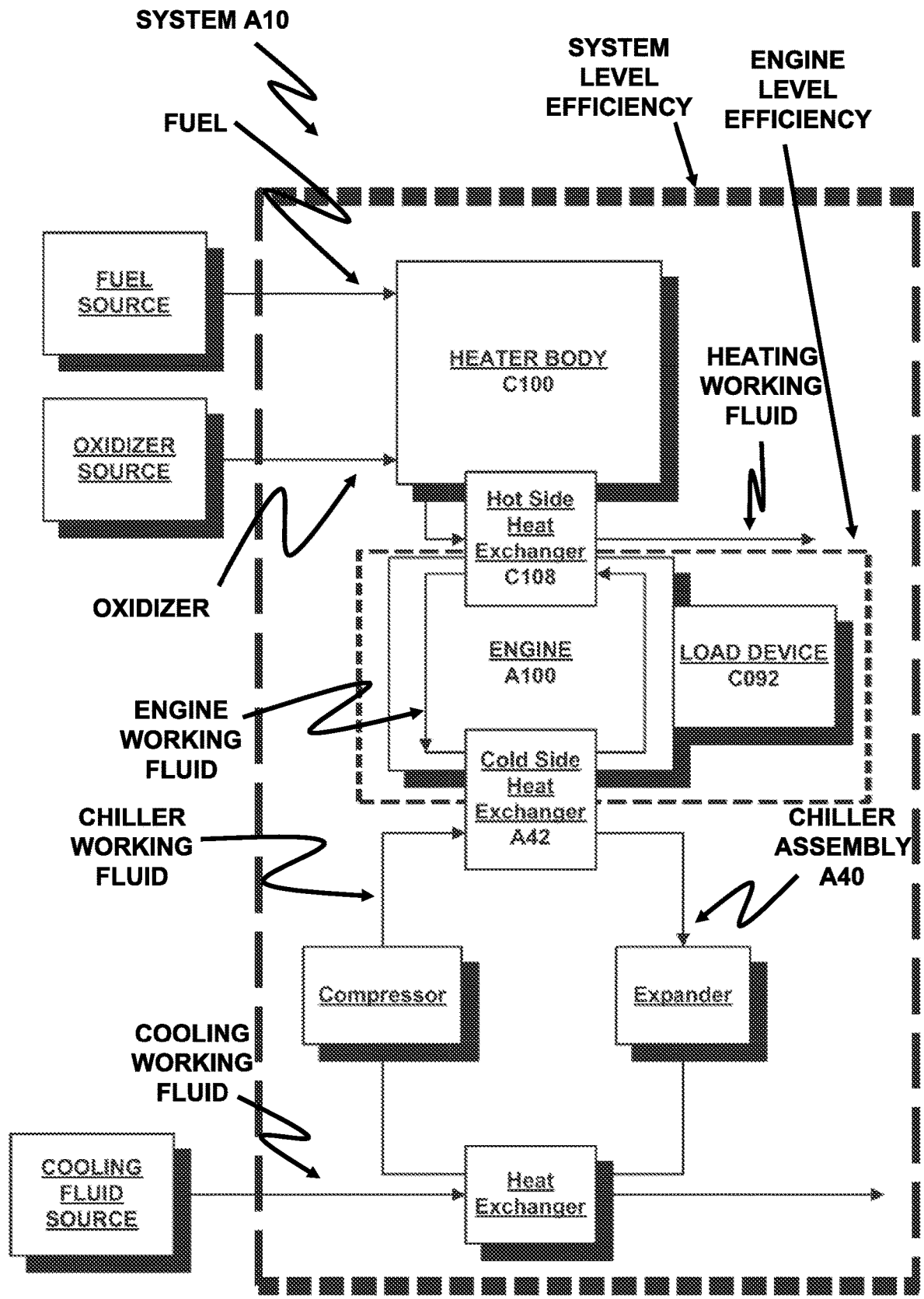
FIG. 1 is a schematic block diagram depicting a system for energy conversion according to an aspect of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

It will be appreciated that the terms "clockwise" and "counter-clockwise" are terms of convenience and are not to be limiting. Generally, the terms "clock-wise" and "counter-clockwise" have their ordinary meaning, and unless otherwise indicated refer to a direction with reference to a top-down or upright view. Clockwise and counter-clockwise elements may be interchanged without departing from the scope of the present disclosure.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers A221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers A221, A222, the temperature is relative to an average temperature over a phase of operation of the engine. As another example, where a substantially uniform thermal energy unit is provided or removed to/from the plurality of chambers A221, A222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process. It should be appreciated that ratios, ranges, minimums, maximums, or limits generally, or combinations thereof, may provide structure with benefits not previously known in the art. As such, values below certain minimums described herein, or values above certain maximums described herein, may alter the function and/or structure of one or more components, features, or elements described herein. For example, ratios of volumes, surface area to volume, power output to volume, etc. below the ranges described herein may be insufficient for desired thermal energy transfer, such as to undesirably limit power output, efficiency, or Beale number. As another example, limits greater than those described herein may undesirably increase the size, dimensions, weight, or overall packaging of the system or engine, such as to undesirably limit the applications, apparatuses, vehicles, usability, utility, etc. in which the system or engine may be applied or operated. Still further, or alternatively, undesired increases in overall packaging may undesirably decrease efficiency of an overall system, application, apparatus, vehicle, etc. into which the engine may be installed, utilized, or otherwise operated. For example, although an engine may be constructed defining a similar or greater efficiency as described herein, such an engine may be of undesirable size, dimension, weight, or overall packaging such as to reduce an efficiency of the system into which the engine is installed. As such, obviation or transgression of one or more limits described herein, such as one or limits relative to features such as, but not limited to, heater conduits, chiller conduits A54, chamber volumes, walled conduit volumes, or operational temperatures, or combinations thereof, may undesirably alter such structures such as to change the function of the system or engine.

Referring now to FIG. 1, an exemplary schematic block diagram depicting a system for energy conversion (hereinafter, "system A10") is provided. Various embodiments of the system A10 provided herein include systems for power generation, a heat recovery system, a heat pump or cryogenic cooler, a system including and/or acting as a bottoming cycle and/or a topping cycle, or other system for producing useful work or energy, or combinations thereof. Referring additionally for FIG. 2, various embodiments of the system A10 include a closed cycle engine apparatus (hereinafter, "engine A100", apparatus "A100", or "engine assembly C900", or otherwise denoted herein) operably coupled to a load device c092. The engine A100 contains a substantially fixed mass of an engine working fluid to which and from which thermal energy is exchanged at a respective cold side heat exchanger A42 and a hot side heat exchanger C108. In one embodiment, the engine working fluid is helium. In other embodiments, the engine working fluid may include air, nitrogen, hydrogen, helium, or any appropriate compressible fluid, or combinations thereof. In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the engine. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device C092 is a mechanical work device or an electric machine. In one embodiment, the load device C092 is a pump, compressor, or other work device. In another embodiment, the load device C092 as an electric machine is configured as a generator producing electric energy from movement of a piston assembly A1010 at the engine. In still another embodiment, the electric machine is configured as a motor providing motive force to move or actuate the piston assembly A1010, such as to provide initial movement (e.g., a starter motor). In still various embodiments, the electric machine defines a motor and generator or other electric machine apparatus such as described further herein.

A heater body C100 is thermally coupled to the engine A100. The heater body C100 may generally define any apparatus for producing or otherwise providing a heating working fluid such as to provide thermal energy to the engine working fluid. Various embodiments of the heater body C100 are further provided herein. Exemplary heater bodies C100 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies C100 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. The exemplary heater body C100 providing thermal energy to the engine working fluid may include all or part of a combined heat and power cycle, or cogeneration system, or power generation system generally.

In still various embodiments, the heater body C100 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, the system A10 includes a working fluid body C108, such as further described herein. In one embodiment, the working fluid body C108 defines a hot side heat exchanger A160, such as further described herein, from which thermal energy is output to the engine working fluid at an expansion chamber A221 of the engine. The working fluid body C108 is positioned at the expansion chamber A221 of the engine in thermal communication with the heater body C100. In other embodiments, the working fluid body C108 may be separate from the heater body C100, such that the heating working fluid is provided in thermal communication, or additionally, in fluid communication with the working fluid body C108. In particular embodiments, the working fluid body C108 is positioned in direct thermal communication with the heater body C100 and the expansion chamber A221 of the engine A100 such as to receive thermal energy from the heater body C100 and provide thermal energy to the engine working fluid within the engine.

In still various embodiments, the heater body C100 may include a single thermal energy output source to a single expansion chamber A221 of the engine. As such, the system A10 may include a plurality of heater assemblies each providing thermal energy to the engine working fluid at each expansion chamber A221. In other embodiments, such as depicted in regard to FIG. 2, the heater body C100 may provide thermal energy to a plurality of expansion chambers A221 of the engine. In still other embodiments, the heater body includes a single thermal energy output source to all expansion chambers A221 of the engine.

The system A10 further includes a chiller assembly, such as chiller assembly A40 further described herein. The chiller assembly A40 is configured to receive and displace thermal energy from a compression chamber A222 of the engine. The system A10 includes a cold side heat exchanger A42 thermally coupled to the compression chamber A222 of the closed cycle engine and the chiller assembly. In one embodiment, the cold side heat exchanger A42 and the piston body C700 defining the compression chamber A222 of the engine are together defined as an integral, unitary structure. In still various embodiments, the cold side heat exchanger A42, at least a portion of the piston body C700 defining the compression chamber A222, and at least a portion of the chiller assembly together define an integral, unitary structure.

In various embodiments, the chiller assembly A40 is a bottoming cycle to the engine A100. As such, the chiller assembly A40 is configured to receive thermal energy from the engine A100. The thermal energy received at the chiller assembly A40, such as through a cold side heat exchanger A42, or cold side heat exchanger A170 further herein, from the engine A100 is added to a chiller working fluid at the chiller assembly A40. In various embodiments, the chiller assembly A40 defines a Rankine cycle system through which the chiller working fluid flows in closed loop arrangement with a compressor. In some embodiments, the chiller working fluid is further in closed loop arrangement with an expander. In various embodiments, the heat exchanger A188 may include a condenser or radiator. The cold side heat exchanger A40 is positioned downstream of the compressor and upstream of the expander and in thermal communication with a compression chamber A222 of the closed cycle engine, such as further depicted and described in regard to FIG. 2. In various embodiments, the cold side heat exchanger A42 may generally define an evaporator receiving thermal energy from the engine A40.

Referring still to FIG. 1, in some embodiments, the heat exchanger A188 is positioned downstream of the expander and upstream of the compressor and in thermal communication with a cooling working fluid. In the schematic block diagram provided in FIG. 1, the cooling working fluid is an air source. However, in various embodiments, the cooling fluid may define any suitable fluid in thermal communication with the heat exchanger. The heat exchanger may further define a radiator configured to emit or dispense thermal energy from the chiller assembly A40. A flow of cooling working fluid from a cooling fluid source is provided in thermal communication with the heat exchanger to further aid heat transfer from the chiller working fluid within the chiller assembly A40 to the cooling working fluid.

As further described herein, in various embodiments the chiller assembly A40 may include a substantially constant density heat exchanger. The constant density heat exchanger generally includes a chamber including an inlet and an outlet each configured to contain or trap a portion of the chiller working fluid for a period of time as heat from the closed cycle engine is transferred to the cold side heat exchanger A42. In various embodiments, the chamber may define a linear or rotary chamber at which the inlet and the outlet are periodically opened and closed via valves or ports such as to trap the chiller working fluid within the chamber for the desired amount of time. In still various embodiments, the rate at which the inlet and the outlet of the chamber defining the constant density heat exchanger is a function at least of velocity of a particle of fluid trapped within the chamber between the inlet and the outlet. The chiller assembly A40 including the constant density heat exchanger may provide efficiencies, or efficiency increases, performances, power densities, etc. at the system A10 such as further described herein.

It should be appreciated that in other embodiments, the chiller assembly A40 of the system A10 may include a thermal energy sink generally. For example, the chiller assembly A40 may include a body of water, the vacuum of space, ambient air, liquid metal, inert gas, etc. In still various embodiments, the chiller working fluid at the chiller assembly A40 may include, but is not limited to, compressed air, water or water-based solutions, oil or oil-based solutions, or refrigerants, including, but not limited to, class 1, class 2, or class 3 refrigerants. Further exemplary refrigerants may include, but are not limited to, a supercritical fluid including, but not limited to, carbon dioxide, water, methane, ethane, propane, ethylene, propylene, methanol, ethanol, acetone, or nitrous oxide, or combinations thereof. Still exemplary refrigerants may include, but are not limited to, halon, perchloroolefin, perchlorocarbon, perfluoroolefin, perfluorocarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof. Still further exemplary embodiments of refrigerant may include, but are not limited to, methylamine, ethylamine, hydrogen, helium, ammonia, water, neon, nitrogen, air, oxygen, argon, sulfur dioxide, carbon dioxide, nitrous oxide, or krypton, or combinations thereof.

It should be appreciated that where combustible or flammable refrigerants are included for the chiller working fluid, various embodiments of the system A10 may beneficially couple the heater body C100, and/or the fuel source, and the chiller assembly A40 in fluid communication such that the combustible or flammable working fluid to which thermal energy is provided at the chiller assembly A40 may further be utilized as the fuel source for generating heating working fluid, and the thermal energy therewith, to output from the heater body C100 to the engine working fluid at the engine A100.

Various embodiments of the system A10 include control systems and methods of controlling various sub-systems disclosed herein, such as, but not limited to, the fuel source, the oxidizer source, the cooling fluid source, the heater body C100, the chiller assembly C40, the engine A100, and the load device C092, including any flow rates, pressures, temperatures, loads, discharges, frequencies, amplitudes, or other suitable control properties associated with the system A10. In one aspect, a control system for the system A10 defining a power generation system is provided. The power generation system includes one or more closed cycle engines (such as engine A100), one or more load devices defining electric machines (such as load device C092) operatively coupled to the engine, and one or more energy storage devices in communication with the electric machines.

The control system can control the closed cycle engine and its associated balance of plant to generate a temperature differential, such as a temperature differential at the engine working fluid relative to the heating working fluid and the chiller working fluid. Thus, the engine defines a hot side, such as at the expansion chamber A221, and a cold side, such as at the compression chamber A222. The temperature differential causes free piston assemblies A1010 to move within their respective piston chambers defined at respective piston bodies C700. The movement of the pistons A1011 causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system A10. The controllable devices execute control actions in accordance with the control commands. Accordingly, the desired output of the system A10 can be achieved.

Furthermore, the control system can monitor and anticipate load changes on the electric machines and can control the engine A100 to anticipate such load changes to better maintain steady state operation despite dynamic and sometimes significant electrical load changes on the electric machines. A method of controlling the power generation system is also provided. In another aspect, a control system for a heat pump system is provided. The heat pump system includes one or more of the closed cycle engines described herein. A method of controlling the heat pump system is also provided. The power generation and heat pump systems as well as control methods therefore are provided in detail herein.

Figure 2:
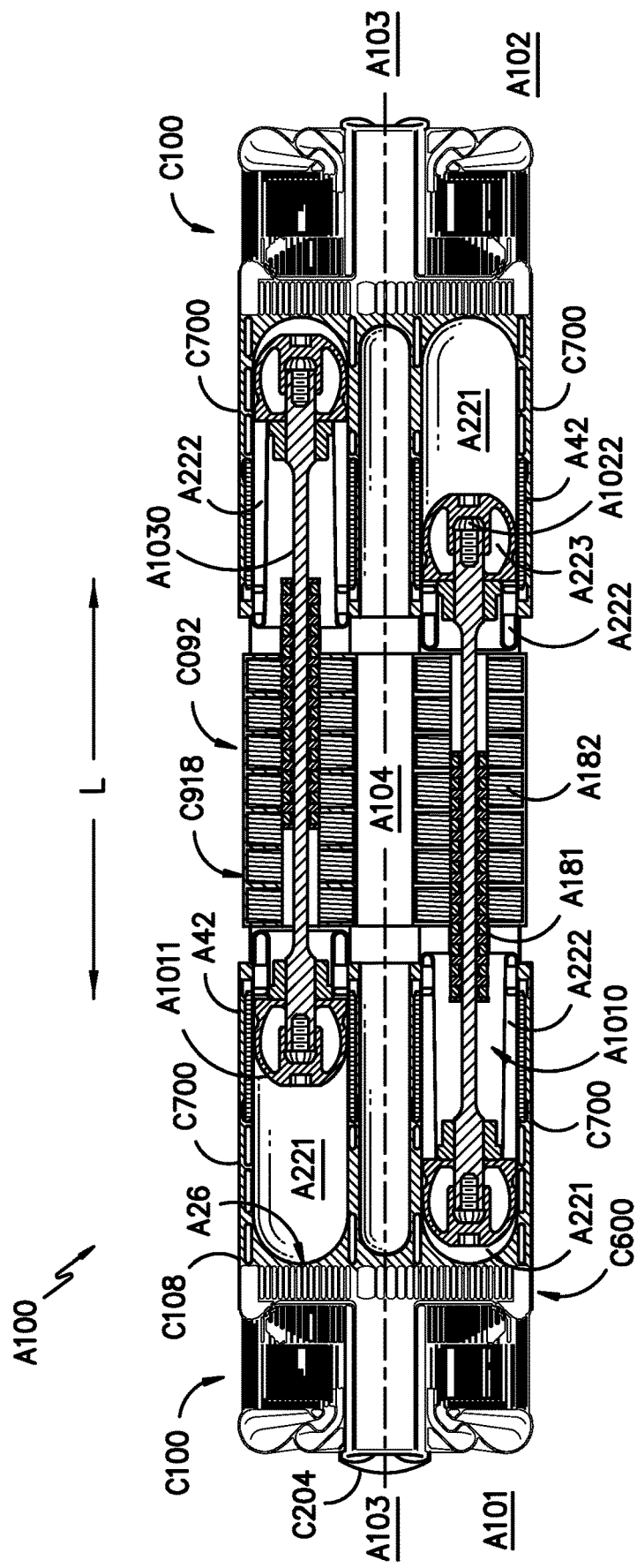
FIG. 2 is a cross sectional view of an exemplary embodiment of a closed cycle engine and load device according to an aspect of the present disclosure.

Referring now to FIG. 2, exemplary embodiments of the system A10 are further provided. FIG. 2 is an exemplary cross sectional view of the system A10 including the heater body C100 and the chiller assembly A40 each in thermal communication with the engine A100, or particularly the engine working fluid within the engine A100, such as shown and described according to the schematic block diagram of FIG. 1. The system A10 includes a closed cycle engine A100 including a piston assembly A1010 positioned within a volume or piston chamber C112 (FIG. 11A and FIG. 11B) defined by a wall defining a piston body C700. The volume within the piston body C700 is separated into a first chamber, or hot chamber, or expansion chamber A221 and a second chamber, or cold chamber (relative to the hot chamber), or compression chamber A222 by a piston A1011 of the piston assembly A1010. The expansion chamber A221 is positioned thermally proximal to the heater body C100 relative to the compression chamber A222 thermally distal to the heater body C100. The compression chamber A222 is positioned thermally proximal to the chiller assembly A40 relative to the expansion chamber A221 thermally distal to the chiller assembly A40.

In various embodiments, the piston assembly A1010 defines a double-ended piston assembly A1010 in which a pair of pistons A1011 is each coupled to a connection member A1030. The connection member A1030 may generally define a rigid shaft or rod extended along a direction of motion of the piston assembly A1010. In other embodiments, the connection members A1030 includes one or more springs or spring assemblies, such as further provided herein, providing flexible or non-rigid movement of the connection member A1030. In still other embodiments, the connection member A1030 may further define substantially U- or V-connections between the pair of pistons A1011.

Each piston A1011 is positioned within the piston body C700 such as to define the expansion chamber A221 and the compression chamber A222 within the volume of the piston body C700. The load device c092 is operably coupled to the piston assembly A1010 such as to extract energy therefrom, provide energy thereto, or both. The load device c092 defining an electric machine is in magnetic communication with the closed cycle engine via the connection member A1030. In various embodiments, the piston assembly A1010 includes a dynamic member A181 positioned in operable communication with a stator assembly A182 of the electric machine. The stator assembly A182 may generally include a plurality of windings wrapped circumferentially relative to the piston assembly A1010 and extended along a lateral direction L. In one embodiment, such as depicted in regard to FIG. 2, the dynamic member A181 is connected to the connection member A1030. The electric machine may further be positioned between the pair of pistons A1011 of each piston assembly A1010. Dynamic motion of the piston assembly A1010 generates electricity at the electric machine. For example, linear motion of the dynamic member A181 between each pair of chambers defined by each piston A1011 of the piston assembly A1010 generates electricity via the magnetic communication with the stator assembly A182 surrounding the dynamic member A181.

Referring to FIG. 2, in various embodiments, the working fluid body C108 may further define at least a portion of the expansion chamber A221. In one embodiment, such as further described herein, the working fluid body C108 defines a unitary or monolithic structure with at least a portion of the piston body C700, such as to define at least a portion of the expansion chamber A221. In some embodiments, the heater body C100 further defines at least a portion of the working fluid body C108, such as to define a unitary or monolithic structure with the working fluid body C108, such as further described herein.

The engine A100 defines an outer end A103 and an inner end A104 each relative to a lateral direction L. The outer ends A103 define laterally distal ends of the engine A100 and the inner ends 104 define laterally inward or central positions of the engine A100. In one embodiment, such as depicted in regard to FIG. 2, the heater body C100 is positioned at outer ends A103 of the system A10. The piston body C700 includes a dome structure A26 at the expansion chamber A221. The expansion chamber dome structure A26 s provides reduced surface area heat losses across the outer end A103 of the expansion chamber A221. In various embodiments, the pistons A1011 of the piston assembly A1010 further include domed pistons A1011 corresponding to the expansion chamber A221 dome. The dome structure A26, the domed piston A1011, or both may provide higher compressions ratios at the chambers A221, A222, such as to improve power density and output.

The chiller assembly A40 is positioned in thermal communication with each compression chamber A222. Referring to FIG. 2, the chiller assembly A40 is positioned inward along the lateral direction L relative to the heater body C100. In one embodiment, the chiller assembly A40 is positioned laterally between the heater body C100 and the load device c092 along the lateral direction L. The chiller assembly A40 provides the chiller working fluid in thermal communication with the engine working fluid at the cold side heat exchanger A42 and/or compression chamber A222. In various embodiments, the piston body C700 defines the cold side heat exchanger A42 between an inner volume wall A46 and an outer volume wall A48 surrounding at least the compression chamber A222 portion of the piston body C700.

In various embodiments, such as depicted in regard to FIG. 2, the load device c092 is positioned at the inner end A104 of the system A10 between laterally opposing pistons A1011. The load device c092 may further include a machine body c918 positioned laterally between the piston bodies C700. The machine body c918 surrounds and houses the stator assembly A182 of the load device c092 defining the electric machine. The machine body c918 further surrounds the dynamic member A181 of the electric machine attached to the connection member A1030 of the piston assembly A1010. In various embodiments, such as depicted in regard to FIG. 2, the machine body c918 further provides an inner end wall A50 at the compression chamber A222 laterally distal relative to the expansion chamber A221 dome.

Now referring to FIGS. 3A through 9F, exemplary regenerator bodies c800 will be described. The presently disclosed regenerator bodies c800 may define part of the heater body c100 and/or an engine c002, such as shown and described in regard to system A10 and engine A100 herein, or further herein with reference to FIG. 14. For example, a regenerator body c800 may define at least a portion of a monolithic body or a monolithic body-segment. Such monolithic body or monolithic body-segment may define at least a portion of the heater body c100 and/or the engine c002. Additionally, or in the alternative, the presently disclosed regenerator bodies c800 may be provided as a separate component, whether for use in connection with a heater body c100, an engine c002, or any other setting whether related or unrelated to a heater body c100 or an engine c002. It will be appreciated that an engine c002 and/or a heater body c100 may include any desired number of regenerator bodies c800.

FIG. 3A through 3D show an exemplary regenerator body c800 implemented within an exemplary engine c002. The regenerator body c800 may fluidly communicate with one or more piston bodies c700. For example, a plurality of working-fluid pathways c110 may provide fluid communication between a regenerator body c800 and a piston body c700. The working-fluid pathways c110 may fluidly communicate between a piston chamber c112 defined by the piston body c700 and a regenerator conduit c1000 defined by the regenerator body c800.

The plurality of working-fluid pathways c110 may extend between respective ones of a plurality of piston chamber apertures c111 and respective ones of a plurality of regenerator apertures c113. The piston chamber apertures c111 provide fluid communication between the working-fluid pathways c110 and the piston chamber c112, and the regenerator apertures c113 provide fluid communication between the working-fluid pathways c110 and the regenerator conduit c1000. The piston chamber apertures c111 may define a first end of the working-fluid pathways c110 and the regenerator apertures c113 may define a second end of the working-fluid pathways c110.

A piston body c700 may define a hot-side c1002 of the piston chamber c112 and a cold side piston chamber c1004. A regenerator conduit c1000 may include a hot-side portion c1006 and a cold-side portion c1008. A plurality of hot-side working-fluid pathways c1010 may provide fluid communication between the regenerator body c800 and a first piston body c700, such as between the hot-side portion c1006 and the hot-side c1002 of the piston chamber c112. A plurality of cold-side working-fluid pathways c1010 may provide fluid communication between the regenerator body c800 and a second piston body c700, such as between the cold-side portion c1008 of the regenerator conduit c1000 and the cold-side c1004 of the piston chamber c112.

The first piston body c700 may include a first piston assembly c090 disposed therein and/or the second piston body c700 may include a second piston assembly c090 disposed therein. Heat may be input (QIN) to engine-working fluid disposed within the hot-side working-fluid pathways c1010, such as from a heater body c100 (e.g., FIG. 14) or any other suitable heat source. Heat may be extracted ($Q_{OUT}$) from engine-working fluid disposed within the cold-side working-fluid pathways c1012, such as from a chiller body (not shown) or any other suitable cooling source. A regenerator body c800 may be disposed adjacent to a piston body c700, such as circumferentially adjacent to a piston body c700. As shown in FIG. 3C, a regenerator body c800 may circumferentially surround a piston body c700. Alternatively, a regenerator body c800 may be disposed adjacent to a piston body c700. In some embodiments, a semiannular regenerator body c800 may be disposed circumferentially adjacent to a piston body c700.

During operation, engine-working fluid flowing from the plurality of hot-side working-fluid pathways c1010 to the regenerator body c800 enters the regenerator conduit c1000. Fluid passing through the regenerator conduit c1000 may flow out of the regenerator body c800 and into the plurality of cold-side working-fluid pathways c1012. The regenerator conduit c1000 includes a heat storage medium c1014 disposed therein. The heat storage medium c1014 may be any suitable thermal energy storage medium within which heat from the hot-side working-fluid pathways c1010 may be intermittently stored as the engine-working fluid flows from the regenerator body c800 to the cold-side working-fluid pathways c1012. In some embodiments, the heat storage medium c1014 may include a plurality of fin arrays c1016; however, other heat storage medium may additionally or alternatively be utilized, including sensible heat storage and/or latent heat storage technologies. Other suitable heat storage medium may include packed beds, include molten salts, miscibility gap alloys, silicon materials (e.g., solid or molten silicon), phase change materials, and so forth.

The plurality of fin arrays c1016 include an array of high-surface area heat transfer fins having a thermally conductive relationship with engine-working fluid in the regenerator conduit c1000. As fluid flows from the hot-side working-fluid pathways c1010 into or through the regenerator conduit c1000, heat transfers to the heat storage medium 1014 (e.g., the plurality of fin arrays c1016), preserving thermal energy from being extracted ($Q_{OUT}$) at the chiller body (not shown) or other suitable cooling source. As fluid flows from the cold-side working-fluid pathways c1012 into or through the regenerator conduit c1000, heat transfers from the heat storage medium 1014 (e.g., the plurality of fin arrays c1016) back to the engine-working fluid, thereby returning thermal energy to the engine-working fluid flowing into the hot-side working-fluid pathways c1010.

Figure 3A:
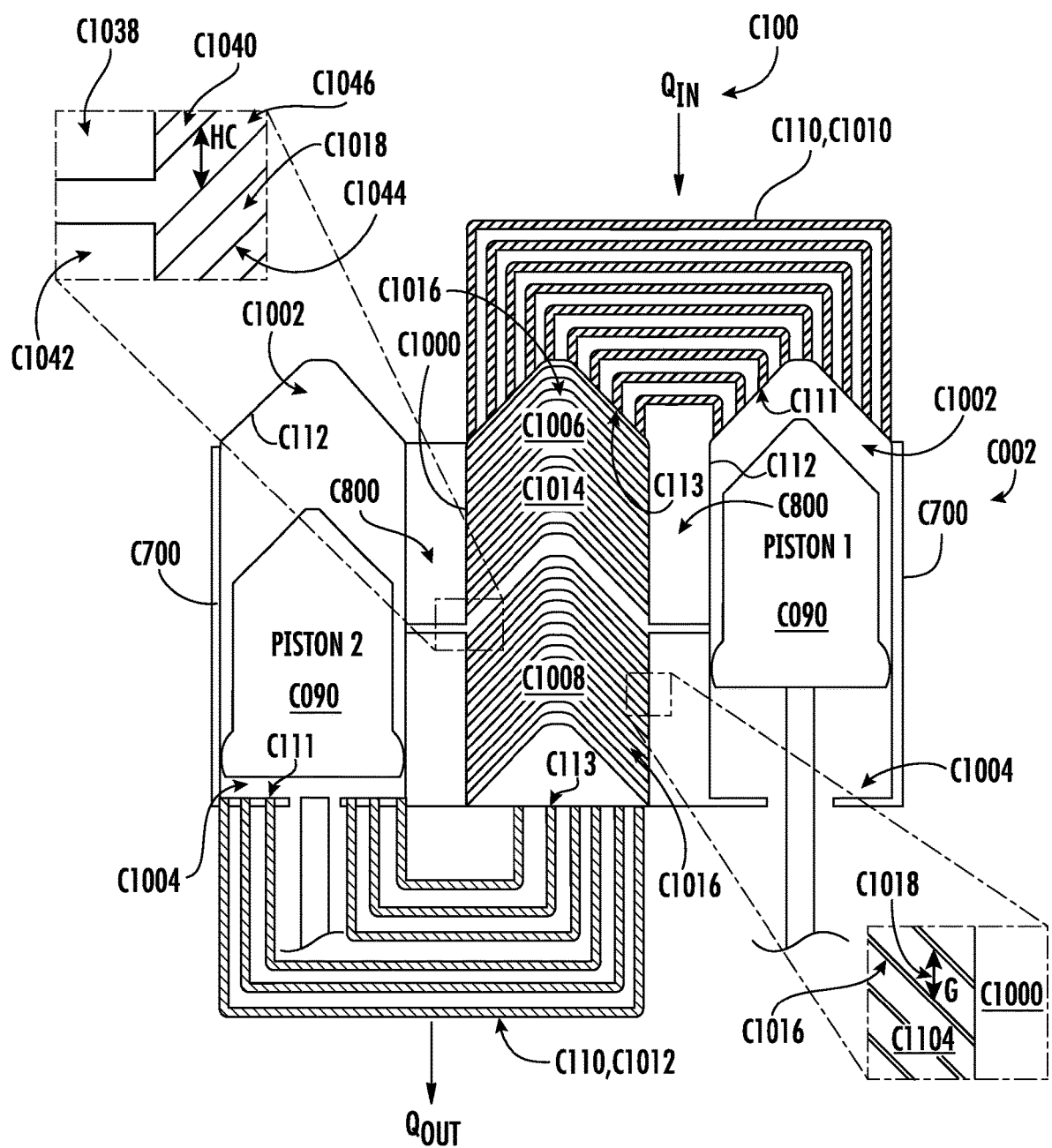
FIG. 3A schematically depicts an exemplary regenerator system of an engine according to an aspect of the present disclosure.
Figure 3B:
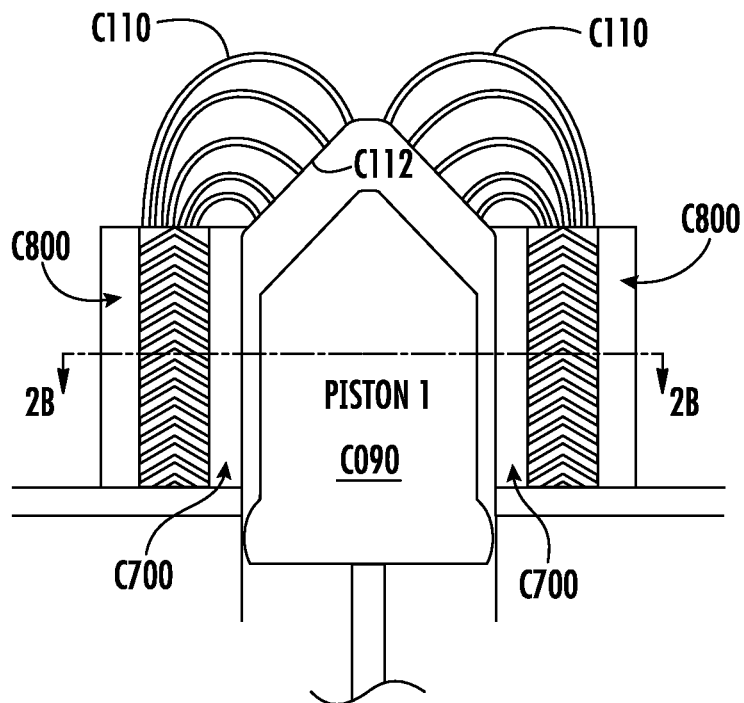
FIG. 3B schematically depicts a cross-sectional view of an exemplary regenerator body in relation to a portion of an engine according to an aspect of the present disclosure.
Figure 3C:
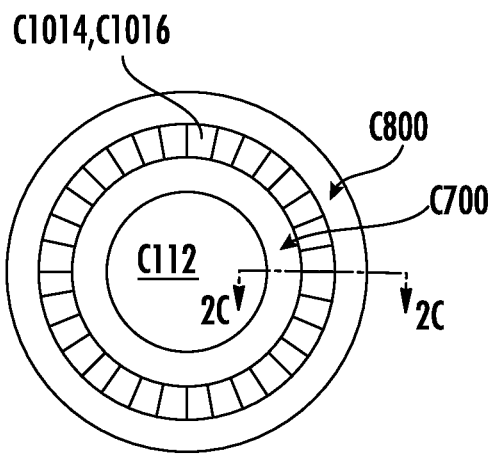
FIG. 3C schematically depicts a top cross-sectional view of the exemplary regenerator body of FIG. 3B.
Figure 3D:
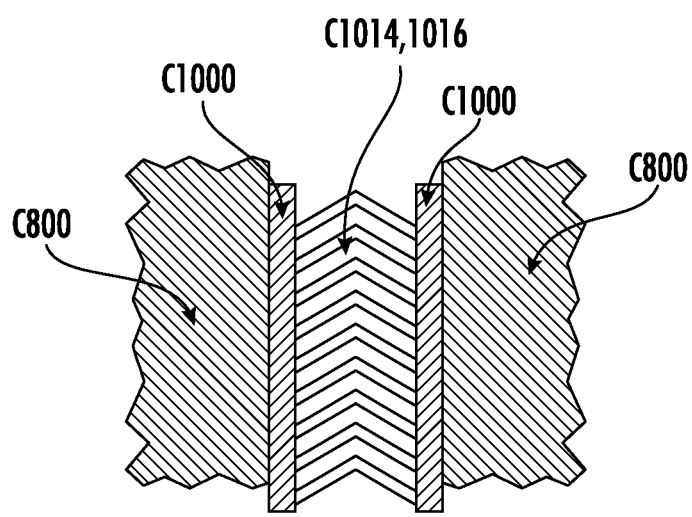
FIG. 3D schematically depicts an enlarged perspective cross-sectional view of the exemplary regenerator body of FIG. 3B.

Still referring to FIG. 3A, in some embodiments, a heat storage medium c1014 may include a plurality of fin arrays c1016 adjacently disposed within a regenerator conduit c1000. The plurality of fin arrays c1016 may be respectively supported by the regenerator conduit c1000 in spaced relation to one another. The spaced relation of the plurality of fin arrays c1016 may define a gap, G c1018 longitudinally separating adjacent ones of the plurality of fin arrays c1016.

Figure 4B:
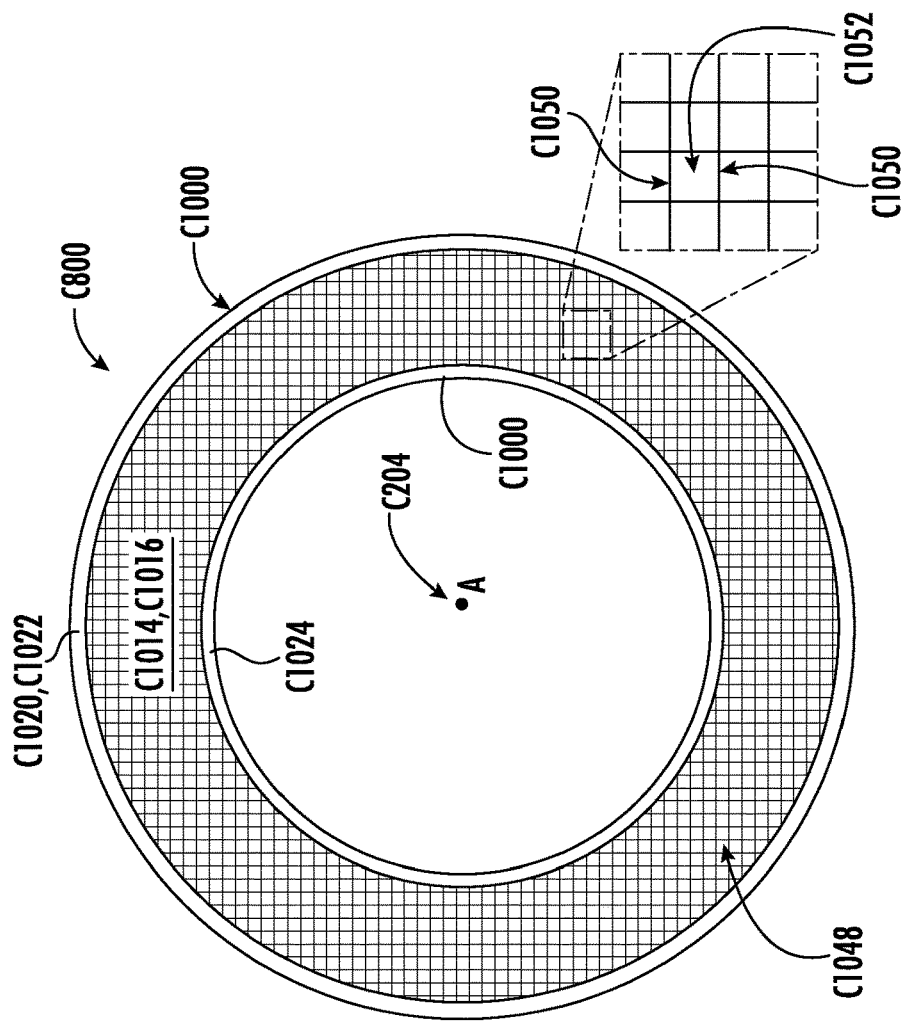
FIG. 4B schematically depicts a cross-sectional view of yet another exemplary regenerator body.
Figure 4A:
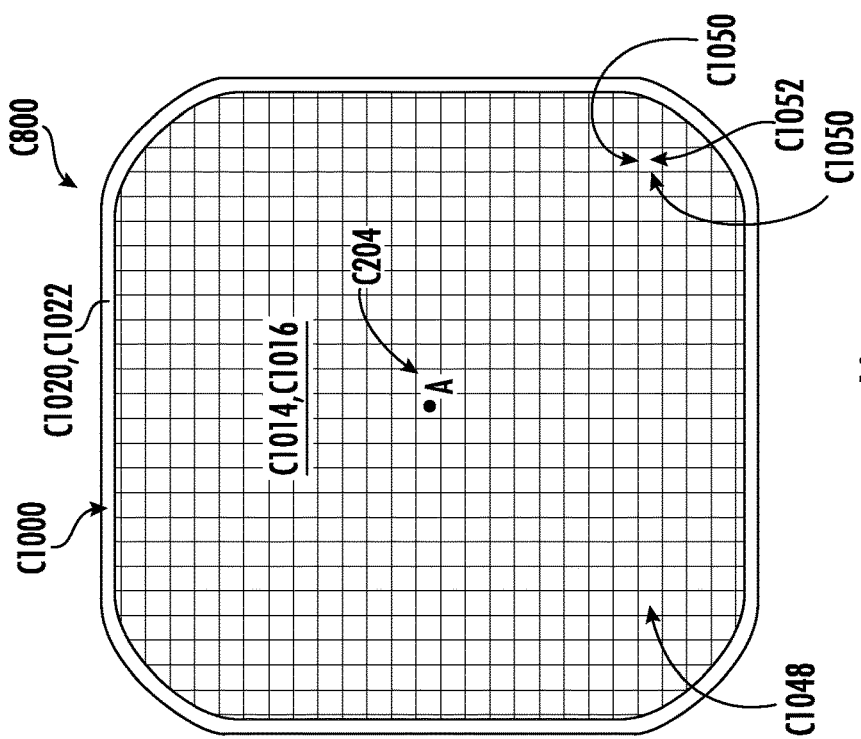
FIG. 4A schematically depicts a cross-sectional view of another exemplary regenerator body.
Figure 5:
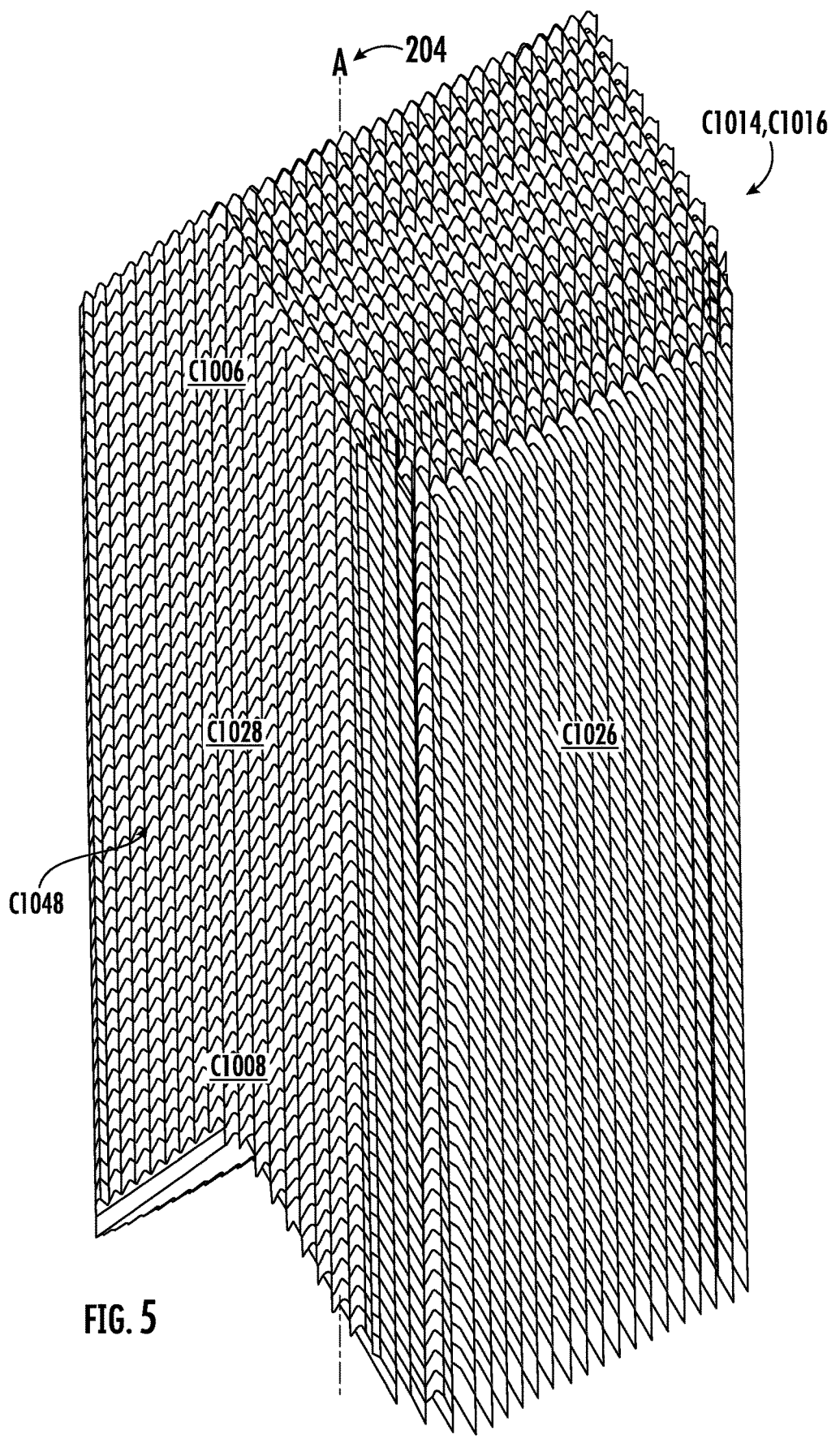
FIG. 5 schematically depicts a perspective view of a plurality of fin arrays that may be included in a regenerator body, such as the regenerator body shown in FIG. 3A or 3B.
Figure 6A:
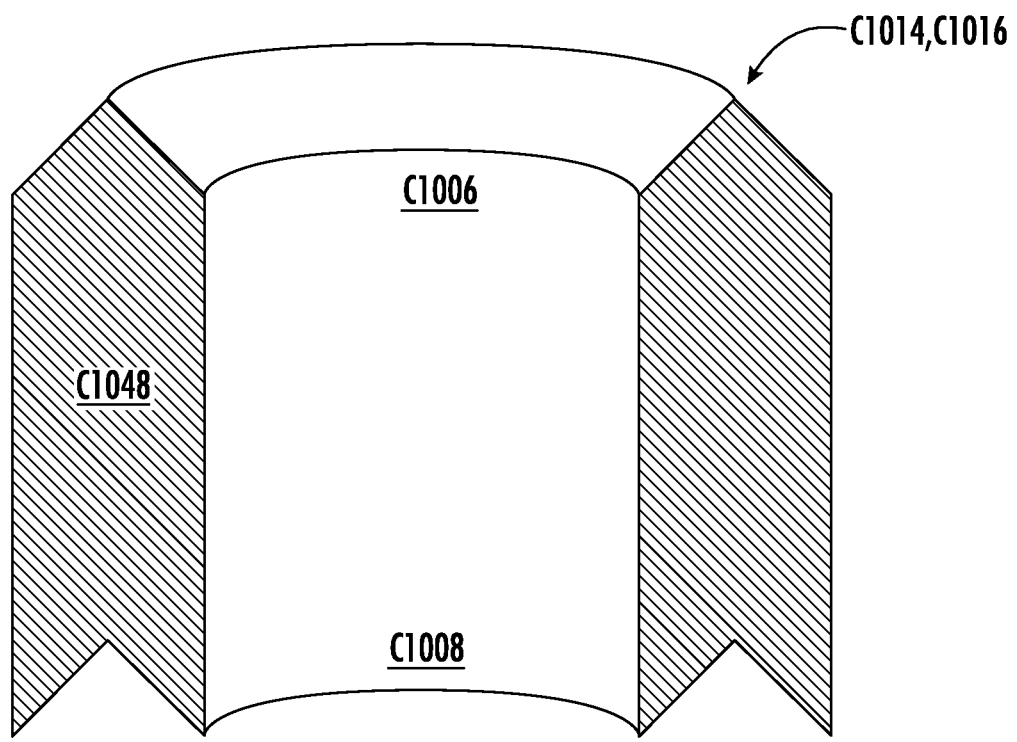
FIG. 6A schematically depicts a perspective cross-sectional view of another exemplary plurality of fin arrays that may be included in a regenerator body, such as the regenerator body shown in FIG. 4B.
Figure 6B:
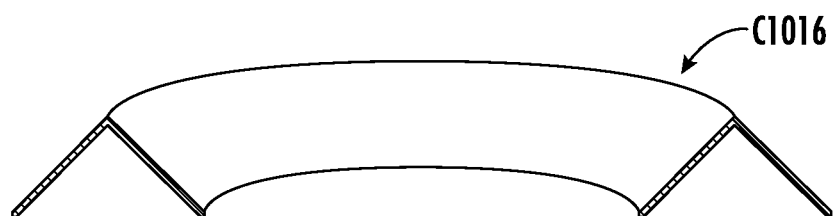
FIG. 6B schematically depicts an exemplary fin array from the exemplary plurality of fin arrays shown in FIG. 6A.

Referring now to FIGS. 4A and 4B, an exemplary regenerator conduits c1000 will be further described. As shown, an exemplary regenerator conduit c1000 may include a sidewall c1020, such as an annular sidewall c1020. The sidewall c1020 may circumferentially surround the heat storage medium c1014, such as the plurality of fin arrays c1016. As shown in FIG. 4B, in some embodiments, a regenerator conduit c1000 may define an annulus. For example, the regenerator conduit c1000 may include a radially outward sidewall c1022 and a radially inward sidewall c1024. The radially outward sidewall c1022 may circumferentially surround the heat storage medium c1014, such as the plurality of fin arrays c1016. The heat storage medium c1014, such as the plurality of fin arrays c1016, may circumferentially surround the radially inward sidewall c1024. The plurality of fin arrays c1016 may extend from the regenerator conduit c1000. FIG. 5 shows an exemplary heat storage medium c1014. The heat storage medium shown in FIG. 5 includes a plurality of fin arrays c1016, which may correspond to the regenerator body c800 shown in FIG. 4A. FIGS. 6A and 6B show another exemplary heat storage medium c1014, such as a plurality of fin arrays c1016, which may correspond to the regenerator body c800 shown in FIG. 4B.

As shown in FIG. 5, the regenerator conduit c100 circumferentially surrounding the heat storage medium c1014 (e.g., FIG. 4A) has been omitted to reveal details of the plurality of fin arrays c1016. As shown, a plurality of fin arrays c1016 may extend from at least a portion of the regenerator conduit c1000 obliquely towards a hot-side portion c1006 of the regenerator body c800. The regenerator conduit may be disposed about a longitudinal axis and the plurality of fin arrays c1016 may be supported by the regenerator conduit at least in part at an oblique angle relative to the longitudinal axis. For example, a first region c1026 of the plurality of fin arrays c1016 may extend obliquely from the regenerator conduit c1000 towards the hot-side portion c1006 of the regenerator body c800. Alternatively, the plurality of fin arrays c1016 may extent from at least a portion of the regenerator conduit c1000 obliquely towards a cold-side portion c1008 of the regenerator body c800. Additionally, or in the alternative, at least a portion of the plurality of fin arrays c1016 may extend perpendicularly from at least a portion of the regenerator conduit c1000. The plurality of fin arrays c1016 may be supported by the regenerator conduit c800 at least in part at a perpendicular angle relative to the longitudinal axis. For example, a second region c1028 of the plurality of fin arrays c1016 may extend perpendicularly from the regenerator conduit c1000.

Figure 7:
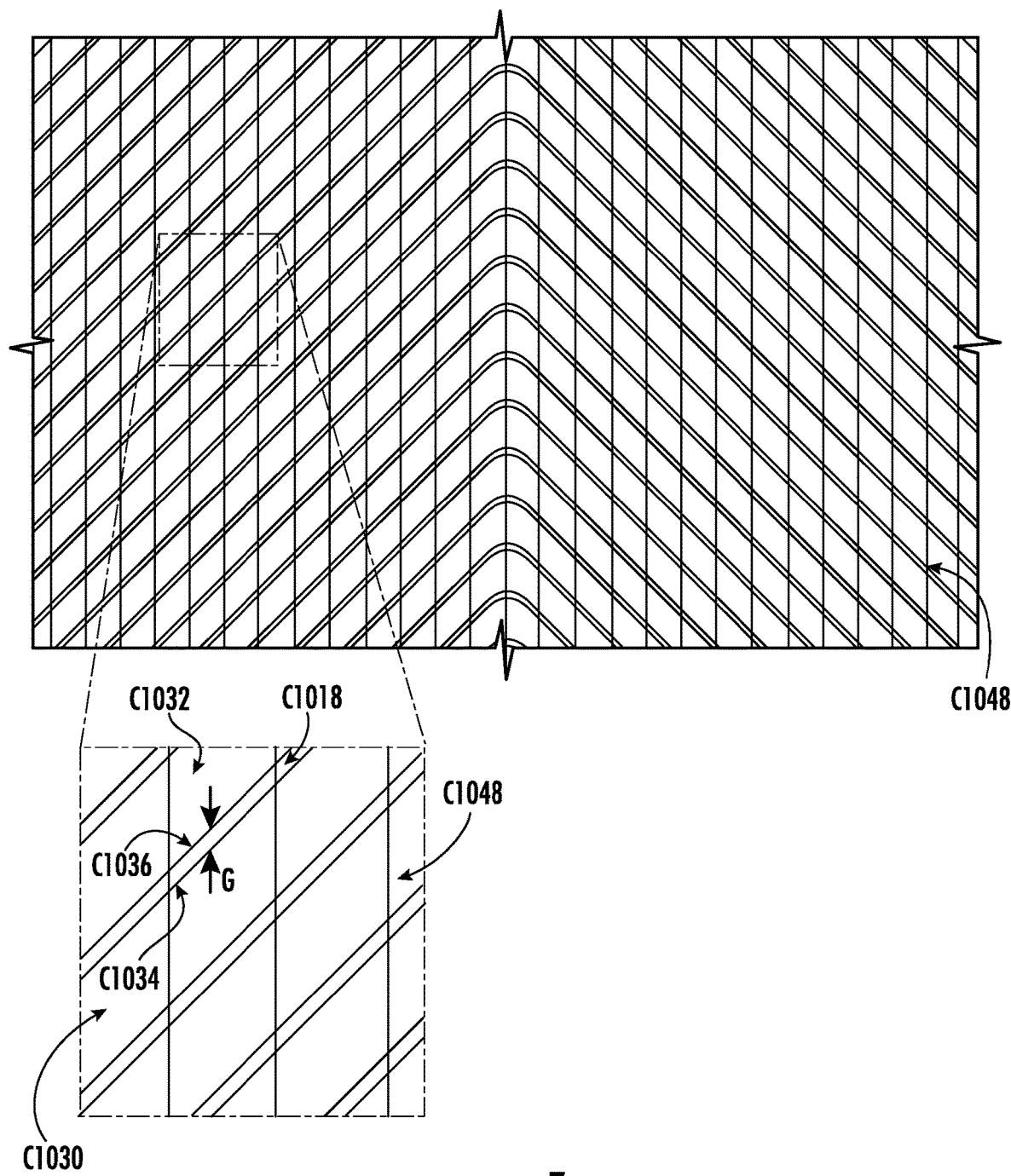
FIG. 7 schematically depicts a side view of the plurality of fin arrays shown in FIGS. 5 and/or 6A.
Figure 8A:
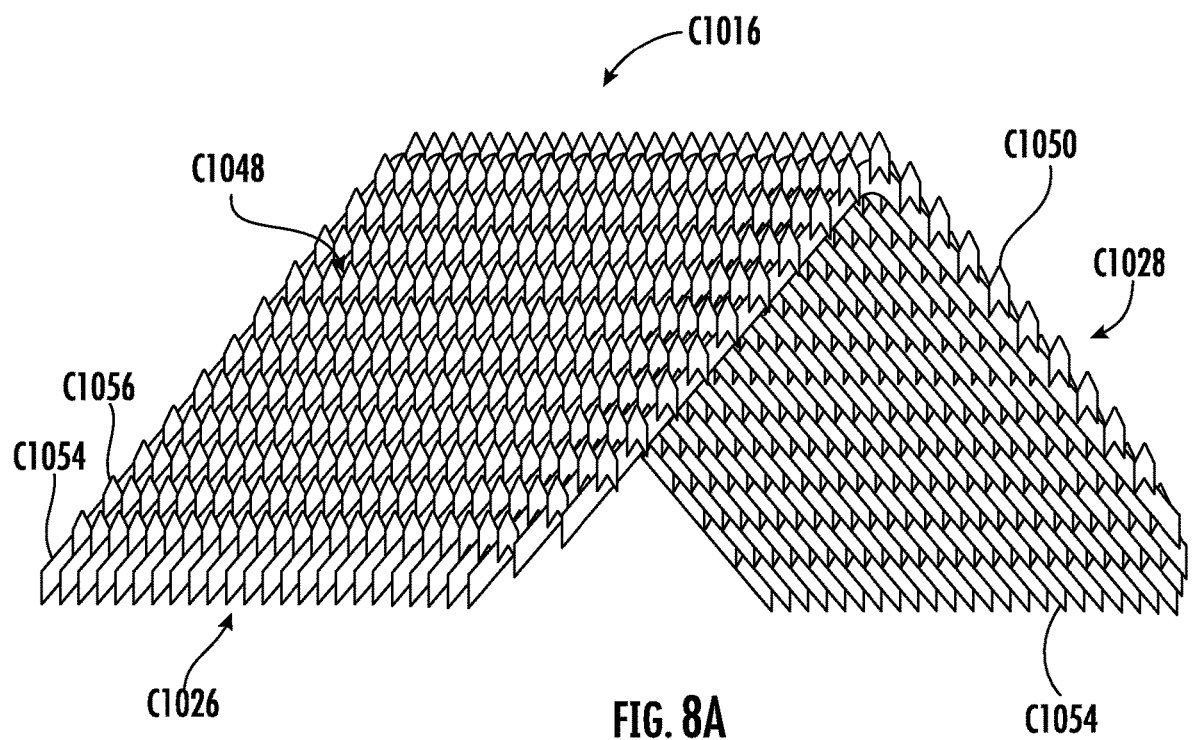
FIG. 8A schematically depicts a perspective view of a fin array from the plurality of fin arrays shown in FIG. 5.
Figure 8B:
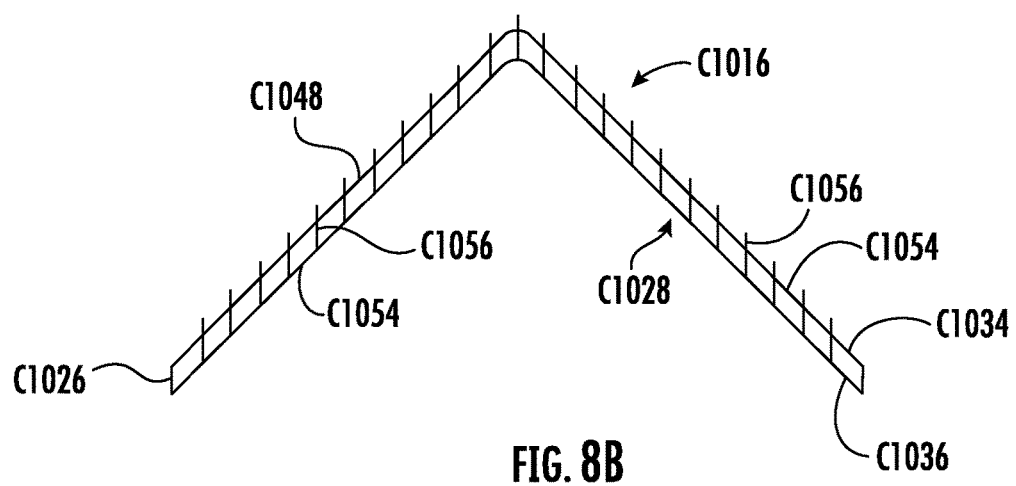
FIG. 8B schematically depicts a right-side view of the fin array shown in FIG. 8A.
Figure 8C:
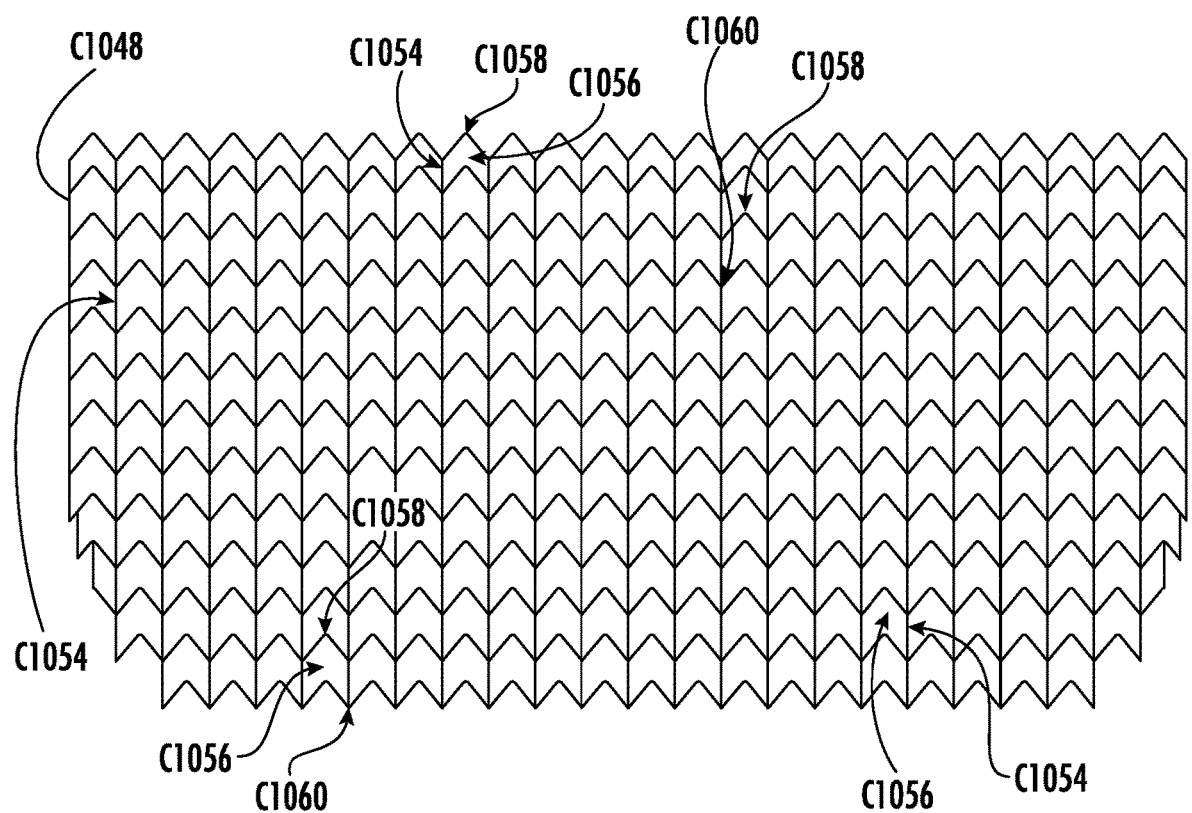
FIG. 8C schematically depicts a side view of the fin array viewing the fin array perpendicular to the perspective shown in FIG. 8A.
Figure 8D:
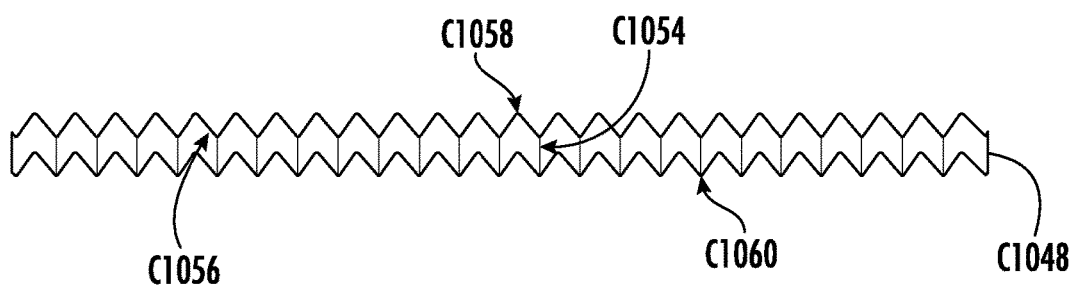
FIG. 8D schematically depicts a plurality of fins from the fin array shown in FIG. 8A viewed from the perspective shown in FIG. 8C.

FIG. 7 shows a side view of the plurality of fin arrays c1016, such as the fin arrays c1016 shown in FIG. 5 or in FIGS. 6A and 6B. As shown in FIG. 7, adjacent ones of the plurality of fin arrays c1016 may include a proximal fin array c1030 and a distal fin array c1032. The proximal fin array c1030 may have a distal surface c1034 and the distal fin array c1032 may have a proximal surface c1036. The distal surface c1034 may face the proximal surface c1036. The distal surface c1034 may be oriented towards the hot-side portion c1006 of the regenerator body c800 and the proximal surface c1036 may be oriented towards a cold-side portion c1008 of the regenerator body. The regenerator conduit c1000 may communicate with at least a portion of the distal surface c1034 and/or at least a portion of the proximal surface c1036 at an oblique angle. The oblique angle may be an acute angle or an obtuse angle. The acute angle may be from 1 degree to 89 degrees, such as from 10 degrees to 70 degrees, such as from 30 degrees to 60 degrees, such as from 40 degrees to 50 degrees. The obtuse angle may be from 91 to 179 degrees, such as from 100 to 160 degrees, such as from 120 to 150 degrees, such as from 130 to 140 degrees.

In some embodiments, at least some of the plurality of fin arrays c1016 may have a distal surface c1034 communicating with the regenerator conduit c1000 at an acute angle, with the distal surface c1034 oriented towards a hot-side portion c1006 of the regenerator body c800. The plurality of fin arrays c1016 may have a proximal surface c1036 communicating with the regenerator conduit c1000 at an obtuse angle, with the proximal surface c1036 oriented towards a cold-side portion c1008 of the regenerator body c800. Additionally, or in the alternative, at least some of the plurality of fin arrays c1016 may have a distal surface c1034 communicating with the regenerator conduit c1000 at an obtuse angle, with the distal surface c1034 oriented towards a hot-side portion c1006 of the regenerator body c800. The plurality of fin arrays c1016 may have a proximal surface c1036 communicating with the regenerator conduit c1000 at an acute angle, with the proximal surface c1036 oriented towards a cold-side portion c1008 of the regenerator body c800. Further in addition or in the alternative, at least some of the plurality of fin arrays c1016 may have a distal surface c1034 and/or a proximal surface c1036 communicating with the regenerator conduit c1000 at an angle perpendicular to the regenerator conduit c1000.

The distal surface c1034 of the proximal fin array c1030 and the proximal surface c1036 of the distal fin array c1032 may define a gap G c1018. Such a gap G c1018 may longitudinally separate the adjacent ones of the plurality of fin arrays c1016, such as the proximal fin array c1030 from the distal fin array c1032. The gap G c1018 may reduce or minimize thermally conductive heat transfer in the longitudinal direction of the regenerator body c800, for example, by separating respective ones of the plurality of fin arrays c1016 from one another. The gap G c1018 may longitudinally separate adjacent ones of the plurality of fin arrays c1016 by a longitudinal distance of from about 10 microns to about 1 millimeter, such as from about 10 microns to about 100 microns, such as from about 100 microns to about 500 microns, or such as from about 500 microns to about 1 millimeter. The gap G c1018 may be at least 10 microns, such as at least 100 microns, such as at least 500 microns, such as at least 1 millimeter. The gap G c1018 may be less than 1 millimeter, such as less than 500 microns, such as less than 100 microns, such as less than 10 microns. In some embodiments, the gap G c1018 may be selected so as to be at least a thick as a boundary layer of engine-working fluid deposed between the engine-working fluid and the surface of respective ones of the plurality of fin arrays. Such a boundary layer may isolate adjacent ones of the plurality of fin arrays c1016 from one another.

Referring again to FIG. 3A, in some embodiments, a regenerator body c800 may include a hot-side portion c1006 and a cold-side portion c1008. The hot-side portion c1006 may be operably coupled and fluidly communicate with the cold-side portion c1008. The hot-side portion c1006 of the regenerator body c800 may include a hot-side regenerator conduit c1038 and a hot-side plurality of fin arrays c1040 adjacently disposed within the hot-side regenerator conduit c1038 in spaced relation to one another. The cold-side portion c1008 of the regenerator body c800 may include a cold-side regenerator conduit c1042 and a cold-side plurality of fin arrays c1044 adjacently disposed within the cold-side regenerator conduit c1042 in spaced relation to one another.

The hot-side portion c1006 and the cold-side portion c1008 of the regenerator body c800 may be separated by a hot-to-cold gap H-C c1038. For example, in some embodiments, the spaced relation (e.g., the hot-to-cold gap H-C c1046) of the hot-side plurality of fin arrays c1040 to the cold-side plurality of fin arrays c1044 may define a hot-to-cold gap H-C c1038 longitudinally separating the hot-side plurality of fin arrays c1040 from the cold-side plurality of fin arrays c1042. Additionally, or in the alternative, the hot-side regenerator conduit c1038 and the cold-side regenerator conduit c1042 may be in the spaced relation to one another, further defining the hot-to-cold gap H-C c1046. The hot-to-cold gap H-C c1046 may reduce or minimize thermally conductive heat transfer between the hot-side portion c1006 and the cold-side portion c1008 of the regenerator body c800. In some embodiments, the hot-to-cold gap H-C c1046 may allow a regenerator body c800 to provide at least two thermally distinct thermal storage bodies within the same regenerator body c800.

In some embodiments, a fin array may define a lattice c1048. The lattice c1048 may include a plurality of lattice walls c1050 defining polyhedral passages c1052 therebetween. Such lattice walls c1050 and polyhedral passages c1052 as shown, for example, in FIGS. 4A and 4B. The regenerator conduit c1000 may be disposed about a longitudinal axis A c204, and the lattice walls c1050 may be oriented parallel to the longitudinal axis A c204. The polyhedral passages c1052 may have a polygonal cross-section. By way of example, the polyhedral passages c1050 may have a shape such as a rhombohedron, a right prism, an oblique prism, a frustum, or a cylinder, as well as combinations of these.

Now turning to FIGS. 8A through 8D, exemplary fin arrays c1016 will be further described. As shown, in some embodiments, a fin array c1016 may include a plurality of fin supports c1054 and a plurality of fins c1056 together defining an array of interconnected fins c1056 and fin supports c1054. The interconnected fins c1056 and fin supports c1054 may define a lattice c1048 as described herein. A plurality of fin supports c1054 may be disposed laterally and a plurality of fins c1056 may be disposed between adjacent ones of the laterally disposed fin supports c1054. In some embodiments, the plurality of fin supports c1054 may extend obliquely from the regenerator conduit c1000. The regenerator conduit c1000 may be disposed about a longitudinal axis A c204 and the plurality of fin supports c1054 may be supported by the regenerator conduit c1000 at least in part at an oblique angle relative to the longitudinal axis A c204. As shown, the oblique angle may be oriented towards a hot-side portion c1006 of the regenerator body c800. Alternatively, the oblique angle may be oriented towards a cold-side portion c1008 of the regenerator body c800.

The fin supports c1054 may have a distal surface c1034 communicating with the regenerator conduit c1000 at an acute angle, with the distal surface c1034 oriented towards a hot-side portion c1006 of the regenerator body c800. The fin supports c1054 may have a proximal surface c1036 communicating with the regenerator conduit c1000 at an obtuse angle, with the proximal surface c1036 oriented towards a cold-side portion c1008 of the regenerator body c800. Additionally, or in the alternative, at least some of the fin supports c1054 may have a distal surface c1034 communicating with the regenerator conduit c1000 at an obtuse angle, with the distal surface c1034 oriented towards a hot-side portion c1006 of the regenerator body c800. The fin supports c1054 may have a proximal surface c1036 communicating with the regenerator conduit c1000 at an acute angle, with the proximal surface c1036 oriented towards a cold-side portion c1008 of the regenerator body c800. Further in addition or in the alternative, at least some of the fin supports c1054 may have a distal surface c1034 and/or a proximal surface c1036 communicating with the regenerator conduit c1000 at an angle perpendicular to the regenerator conduit c1000.

The regenerator conduit c1000 may communicate with at least a portion of the fin supports c1054 (e.g., a distal surface c1034 and/or a proximal surface c1036 thereof) at an oblique angle. The oblique angle may be an acute angle or an obtuse angle. The acute angle may be from 1 degree to 89 degrees, such as from 10 degrees to 70 degrees, such as from 30 degrees to 60 degrees, such as from 40 degrees to 50 degrees. The obtuse angle may be from 91 to 179 degrees, such as from 100 to 160 degrees, such as from 120 to 150 degrees, such as from 130 to 140 degrees.

In some embodiments, at least a portion of the plurality of fins c1056 may extend perpendicularly from the regenerator conduit c1000. For example, the regenerator conduit c1000 may be disposed about a longitudinal axis A c204 and the plurality of fins c1056 may be supported at least in part by the regenerator conduit c1000 at a perpendicular angle relative to the longitudinal axis A c204. Additionally, or in the alternative, the plurality of fins c1056 may be supported at least in part by the fin supports c1054 at a perpendicular angle relative to the longitudinal axis A c204.

The plurality of fins c1056 may extend from the plurality of fin supports c1054, such as along the longitudinal axis c204. In some embodiments, the fins c1056 may have a chevron shape. The chevron shape may include a tip c1058 oriented towards a hot-side portion c1006 of the regenerator body c800 and/or a tail c1060 oriented towards a cold-side portion c1008 of the regenerator body c800.

While the fins c1056 may extend from the plurality of fin supports c1054, a gap G c1018 may longitudinally separate adjacent fins c1056 and/or fin supports c1054 respectively corresponding to adjacent fin arrays c1016. For example, the gap G 1018 may longitudinally separate the tips c1058 of a proximal fin array c1030 from the tails c1060 of a distal fin array c1032.

As described herein, at least a portion of a regenerator body c800 may define an additively manufactured monolithic body or an additively manufactured monolithic body-segment. The regenerator body c800 may define a portion of a larger monolithic body or monolithic body segment, or the regenerator body c800 may define a module insertable into a monolithic body or a monolithic body-segment. In some embodiments, the plurality of fin arrays c1016 may be monolithically integrated with the regenerator conduit c100. For example, the array of interconnected fins c1056 and fin supports c1058 may define a monolithic structure such as a portion of a monolithic body or monolithic body-segment.

A regenerator body c800 may be formed of one or more materials selected at least in part on one or more thermal storage properties. For example, one or more materials may be selected for a regenerator body c800 based at least in part on a thermal conductivity and/or a heat capacity of the material. In some embodiments, the plurality of fin arrays c1016 may include a first material and the regenerator conduit may include a second material that differs from the first material. For example, the thermal conductivity of the first material may exceed the thermal conductivity of the second material. Additionally, or in the alternative, the heat capacity of the first material may exceed the heat capacity of the second material. In some embodiments, the plurality of fin arrays c1016 may include a material selected for thermal conductivity and/or the regenerator conduit c1000 may include a material selected for thermal resistivity. In an exemplary embodiment, the plurality of fin arrays c1016 may include a metal or metal alloy, and the regenerator conduit c1000 may include a ceramic. In other embodiments, the regenerator conduit c1000 may additionally or alternatively include a metal or metal alloy, and/or the plurality of fin arrays c1016 may include a ceramic.

Exemplary metal or metal alloys may be selected for high thermal conductivity and/or heat capacity properties. Suitable metal or metal alloys may include copper, aluminum, tin, zinc, nickel, chromium, titanium, tellurium, magnesium, and/or iron. In some embodiments, the metal or metal alloy may include a rare earth element. Exemplary copper alloys may include CuSn, CuZn, CuZnAs, CuZnP, CuZnFe, CuZnNi, CuCr, and/or CuTeSn.

Exemplary ceramics may be selected for low thermal conductivity and/or heat capacity properties. Suitable ceramics may include alumina, beryllia, ceria, and/or zirconia. In some embodiments, the ceramic may include a carbide, a boride, a nitride, and/or a silicide.

Now turning to FIGS. 9A-9F, further exemplary regenerator bodies c800 will be described. As shown, a regenerator body c800 may include a sidewall c1020, such as a sidewall c1020. The sidewall c1020 may include an internal-sidewall c1062 and an external-sidewall c1064. The internal-sidewall c10162 and the external-sidewall c1064 may be spaced apart from one another with a voidspace c1066 defined therebetween. The voidspace c1066 may provide thermal resistance to heat flow from the sidewall c1020 to structures or environment adjacent to or surrounding the sidewall c1020. The voidspace c1066 may include an open space, such as airgap or a vacuum. The voidspace c1066 may include any gas, such as ambient air, an inert gas, etc. The voidspace c1066 may additionally or alternatively include any material that provides thermal resistance to heat flow, such as unsintered or partially sintered powder material (e.g., an additive manufacturing powder material), a mesh, a three-dimensional lattice, a porous medium, or the like.

The overall thermal response of a regenerator body c800 may be configured based at least in part on the configuration of the regenerator body c800, including the geometric properties and/or the material properties of the regenerator body. For example, a regenerator body c800 may be configured to provide a high amount of heat transfer between the regenerator body and an engine-working fluid, while also exhibiting a low amount of heat loss from the hot-side to the cold-side. In some embodiments, regenerator efficiency may be improved by increasing the effective length of the regenerator conduit c1000, such as by providing a regenerator conduit c1000 with a gradient in cross-sectional area and/or by providing sidewalls c1020 with a gradient in wall thickness, and/or material density or porosity. The gradient may be oriented along a longitudinal axis and/or a radial axis of the regenerator conduit c1000. Additionally, or in the alternative, regenerator efficiency may be improved by augmenting the configuration and/or composition of the heat storage medium c1014 in the regenerator conduit c1000. For example, the heat storage medium c1014 may include material (such as fin arrays c1016) with a gradient in thickness and/or surface area and/or material porosity. Regenerator efficiency may additionally or alternatively be improved by augmenting an interface between the regenerator conduit c100 and the heat storage medium c1014.

In some embodiments, a regenerator body c800 may include a sidewall c1020, a regenerator conduit c1000, and a heat storage medium c1014 disposed within the regenerator conduit c800. The sidewall c1020 may have a gradient in gradient in cross-sectional thickness and/or material thickness oriented along a longitudinal axis of the regenerator conduit c1000. Additionally, or in the alternative, the sidewall c1020 may have a gradient in surface area, and/or material density or porosity, oriented along a longitudinal axis and/or a radial axis of the regenerator conduit c1000. The regenerator conduit c1000 may have a gradient in cross-sectional thickness and/or material thickness oriented along a longitudinal axis of the regenerator conduit c1000. Additionally, or in the alternative, the regenerator conduit c1000 may have a gradient in surface area, and/or material density or porosity, oriented along a longitudinal axis and/or a radial axis of the regenerator conduit c1000. The heat storage medium c1014 may have a gradient in cross-sectional thickness, material thickness, surface area, and/or material density or porosity, oriented along a longitudinal axis of the regenerator conduit c1000. By way of example, a heat storage medium that includes a plurality of fin arrays c1016 may include a gradient in one or more properties of respective fins and/or fin arrays in the plurality of fins arrays. Such gradient may include a gradient in dimensions (e.g., size and/or material thickness of a fin and/or fin array), material density or porosity (e.g., density or porosity of a fin and/or fin array), quantity (e.g., quantity of fins in a fin array and/or quantity of fin arrays per unit area and/or unit length of the regenerator conduit c1000). It will be appreciated that the respective gradients described herein may be oriented in any desirable direction or combination of directions. Additionally, or in the alternative, different gradients may be combined with one another, each which being oriented in any respective desired direction or combination of directions, including different directions from one another.

The transfer of heat between a regenerator body c800 and engine-working fluid flowing through the regenerator conduit c1000, such as between engine-working fluid flowing through the regenerator conduit and the heat storage medium c1014 and/or the sidewalls c1020 (and/or between the heat storage medium c1014 and the sidewalls c1020) is generally proportional to the heat flux ($q=h\Delta T$) at respective areas or points of heat transfer. While the heat flux may vary under transient conditions, the heat transfer properties of a regenerator body c800 or a portion thereof may be described by a heat transfer time-constant, $\tau$ (tau), which has units of seconds, according to the following equation: $\tau = \rho c_p V/hA$, where $\rho$ is density, $c_p$ is the heat capacity, V is volume of the body, h is the heat transfer coefficient, and A is the surface area. According to the heat transfer time-constant, larger masses (p V) and larger heat capacities ($c_p$) lead to slower changes in temperature, whereas larger surface areas (A) and better heat transfer (h) lead to faster temperature changes.

One or more portions of a regenerator body c800 may be configured to provide a desired heat transfer time-constant ($\tau$). One or more portions of a regenerator body c800 may be configured with a time-constant ($\tau$) selected based at least in part on the expected heat flux ($q=h\Delta T$) as between the one or more portions of the regenerator body c800 and engine-working fluid flowing through the regenerator body c800 under given operating conditions. Additionally, or in the alternative, the one or more regions of the regenerator body c800 may be configured with a time-constant ($\tau$) selected based at least in part on the expected heat flux ($q=h\Delta T$) as between the one or more regions of the regenerator bod c800 under given operating conditions. Given a heat transfer time-constant and an initial temperature difference ($\Delta T_i$), the total energy transfer Q can be described by the equation:

$$Q = \int_0^t q\,dt = hA\int_0^t \theta\,dt = (\rho V c_p)\Delta T_i[1-e^{-t/\tau}].$$

In some embodiments, a regenerator body c800 may include one or more geometric parameters and/or one or more material properties that differ as between one or more portions of the regenerator body c800 and/or that vary and/or change across a portion of the regenerator body c800. Such geometric parameters and/or material properties may be configured to provide a desired heat transfer time-constant ($\tau$) for one or more respective portions of the regenerator body c800. A first regenerator body-portion c1068 (such as a hot-side portion c1006) may have a first heat transfer time-constant ($\tau_1$) and a second regenerator body-portion c1070 (such as a cold-side portion c1008) may have a second heat transfer time-constant ($\tau_2$). Such geometric parameters and/or material properties may be selected at least in part to provide a first heat transfer time-constant ($\tau_1$) corresponding to the first regenerator body-portion c1068 and/or a second heat transfer time-constant ($\tau_2$) corresponding to the second regenerator body-portion c1070 that differ from one another. Additionally, and/or in the alternative, one or more portions of a regenerator body c800 may have a heat transfer time-constant gradient ($\Delta\tau$) across the respective one or more portions of the regenerator body. The heat transfer time-constant gradient ($\Delta\tau$) may be oriented along a longitudinal axis of a regenerator conduit c1000, a radial axis of the regenerator conduit c1000, and/or an axis corresponding to one or more of a plurality of fin arrays c1016 disposed within the regenerator conduit c1000.

In some embodiments, the first regenerator body-portion c1068 and the second regenerator body-portion c1070 may have congruent heat transfer time-constants ($\tau_c$) as between one another. Additionally, or in the alternative, one or more portions of a regenerator body c800 may have a congruent heat transfer time-constant gradient ($\Delta\tau_c$). Such congruent heat transfer time-constants ($\tau_c$) and/or such a congruent heat transfer time-constant gradient ($\Delta\tau_c$) may be attributable at least in part to one or more geometric parameters and/or one or more material properties that differ as between one or more portions of the regenerator body c800 and/or that vary and/or change across a respective portion of the regenerator body c800.

As described herein, respective portions of a regenerator body c800 are considered to have congruent heat transfer time-constants ($\tau_c$) when a difference in heat flux ($q_1-q_2$) corresponding to the respective heat transfer time-constants ($\tau$) is less than would be the case if not for one or more geometric parameters, and/or one or more material properties, that differ as between the respective portions of the regenerator body c800. For example, one or more geometric properties and/or one or more material properties may differ as between a hot-side portion c1006 and a cold-side portion c1008 of a regenerator body c800 such that the hot-side portion c1006 and the cold-side portion c1008 are considered to have congruent heat transfer time-constants ($\tau_c$), because a difference in heat flux ($q_{hot}-q_{cold}$) as between the hot-side portion c1006 and the cold-side portion c1008 is less than would be the case if not for one or more geometric parameters, and/or one or more material properties, being configured to differ as between the hot-side portion c1006 and the cold-side portion c1008.

In some embodiments, a regenerator body c800 may have congruent heat transfer time-constants ($\tau$) in which a difference in heat flux between the hot-side portion c1006 and the cold-side portion c1008 ($q_{hot}-q_{cold}$) is 30% or less, such as 20% or less, such as 10% or less, such as 5% or less, or such as 1% or less, with an engine-working fluid entering the hot-side portion c1006 at 900 C and the engine-working fluid entering the cold-side portion c1008 at 90 C. Helium may be utilized as the engine-working fluid. The respective heat transfer time-constants (τ) of the hot-side portion c1006 and the cold-side portion c1008 may be determined at respective midpoints of the hot-side portion c1006 and the cold-side portion c1008. Additionally, or in the alternative, the respective heat transfer time-constants (τ) of the hot-side portion c1006 and the cold-side portion c1008 may be determined by integrating a heat transfer time-constant (τ) across a longitudinal axis of a regenerator conduit c1000, a radial axis of the regenerator conduit c1000, and/or an axis corresponding to one or more of a plurality of fin arrays c1016 disposed within the regenerator conduit c1000. The heat flux of the hot-side portion c1006 and the cold-side portion c1008 may be determined from a temperature difference (ΔT) at respective midpoints of the hot-side portion c1006 and the cold-side portion c1008. Additionally, or in the alternative, respective heat flux may be determined by integrating a temperature difference (ΔT) across a longitudinal axis of a regenerator conduit c1000, a radial axis of the regenerator conduit c1000, and/or an axis corresponding to one or more of a plurality of fin arrays c1016 disposed within the regenerator conduit c1000.

As described herein, a portion of a regenerator body c800 is considered to have a congruent heat transfer time-constant gradient ($\Delta\tau_c$) when a heat flux gradient (Δq/l) across the respective portion of the regenerator body c800 is less than would be the case if not for one or more geometric parameters, and/or one or more material properties, that vary and/or change across the respective portion of the regenerator body c800. For example, one or more geometric properties and/or one or more material properties may vary and/or change across a hot-side portion c1006 of a regenerator body c800 such that the hot-side portion c1006 is considered to have congruent heat transfer time-constant gradient ($\Delta\tau_c$) because a heat flux gradient (Δq/l) across the hot-side portion c1006 is less than would be the case if not for the one or more geometric parameters, and/or the one or more material properties, being configured to vary and/or change across the hot-side portion c1006. As another example, one or more geometric properties and/or one or more material properties may vary and/or change across a cold-side portion c1008 of a regenerator body c800 such that the cold-side portion c1008 is considered to have congruent heat transfer time-constant gradient ($\Delta\tau_c$) because a heat flux gradient (Δq/l) across the cold-side portion c1008 is less than would be the case if not for the one or more geometric parameters, and/or the one or more material properties, being configured to vary and/or change across the cold-side portion c1008. A congruent heat transfer time-constant gradient ($\Delta\tau_c$) may be oriented along a longitudinal axis of a regenerator conduit c1000, a radial axis of the regenerator conduit c1000, and/or an axis corresponding to one or more of a plurality of fin arrays c1016 disposed within the regenerator conduit c1000.

In some embodiments, a portion of a regenerator body c800 may have a congruent heat transfer time-constant gradient ($\Delta\tau_c$) in which a heat flux gradient (Δq/l) is 0.3 or less, such as 0.2 or less, such as 0.1 or less, such as 0.05 or less, or such as 0.01 or less, with an engine-working fluid entering the hot-side portion c1006 at 900 C and the engine-working fluid entering the cold-side portion c1008 at 90 C. Helium may be utilized as the engine-working fluid. The heat transfer time-constant gradient ($\Delta\tau_c$) may be determined from a plurality of points across the respective portion of the regenerator body c800. Additionally, or in the alternative, the heat transfer time-constant gradient ($\Delta\tau_c$) may be determined by integrating a heat transfer time-constant (τ) across a longitudinal axis of a regenerator conduit c1000, a radial axis of the regenerator conduit c1000, and/or an axis corresponding to one or more of a plurality of fin arrays c1016 disposed within the regenerator conduit c1000. The heat flux gradient (Δq/l) may be determined from a temperature gradient (ΔT/l) across the respective portion of the regenerator body c800. Additionally, or in the alternative, the heat flux gradient (Δq/l) may be determined by integrating a temperature gradient (ΔT/l) across a longitudinal axis of a regenerator conduit c1000, a radial axis of the regenerator conduit c1000, and/or an axis corresponding to one or more of a plurality of fin arrays c1016 disposed within the regenerator conduit c1000.

Figure 9B:
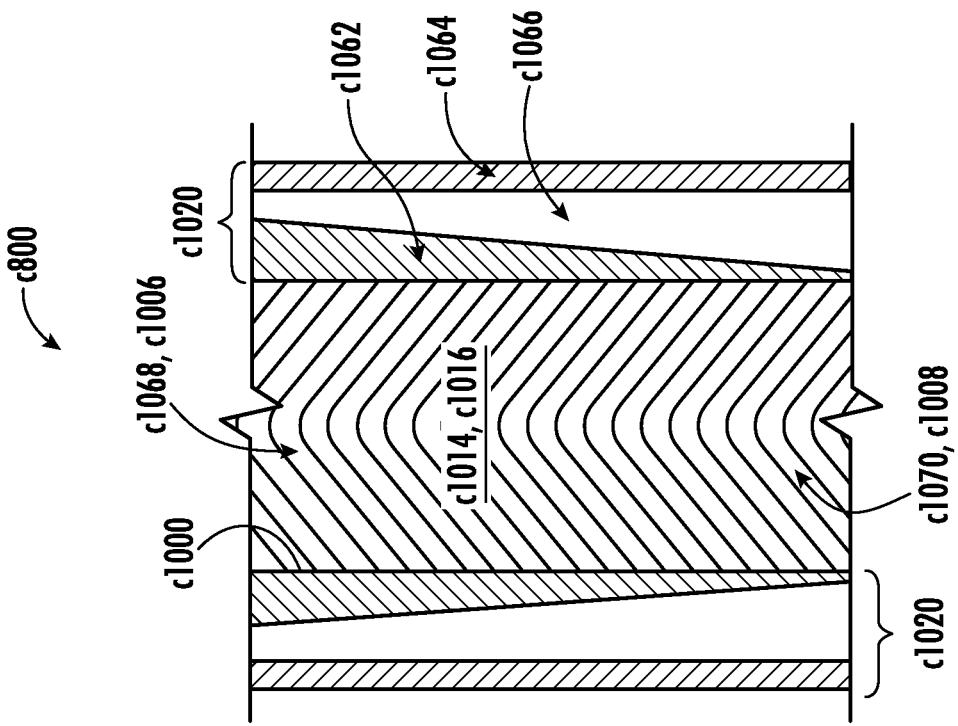
FIGS. 9A-9F schematically depict exemplary regenerator body configurations.
Figure 9A:
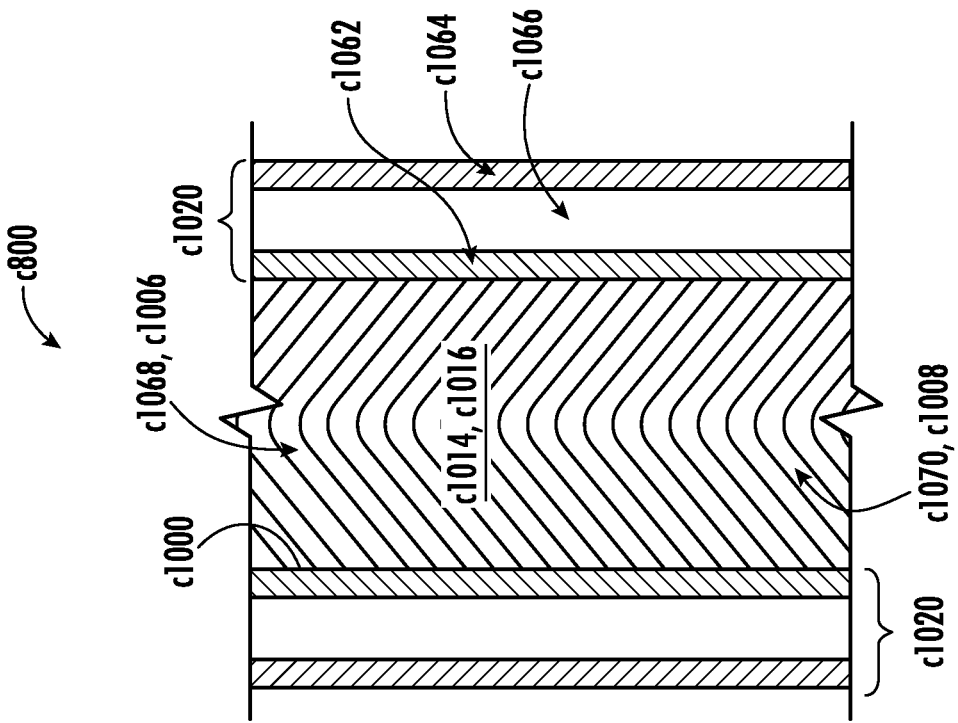

In some embodiments, as shown, for example, in FIG. 9A, a regenerator body c800 may have substantially uniform geometry as between a first regenerator body-portion c1068 (such as a hot-side portion c1006) and a second regenerator body-portion c1070 (such as a cold-side portion c1008). The regenerator body c800 may include a sidewall c1020 a substantially uniform cross-sectional thickness as between a first regenerator body-portion c1068 (such as a hot-side portion c1006) and a second regenerator body-portion c1070 (such as a cold-side portion c1008). Additionally, or in the alternative, a regenerator body c800 may include a regenerator conduit c1000 and/or a heat storage medium c1014 that has a substantially uniform cross-sectional thickness as between the first regenerator body-portion c1068 and the second regenerator body-portion c1070. The heat storage medium c1014 may have a substantially uniform configuration, such as a substantially uniform lattice c1048, as between at least part of the first regenerator body-portion c1068 (such as a hot-side portion c1006) and at least part of the second regenerator body-portion c1070 (such as a cold-side portion c1008).

In some embodiments, as shown, for example, in FIGS. 9B-9F, a regenerator body c800 may have one or more geometric parameters that differ and/or vary as between a first regenerator body-portion c1068 (such as a hot-side portion c1006) and a second regenerator body-portion c1070 (such as a cold-side portion c1008), and/or along a longitudinal axis extending therebetween. The heat storage medium c1014 may have one or more geometric parameters that differ and/or vary, such as a lattice c1048 with one or more geometric parameters that differ and/or vary, as between at least part of the first regenerator body-portion c1068 (such as a hot-side portion c1006) and at least part of the second regenerator body-portion c1070 (such as a cold-side portion c1008). Additionally, or in the alternative, one or more portions of a generator body c800 may differ and/or vary in respect of one or more material properties, such as composition, heat capacity, density, and/or mass, as between a first regenerator body-portion c1068 (such as a hot-side portion c1006) and a second regenerator body-portion c1070 (such as a cold-side portion c1008), and/or along a longitudinal axis extending therebetween.

Figure 9D:
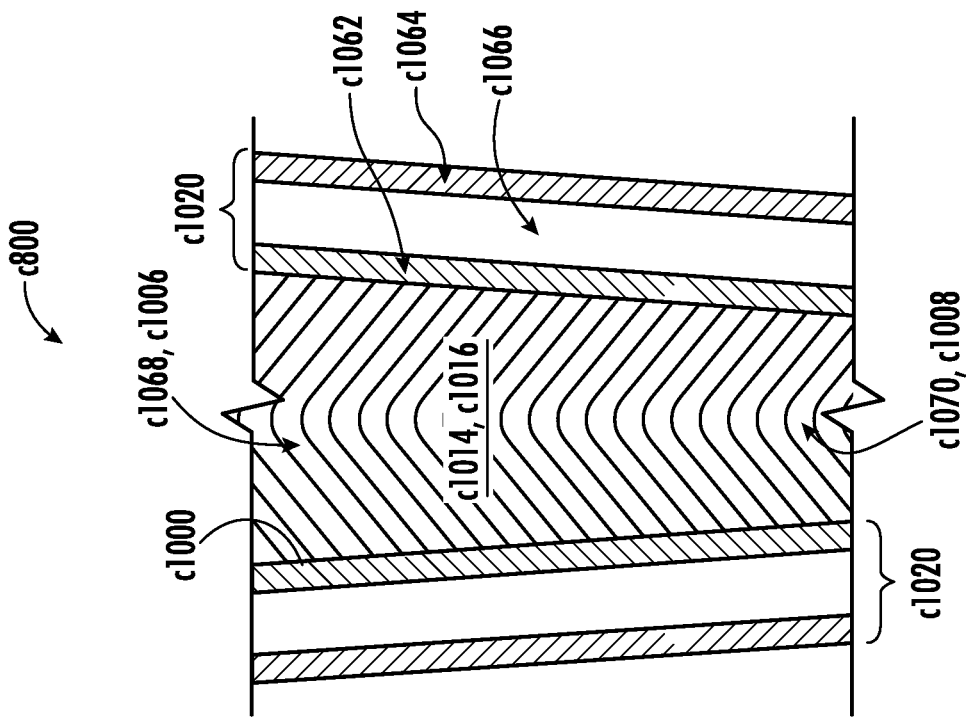
Figure 9C:
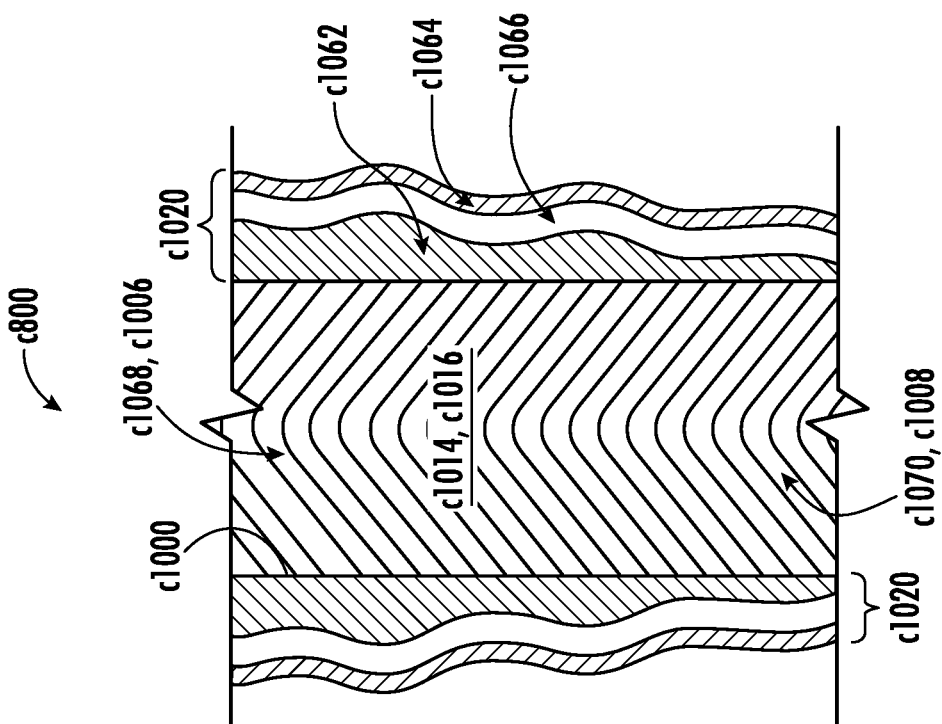

As shown in FIGS. 9B and 9C, a regenerator body c800 may have a sidewall c1020 with at least one aspect that differs and/or varies in respect of cross-sectional thickness as between a first regenerator body-portion c1068 (such as a hot-side portion c1006) and a second regenerator body-portion c1070 (such as a cold-side portion c1008), and/or along a longitudinal axis extending therebetween. The cross-sectional thickness of the regenerator conduit c1000 and/or the heat storage medium c1014 may remain substantially constant as between the first regenerator body-portion c1068 to the second regenerator body-portion c1070, and/or along a longitudinal axis extending therebetween, as shown, for example, in FIGS. 9A-9C.

In some embodiments, the cross-sectional thickness of a sidewall c1020 may decrease from a hot-side portion c1006 to a cold-side portion c1008. The decrease in cross-sectional thickness from the hot-side portion c1006 to the cold-side portion c1008 may compensate for differences in thermal conductivity and specific heat of the engine-working fluid at the as between the hot-side portion c1006 to the cold-side portion c1008. Additionally, or in the alternative, the cross-sectional thickness of a sidewall c1020 may vary along the longitudinal axis of the regenerator conduit c1000, while decreasing from the hot-side portion c1006 to the cold-side portion c1008. The varying cross-sectional thickness may reduce heat flux gradient between the regenerator body c800 and the engine-working fluid, along the regenerator conduit c1000 and/or as between the hot-side portion c1006 and the engine-working fluid and/or as between the cold-side portion c1008 and the engine-working fluid.

Figure 9F:
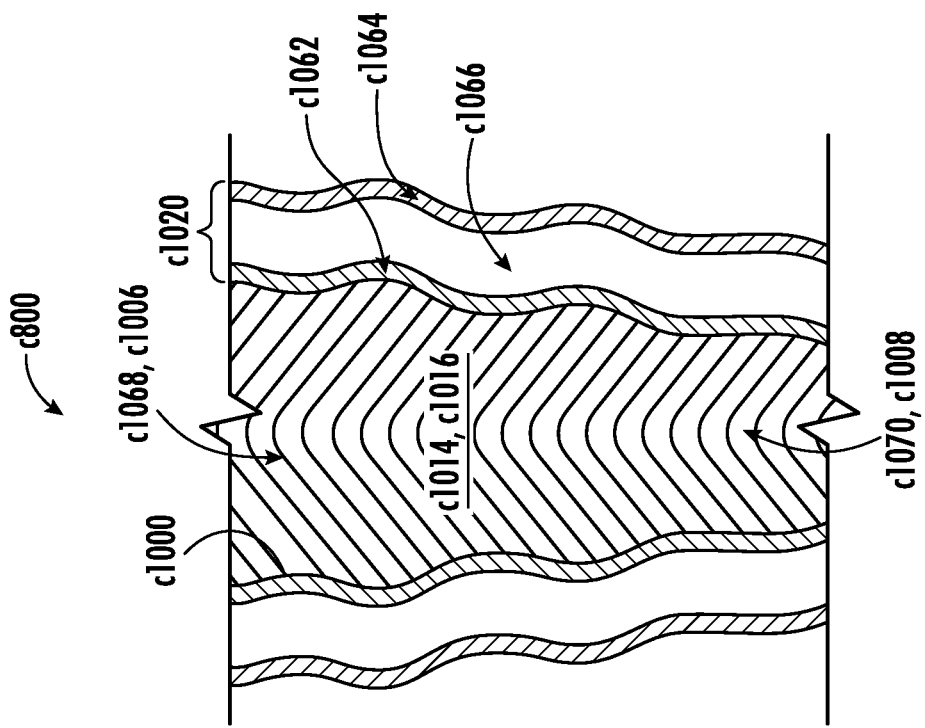
Figure 9E:
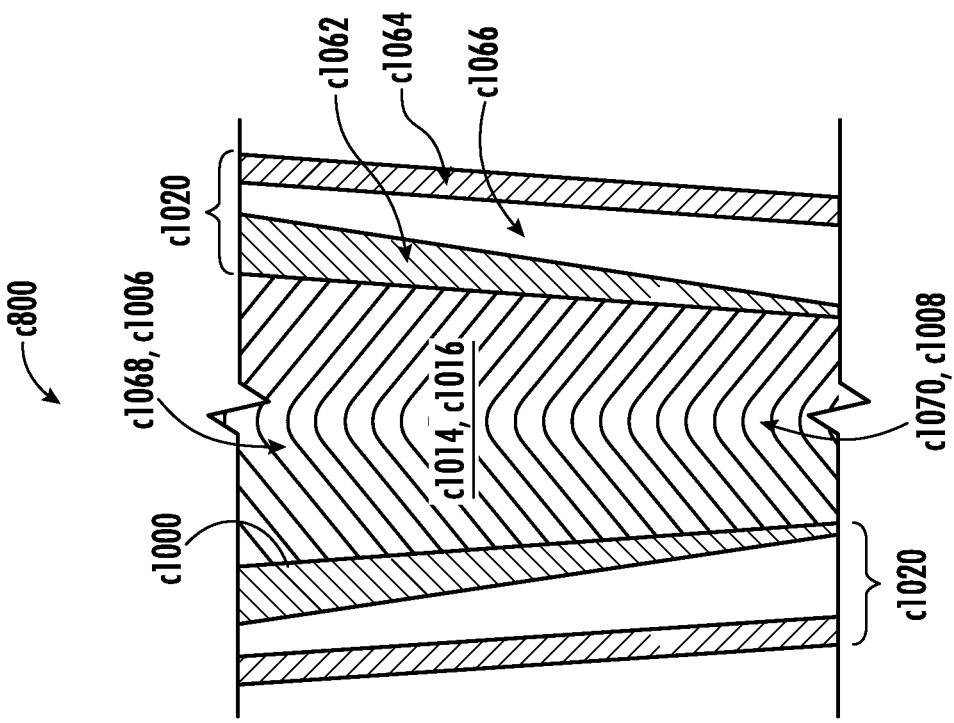

Additionally or in the alternative, as shown in FIGS. 9D-9F, a regenerator body c800 may include a regenerator conduit c1000 and/or a heat storage medium c1014 that differs and/or varies in respect of cross-sectional thickness as between a first regenerator body-portion c1068 (such as a hot-side portion c1006) and a second regenerator body-portion c1070 (such as a cold-side portion c1008), and/or along a longitudinal axis extending therebetween. A regenerator conduit c1000 and/or a heat storage medium c1014 may additionally or alternatively differ in respect of surface area and/or volume as between a first regenerator body-portion c1068 (such as a hot-side portion c1006) and a second regenerator body-portion c1070 (such as a cold-side portion c1008), and/or along a longitudinal axis extending therebetween. The cross-sectional thickness of the sidewall c1020 may remain substantially constant as between the first regenerator body-portion c1068 to the second regenerator body-portion c1070, and/or along a longitudinal axis extending therebetween, as shown, for example, in FIG. 9D. Additionally, or in the alternative, the cross-sectional thickness of the sidewall c1020 may differ and/or vary along a longitudinal axis extending from the first regenerator body-portion c1068 to the second regenerator body-portion c1070, as shown in FIGS. 9B, 9C, 9E, and 9F. A regenerator body c800 may additionally or alternatively differ and/or vary in respect of external cross-sectional thickness as between a first regenerator body-portion c1068 (such as a hot-side portion c1006) and a second regenerator body-portion c1070 (such as a cold-side portion c1008), and/or along a longitudinal axis extending therebetween, as shown in FIGS. 9C-9F.

In some embodiments, the cross-sectional thickness and/or surface area of the regenerator conduit c1000 and/or the heat storage medium c1014 may decrease from a hot-side portion c1006 to a cold-side portion c1008. The decrease in cross-sectional thickness and/or surface area from the hot-side portion c1006 to the cold-side portion c1008 may compensate for differences in thermal conductivity and specific heat of the engine-working fluid at the as between the hot-side portion c1006 to the cold-side portion c1008. Additionally, or in the alternative, the cross-sectional thickness and/or surface area of the regenerator conduit c1000 and/or the heat storage medium c1014 may vary along the longitudinal axis of the regenerator conduit c1000, while decreasing from the hot-side portion c1006 to the cold-side portion c1008. The varying cross-sectional thickness and/or surface area may reduce heat flux gradient between the regenerator body c800 and the engine-working fluid, along the regenerator conduit c1000 and/or as between the hot-side portion c1006 and the engine-working fluid and/or as between the cold-side portion c1008 and the engine-working fluid.

By way of example, as shown in FIG. 9B, a regenerator body c800 may include a sidewall c1020 that includes at least one aspect that differs in respect of cross-sectional thickness as between a first regenerator body-portion c1068 (such as a hot-side portion c1006) and a second regenerator body-portion c1070 (such as a cold-side portion c1008). For example, the internal-sidewall c1062 may differ in respect of cross-sectional thickness, as shown. Additionally, or in the alternative, the external sidewall c1064 and/or the voidspace c1066 may differ in respect of cross-sectional thickness as between a first regenerator body-portion c1068 (such as a hot-side portion c1006) and a second regenerator body-portion c1070 (such as a cold-side portion c1008). The cross-sectional thickness of at least one aspect of the sidewall c1020 may decrease along a longitudinal axis extending from the first regenerator body-portion c1068 to the second regenerator body-portion c1070, as shown. Additionally, or in the alternative, the cross-sectional thickness of at least one aspect of the sidewall c1020 may increase along a longitudinal axis extending from the first regenerator body-portion c1068 to the second regenerator body-portion c1070.

In some embodiments, the cross-sectional thickness of the sidewall c1020 may remain substantially constant along a longitudinal axis extending from the first regenerator body portion c1068 to the second regenerator body portion c1070, while the internal-sidewall c1062 differs in respect of cross-sectional thickness along the longitudinal axis. The cross-sectional thickness of the internal sidewall c1062 and the cross-sectional thickness of the voidspace c1066 may differ inversely from one another along the longitudinal axis. The cross-sectional thickness of the internal sidewall c1062 may decrease along the longitudinal axis, while the cross-sectional thickness of the voidspace c1066 may increase along the longitudinal axis. The cross-sectional thickness of the regenerator conduit c1000 and/or the heat storage medium c1014 may remain substantially constant along the longitudinal axis while at least one aspect of the sidewall c1020 varies in respect of cross-sectional thickness.

As shown in FIG. 9C, in some embodiments a regenerator body c800 may additionally or alternatively include a sidewall c1020 with at least one aspect that varies in respect of cross-sectional thickness along a longitudinal axis extending from the first regenerator body-portion c1068 (such as a hot-side portion c1006) to the second regenerator body-portion c1070 (such as a cold-side portion c1008). For example, at least one aspect of the sidewall c1020 may include a plurality of alternating changes in cross-sectional thickness along the longitudinal axis. As shown, the internal-sidewall c1062 may vary in respect of cross-sectional thickness along the longitudinal axis, such as with a plurality of alternating changes in cross-sectional thickness along the longitudinal axis. Additionally or alternatively, the external sidewall c1064 and/or the voidspace c1066 may vary in respect of cross-sectional thickness along the longitudinal axis, such as with a plurality of alternating changes in cross-sectional thickness along the longitudinal axis. The external cross-sectional thickness of the regenerator body c800 may additionally or alternatively vary in respect of cross-sectional thickness along the longitudinal axis, such as with a plurality of alternating changes in cross-sectional thickness along the longitudinal axis, as shown in FIG. 9C.

The cross-sectional thickness of the regenerator conduit c1000 and/or the heat storage medium c1014 may remain substantially constant along the longitudinal axis while at least one aspect of the sidewall c1020 varies in respect of cross-sectional thickness.

As shown in FIG. 9D, in some embodiments a regenerator body c800 include a regenerator conduit c1000 and/or a heat storage medium c1014 with at least one aspect that differs in respect of cross-sectional thickness as between a first regenerator body-portion c1068 (such as a hot-side portion c1006) and the second regenerator body-portion c1070 (such as a cold-side portion c1008), and/or along a longitudinal axis therebetween. The cross-sectional thickness of the sidewall c1020 may remain substantially constant as between the first regenerator body-portion c1068 to the second regenerator body-portion c1070, and/or along a longitudinal axis extending therebetween.

As shown in FIG. 9E, in some embodiments a regenerator body c800 may a regenerator conduit c1000 and/or a heat storage medium c1014 with at least one aspect that differs in respect of cross-sectional thickness, and a sidewall c1020 that includes at least one aspect that differs in respect of cross-sectional thickness, as between a first regenerator body-portion c1068 (such as a hot-side portion c1006) and the second regenerator body-portion c1070 (such as a cold-side portion c1008), and/or along a longitudinal axis therebetween. For example, as between a first regenerator body-portion c1068 and a second regenerator body-portion c1070. the internal-sidewall c1062 may differ in respect of cross-sectional thickness, and the regenerator conduit c1000 and/or the heat storage medium c1014 may differ in respect of cross-sectional thickness. Additionally, or in the alternative, the external sidewall c1064 and/or the voidspace c1066 may differ in respect of cross-sectional. The cross-sectional thickness of at least one aspect of the sidewall c1020, and the cross-sectional thickness of the regenerator conduit c1000 and/or the heat storage medium c1014, may decrease along a longitudinal axis extending from the first regenerator body-portion c1068 to the second regenerator body-portion c1070, as shown. Additionally, or in the alternative, the cross-sectional thickness of at least one aspect of the sidewall c1020, and the cross-sectional thickness of the regenerator conduit c1000 and/or the heat storage medium c1014, may increase along a longitudinal axis extending from the first regenerator body-portion c1068 to the second regenerator body-portion c1070

As shown in FIG. 9F, in some embodiments a regenerator body c800 may include a sidewall c1020, and regenerator conduit c1000 and/or the heat storage medium c1014, a with at least one aspect that varies in respect of cross-sectional thickness along a longitudinal axis extending from the first regenerator body-portion c1068 (such as a hot-side portion c1006) to the second regenerator body-portion c1070 (such as a cold-side portion c1008). For example, at least one aspect of the sidewall c1020, and at least one aspect of the regenerator conduit c1000 and/or the heat storage medium c1014, may include a plurality of alternating changes in cross-sectional thickness along the longitudinal axis. As shown, the overall cross-sectional thickness of the sidewall c1062 may remain substantially constant in respect of cross-sectional thickness along the longitudinal axis, while the external cross-sectional thickness of the regenerator body c800 decreases and/or varies as between a first regenerator body-portion c1068 (such as a hot-side portion c1006) and a second regenerator body-portion c1070 (such as a cold-side portion c1008), and/or along a longitudinal axis extending therebetween.

These and other embodiments exhibiting differing and/or variable geometric parameters, and/or differing and/or varying material properties, may be configured to provide a desired heat transfer time-constant ($\tau$), such as a congruent heat transfer time-constant ($\tau$), as between at least part of the first regenerator body-portion c1068 (such as a hot-side portion c1006) and at least part of the second regenerator body-portion c1070 (such as a cold-side portion c1008).

Now turning to FIG. 10, exemplary methods of regenerating heat in an engine-working fluid will be described. The exemplary methods of regenerating heat in an engine-working fluid may be performed in connection with operation of a regenerator body c800, a heater body c100, and/or an engine c002 as described herein. As shown in FIG. 10, an exemplary method c1080 may include, at block c1084, flowing an engine-working fluid from a hot-side portion c1006 of a regenerator body c800 towards a cold-side portion of the regenerator body c1008. The regenerator body c800 may include a regenerator conduit c1000 and a plurality of fin arrays c1016 adjacently disposed within the regenerator conduit c1000. The exemplary method c1080 may include, at block c1084, transferring heat from the engine-working fluid to the plurality of fin arrays c1016. The plurality of fin arrays c1016 may be respectively supported by the regenerator conduit c1000 in spaced relation to one another. The spaced relation of the plurality of fin arrays c1016 may define a gap G 1018 longitudinally separating adjacent ones of the plurality of fin arrays c1016. The exemplary method c1080 may further include, at block c1086, flowing the engine-working fluid from the cold-side portion c1008 of the regenerator body c800 towards the hot-side portion c1006 of the regenerator body c800. At block c1088, the exemplary method c1080 may include transferring heat from the plurality of fin arrays c1016 to the engine-working fluid.

In some methods c1080, flowing the engine-working fluid from the hot-side portion c1006 of the regenerator body c800 may include, at block c1090, flowing the engine-working fluid from a plurality of hot-side working-fluid pathways c1010 into the regenerator conduit c1000. The plurality of hot-side working-fluid pathways c1010 may fluidly communicate with the hot-side portion c1006 of the regenerator body c800. Exemplary methods c1080 may additionally or alternatively include, at block c1092, flowing the engine-working fluid from a hot-side c1002 of the piston chamber c112 into the plurality of hot-side working-fluid pathways c1010. The hot-side c1002 of the piston chamber c112 may fluidly communicate with the plurality of hot-side working-fluid pathways c1010.

In some methods c1080, flowing the engine-working fluid from the cold-side portion c1008 of the regenerator body c800 may include, at block c1094, flowing the engine-working fluid from a plurality of cold-side working-fluid pathways c1012 into the regenerator conduit c1000. The plurality of cold-side working-fluid pathways c1012 may fluidly communicate with the cold-side portion c1008 of the regenerator body c800. Exemplary methods c1080 may additionally or alternatively include, at block c1096, flowing the engine-working fluid from a cold-side c1004 of the piston chamber c112 into the plurality of cold-side working-fluid pathways c1012. The cold-side c1004 of the piston chamber c112 may fluidly communicate with the plurality of cold-side working-fluid pathways c1012.

In some embodiments, an exemplary method c1080 may include transferring a first quantity of heat per unit area from the engine-working fluid to the plurality of fin arrays c1016 while transferring a second quantity of heat per unit area from the engine-working fluid to the regenerator conduit c1000. The first quantity of heat per unit area may exceed the second quantity of heat per unit area. The plurality of fin arrays c1016 may include a first material and the regenerator conduit c1000 may include a second material. The thermal conductivity of the first material may exceed the thermal conductivity of the second material. Additionally, or in the alternative, the heat capacity of the first material may exceed the heat capacity of the second material.

Exemplary conduction-enhancing protuberances may include any one or more of a combination of protuberant features having a variety of shapes and configurations, including nodules, loops, hooks, bumps, burls, clots, lumps, knobs, projections, protrusions, swells, enlargements, outgrowths, accretions, blisters, juts, and the like. These conduction-attenuating protuberances c728 occur in an ordered, semi-ordered, random, or semi-random fashion. However, the particular configuration, arrangement, or orientation of the conduction-enhancing protuberances c728 may be selectively controlled or modified by adjusting the configuration or arrangement of at least a portion of the working-fluid body c108 and/or hot-side heat exchanger body c600, such as the configuration or arrangement of at least a portion of the working-fluid pathways c110 and/or heating fluid pathways c602.

It should be appreciated that in various embodiments the surface area within the heater conduits or working-fluid pathways C110 corresponds to an internal wall or surface of the heater conduit C110 at which the engine working fluid is in direct contact. In one embodiment, the surface area defines a nominal surface area of the working-fluid pathway C110, such as a cross sectional area within the working-fluid pathway C110. In other embodiments, features may be added or altered to the working-fluid passage C110 within the heater conduit, such as, but not limited to, surface roughness, protuberances, depressions, spikes, nodules, loops, hooks, bumps, burls, clots, lumps, knobs, projections, protrusions, swells, enlargements, outgrowths, accretions, blisters, juts, and the like, or other raised material, or combinations thereof, to desirably alter flow rate, pressure drop, heat transfer, flow profile or fluid dynamics of the engine working fluid.

Now referring to FIGS. 11A and 11B, exemplary engine assemblies c900 will be described. The engine assemblies c900 described herein may include an engine c002, such as described in regard to the system A10 and engine A100 shown and depicted in regard to FIG. 1, or further herein with reference to FIG. 14. The engine assembly c900 may include one or more monolithic bodies or monolithic body-segments as described herein. A monolithic body and/or a monolithic body-segment may be fabricated using an additive manufacturing technology and may be void of any seams, joints, or the like characteristic of separately fabricated components.

An engine c002 may include one or more heater bodies c100 and one or more engine bodies c050 that together define an engine assembly c900. An exemplary engine assembly c900 may include at least one heater body c100 and at least one engine body c050. However, it will be appreciated that any number of heater bodies c100 and/or any number of engine bodies c050 may be provided. In some embodiments, a first heater body c100 may be disposed at a first side of an engine assembly c900 and a second heater body c100 may be disposed at a second side of an engine assembly c900. One or more engine bodies c050 may be disposed adjacent to the first heater body c100 and/or adjacent to the second heater body c100. One or more heater bodies c100 and/or one or more engine bodies c050 may be operably coupled or operably couplable to one another such as via welding, fusing, or the like, so as to provide an integrally formed engine assembly c900. Additionally, or in the alternative, one or more heater bodies c100 and/or one or more engine bodies c050 may be operably coupled or operably couplable to one another such as via bolts, fasteners, or the like, so as to provide an assembled engine assembly c900.

The engine assembly c900 may include one or more piston assemblies c090 and one or more generator assemblies c092. The one or more piston assemblies c090 and the one or more generator assemblies c092 may be operably insertable within an engine body c050 and/or a heater body c100. The one or more generator assemblies c092 may receive a mid-ward portion of the one or more piston assemblies 092. The one or more piston assemblies c090 and/or the one or more generator assemblies c092 may be inserted into an engine body c050 and/or a heater body c100 prior to operably coupling at least one engine body c050 to another engine body c050 or to a heater body c100. Additionally, or in the alternative, one or more piston assemblies c090 and/or the one or more generator assemblies c092 may be inserted into an engine body c050 and/or a heater body c100 prior to operably coupling at least one heater body c100 to an engine body c050. In this way, an engine assembly c900 may be integrally formed and/or assembled at least in part by installing one or more piston assemblies c090 and/or the one or more generator assemblies c092 into one or more monolithic bodies and/or monolithic body-segments that make up the engine assembly c900. The one or more monolithic bodies and/or monolithic body-segments may be operably coupled to one another after having installed the one or more piston assemblies c090 and/or the one or more generator assemblies c092 therein. However, it will be appreciated that in some embodiments some of the more monolithic bodies and/or monolithic body-segments that make up an engine assembly c900 may be operably coupled to one another prior to installing the one or more piston assemblies c090 and/or the one or more generator assemblies c092 therein.

Figure 11A:
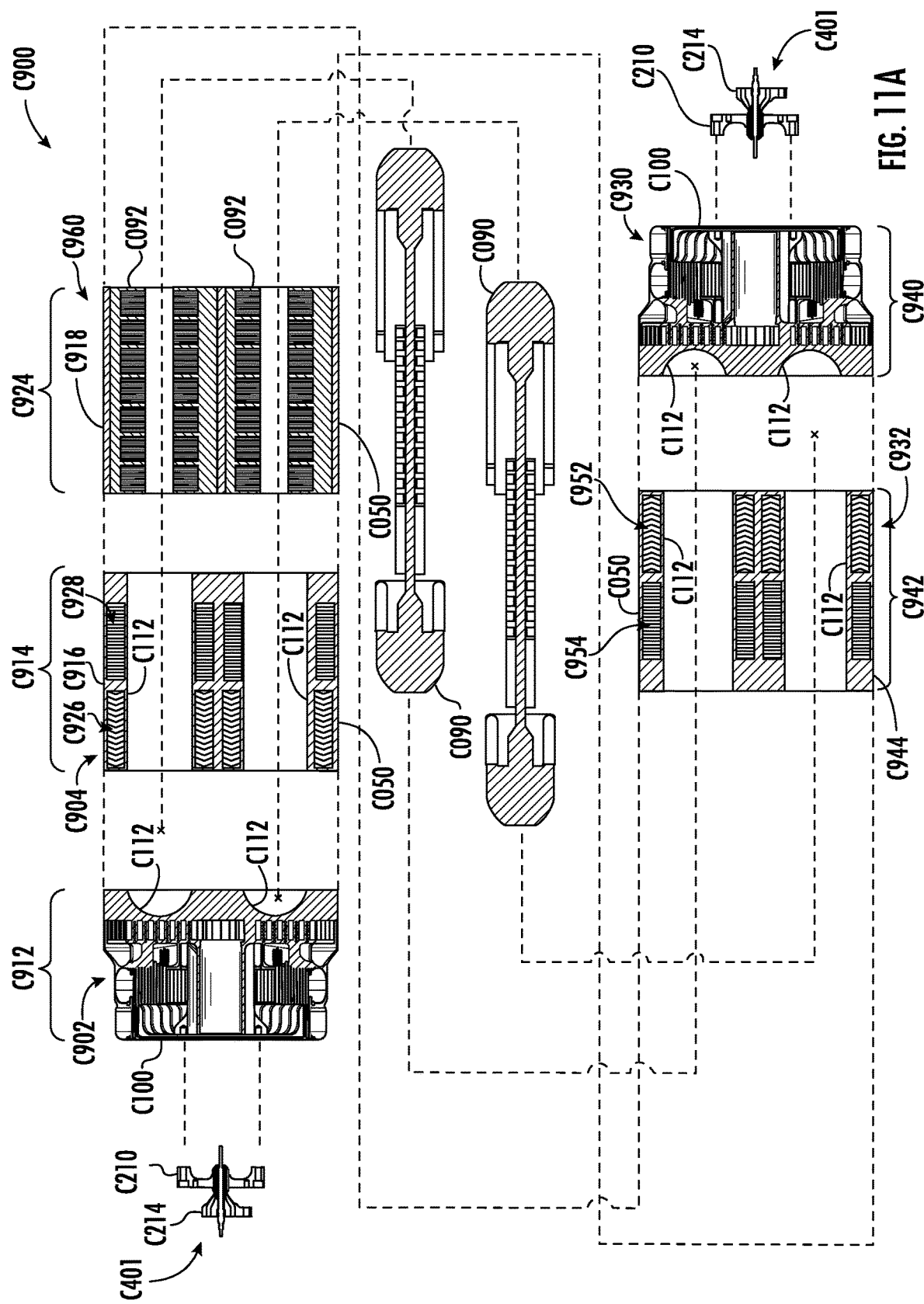
FIGS. 11A and 11B schematically depict exploded views of exemplary engine assemblies according to aspects of the present disclosure.
Figure 11B:
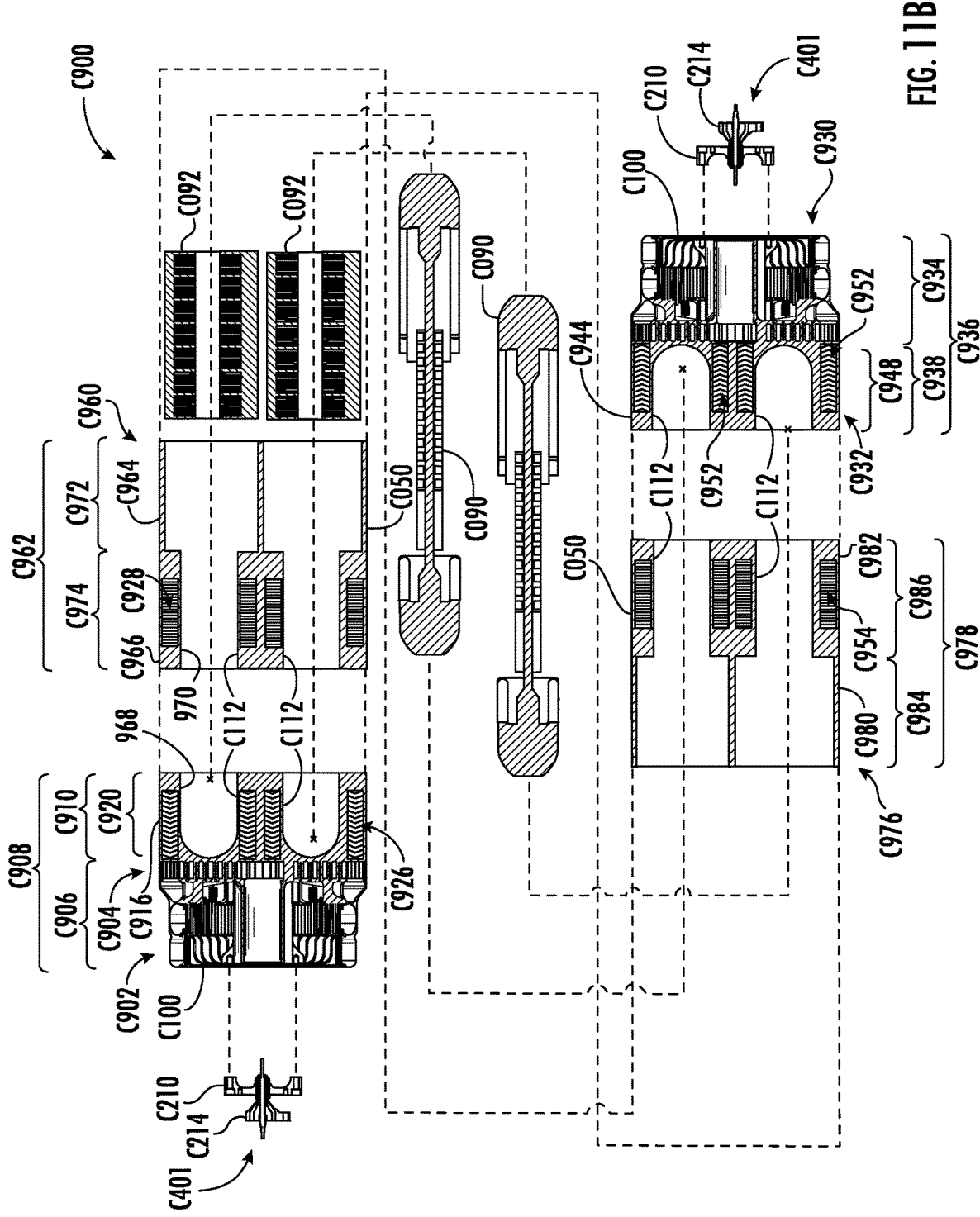

FIGS. 11A and 11B show exploded views of exemplary engine assemblies c900. An engine assembly c900 may include at least two monolithic bodies or monolithic body-segments, within which one or more piston assemblies c090 and one or more generator assemblies c092 may be enclosed. For example, an engine assembly c900 may include a first monolithic body that includes a first heater body c100 and a first portion of an engine body c050, and a second monolithic body that includes a second heater body c100 and a second portion of an engine body c050. In some embodiments, an engine assembly c900 may include only two monolithic bodies or monolithic body-segments, while in other embodiments an engine assembly c900 may include more than two (e.g., multiple) monolithic bodies or monolithic body-segments.

One or more of the monolithic bodies and/or monolithic body-segments that make up an engine assembly may include one or more regenerator bodies and/or one or more chiller bodies. The one or more regenerator bodies may define a portion of another monolithic body or a portion of a monolithic body-segment. Alternatively, the one or more regenerator bodies may represent a monolithic body or monolithic body-segment, such as a monolithic body or monolithic body-segment insertable, inserted, operably couplable, or operably coupled to another monolithic body or monolithic body-segment. The one or more chiller bodies may define a portion of another monolithic body or a portion of a monolithic body-segment. Alternatively, the one or more chiller bodies may represent a monolithic body or monolithic body-segment, such as a monolithic body or monolithic body-segment insertable, inserted, operably couplable, or operably coupled to another monolithic body or monolithic body-segment.

As shown in FIG. 11A, an engine assembly c900 may include a plurality of monolithic bodies or monolithic body-segments separated at or about locations corresponding to respective components of the engine assembly. Engine assemblies c900 configured in accordance with FIG. 11A may include separate monolithic bodies or monolithic body-segments respectively corresponding to respective elements of the engine assembly c900. For example, an engine assembly c900 may include a first monolithic body-segment (e.g., on the top left-hand side as shown) that includes a first heater body c100, a second monolithic body-segment that includes a first portion of an engine body c050 corresponding to a left-hand side of one or more piston assemblies c090, a third monolithic body-segment that includes a second portion of the engine body c050 corresponding to one or more generator assemblies c092, a fourth monolithic body-segment that includes a third portion of the engine body c050 corresponding to a right-hand side of the one or more piston assemblies c090, and a fifth monolithic body-segment that includes a second heater body c100. The first monolithic body-segment that includes the first heater body c100 may additionally include a portion of the engine body c050. Additionally, or in the alternative, the second monolithic body-segment that includes the second heater body c100 may include a portion of the engine body c050.

The second monolithic body-segment may define one or more regenerator bodies and/or one or more chiller bodies corresponding to the first heater body c100. Additionally, or in the alternative, one or more regenerator bodies and/or one or more chiller bodies corresponding to the first heater body c100 may be operably coupled or operably couplable to the second monolithic body-segment. The fourth monolithic body-segment may define one or more regenerator bodies and/or one or more chiller bodies corresponding to the second heater body c100. Additionally, or in the alternative, one or more regenerator bodies and/or one or more chiller bodies corresponding to the second heater body c100 may be operably coupled or operably couplable to the fourth monolithic body-segment.

The one or more generator assemblies c092 may be installed in one or more generator housing defined by the second portion of the engine body c050. A first portion of one or more piston assemblies c090 may be installed in a corresponding one or more piston chambers c112 defined by the first portion of the engine body c050 and/or a second portion of the one or more piston assemblies c090 may be installed in a corresponding one or more piston chambers c112 defined by the second portion of the engine body c050. The respective portions of the engine assembly c900 may be operably coupled to one another, enclosing the one or more generator assemblies c092 and the one or more piston assemblies c090 therein.

In some embodiments, it may be advantageous for the monolithic body or monolithic body-segment that defines a heater body c100 to also define the one or more regenerator bodies corresponding to the heater body. When the heater body c100 and corresponding one or more regenerator bodies respectively define a portion of the same monolithic body or monolithic body-segment, working-fluid pathways c110 defined by the heater body c110 may fluidly communicate with the corresponding one or more regenerator bodies while minimizing fluid couplings.

In some embodiments, it may be advantageous for a monolithic body or monolithic body-segment that defines one or more generator housing to also define one or more chiller bodies corresponding to the one or more generator assemblies c092 respectively corresponding to the one or more generator housings. For example, this may allow for cooling fluid pathways to be defined by such monolithic body or monolithic body-segment while minimizing fluid couplings associated with the one or more chiller bodies.

The monolithic bodies and/or monolithic body-segments depicted in FIGS. 11A and 11B may respectively reflect one or more additively manufactured monolithic bodies or additively manufactured monolithic body-segments. In some embodiments a monolithic body or a monolithic body-segment may be additively manufactured in a continuous process, such as to provide a single monolithic structure void of any seams, joints, or the like characteristic of separately fabricated components. Additionally, or in the alternative, a monolithic body or a monolithic body-segment may include a plurality of separately fabricated components, which may be formed using an additive manufacturing technology or other suitable fabrication technologies. For example, a heater body c100 and/or an engine c002 may additionally or alternatively include a plurality of components formed using a fabrication technology other than additive manufacturing, and such separately components may be operably coupled or operably couplable to one another and/or to one or more monolithic bodies and/or a monolithic body-segments. Other suitable fabrication technologies that may be used to manufacture various components of the presently disclosed heater bodies c100 and closed-cycle engines c002 include, without limitation, forming (e.g., rolling, stamping, joining, etc.), extruding (e.g., sheet extruding), subtractive manufacturing (e.g., machining, drilling, laser cutting, etc.), forging or casting, as well as a combination thereof, or any other manufacturing technology.

Still referring to FIGS. 11A and 11B, an exemplary engine assembly c900 may include a first heater body c902 and a first engine body c904. An exemplary engine assembly c900 may additionally or alternatively include a second heater body c930 and/or a second engine body c932.

Now referring to FIG. 11A, in some embodiments, an engine assembly c900 may include a plurality of monolithic body-segments. For example, as shown in FIG. 11A, an engine assembly may include a first heater body c902, a first engine body c904, a second heater body c940, a second engine body c942, and a third engine body c960. As shown, a first heater body c902 may define at least a portion of a first monolithic body-segment c912. The first engine body c904 may define at least a portion of a second monolithic body-segment c914. The first engine body c904 may include a first piston body c916, and the first piston body c916 may define at least a portion of the second monolithic body-segment c914. The first piston body c916 may define at least a portion of a piston chamber c112. The piston chamber c112 may be configured to receive at least a portion of a piston assembly c090. The second monolithic body-segment c914 (e.g., the first piston body c916) may be operably coupled or operably couplable to the first monolithic body-segment c912 (e.g., the first heater body c902). For example, the second monolithic body-segment c914 (e.g., the first engine body c904) may be operably coupled or operably couplable to the first heater body c902.

The first engine body c904 may include a first regenerator body c926 and/or a first chiller body c928. The first regenerator body c926 and/or the first chiller body c928 may define at least a portion of the second monolithic body-segment c914. Additionally, or in the alternative, the first regenerator body c926 and/or the first chiller body c928 may define a monolithic body-segment operably coupled or operably couplable to the first monolithic body c908 or the second monolithic body-segment c914.

Still referring to FIG. 11A, an exemplary engine assembly c900 may additionally or alternatively include a second heater body c930 and/or a second engine body c932. As shown, a second heater body c930 may define at least a portion of a fourth monolithic body-segment c940. Additionally, or in the alternative, a second engine body c932 may define at least a portion of a fifth monolithic body-segment c942. A second piston body c944 may define at least a portion of the fifth monolithic body-segment c942. The fifth monolithic body-segment c942 may be operably coupled or operably couplable to the fourth monolithic body-segment c940. For example, the fifth monolithic body-segment c942 (e.g., the second engine body c932 or the second piston body c944) may be operably coupled or operably couplable to the second heater body c930.

The second engine body c932 may include a second regenerator body c952 and/or a second chiller body c954. The second regenerator body c952 and/or the second chiller body c954 may define at least a portion of the fifth monolithic body-segment c942. Additionally, or in the alternative, the second regenerator body c952 and/or the second chiller body c954 may define a monolithic body-segment operably coupled or operably couplable to the second monolithic body c936 or the fifth monolithic body-segment c942. In some embodiments, the second piston body c944 may include a second regenerator body c952 and/or a second chiller body c954. The second regenerator body c952 may define a portion of the second piston body c944 or at least a portion of a monolithic body-segment operably coupled or operably couplable to the second piston body c944. Additionally, or in the alternative, the second chiller body c954 may define a portion of the second piston body c944 or at least a portion of a monolithic body-segment operably coupled or operably couplable to the second piston body c944.

An exemplary engine assembly c900 may additionally or alternatively include a third engine body c960. The third engine body c960 may include a first machine body c918, and the first machine body c918 may define at least a portion of a third monolithic body-segment c924. The first machine body c918 may define at least a portion of a generator housing c919. The generator housing c919 may be configured to receive at least a portion of a load device c092. The third monolithic body-segment c924 (e.g., the first machine body c918) may be operably coupled or operably couplable to the second monolithic body-segment c914 (e.g., the first piston body c916).

Now referring to FIG. 12, an exemplary engine assembly c900 may include a one or more engine-working fluid heat exchanger bodies c988. The one or more engine-working fluid heat exchanger bodies c988 may define at least a portion of the first heater body c902 and/or at least a portion of the first engine body c904. A working-fluid heat exchanger body c988 may include a plurality of working-fluid pathways c110 fluidly communicating between a piston body and a regenerator body (e.g., between a first piston body c916 and a first regenerator body c926, or between a second piston body c944 and a second regenerator body c952). For example, an engine body c904 may include a first piston body c916, a first regenerator body c926, and a working-fluid heat exchanger body c988 that includes a plurality of working-fluid pathways c110 fluidly communicating between the first piston body c916 and the first regenerator body c926. The working-fluid heat exchanger body c988 may define at least a portion of the first heater body c902 and/or at least a portion of the first engine body c904. The working-fluid heat exchanger body c988 may additionally or alternatively include a heating chamber body c990.

In some embodiments, the first heater body c902 may define at least a portion of a first monolithic-body segment c912 and/or the first engine body c904 may define at least a portion of a second monolithic-body segment c914. The first heater body c902 may include at least a portion of the heating chamber body c990. The heating chamber body c990 may define at least a portion of the first monolithic body-segment c912. The second monolithic body-segment c914 may include at least a portion of the working-fluid heat exchanger body c988, at least a portion of the first piston body c916, and/or at least a portion of the first regenerator body c926. The working-fluid heat exchanger body c988 may define at least a portion of the second monolithic body-segment c914. The heating chamber body c990 may surround at least a portion of the working-fluid heat exchanger body c988. For example, the heating chamber body c990 may define at least a portion of a recirculation pathway c104 surrounding at least a portion of the working-fluid heat exchanger body c988. The heating chamber body c990 may fluidly communicate at an upstream portion (e.g., at a radially inward portion) with a heating fluid inlet c992. For example, the heating chamber body c990 may fluidly communicate with a combustion chamber c102, such as with a combustion chamber outlet c412. The heating chamber body c990 may fluidly communicate at a downstream portion (e.g., at a radially outward portion) with a heating fluid outlet c994. For example, the heating chamber body c990 may fluidly communicate with a recirculation annulus c208.

Figure 13:
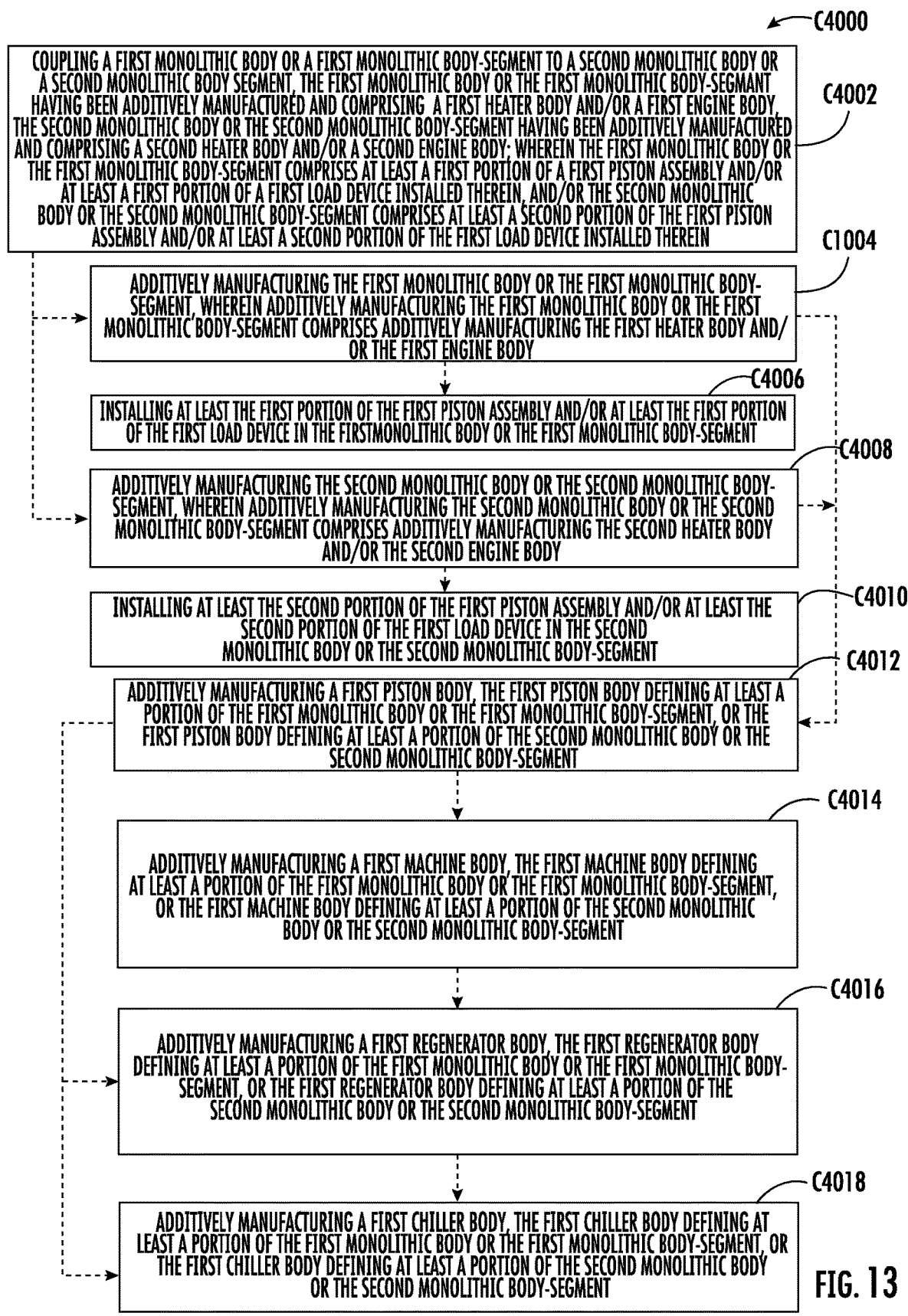
FIG. 13 shows a flowchart depicting an exemplary method of building an engine assembly.

Now turning to FIG. 13, exemplary methods of building an engine assembly c900 will be described. As shown in FIG. 13, an exemplary method c4000 may include, at block c4002, coupling a first monolithic body c908 or a first monolithic body-segment c912 to a second monolithic body c936 or a second monolithic body segment c914. The first monolithic body c908 or the first monolithic body-segment c914 may have been additively manufactured and/or the second monolithic body c936 or the second monolithic body-segment c914 may have been additively manufactured. The first monolithic body c908 or the first monolithic body-segment c912 may include a first heater body c902 and/or a first engine body c904. The second monolithic body c936 or the second monolithic body-segment c914 may include a second heater body c930 and/or a second engine body c932. The first monolithic body c908 or the first monolithic body-segment c912 may include a first piston assembly c090 and/or a first load device c092 installed therein. Additionally, or in the alternative, the second monolithic body c936 or the second monolithic body-segment c914 may include the first piston assembly c090 and/or the first load device c092 installed therein.

An exemplary method 1000 may include, at block c4004, additively manufacturing the first monolithic body c908 or the first monolithic body-segment c912. Additively manufacturing the first monolithic body c908 or the first monolithic body-segment c912 may include additively manufacturing the first heater body c902 and/or the first engine body c904. An exemplary method 1000 may include, at block c4006, installing the first piston assembly c090 and/or the first load device c092 in the first monolithic body c908 or the first monolithic body-segment c912. For example, the method 1000 may include installing the first piston assembly c090 in the first heater body c902 and/or in the first engine body c904. Additionally, or in the alternative, the method 1000 may include installing the first load device c092 in the first heater body c902 and/or in the first engine body c904.

An exemplary method 1000 may include, at block c4008, additively manufacturing the second monolithic body c936 or the second monolithic body-segment c914. Additively manufacturing the second monolithic body c936 or the second monolithic body-segment c914 may include additively manufacturing the second heater body c930 and/or the second engine body c932. An exemplary method 1000 may include, at block c4010, installing the first piston assembly c090 and/or the first load device c092 in the second monolithic body c936 or the second monolithic body-segment c914. For example, the method 1000 may include installing the first piston assembly c090 in the second heater body c930 and/or the second engine body c932. Additionally, or in the alternative, the method 1000 may include installing the first load device c092 in the second heater body c930 and/or the second engine body c932.

An exemplary method 1000 may include, at block c4012, additively manufacturing a first piston body c916. The first piston body c916 may define at least a portion of the first monolithic body c908 or at least a portion of the first monolithic body-segment c912. Additionally, or in the alternative, the first piston body c916 may define at least a portion of the second monolithic body c936 or at least a portion of the second monolithic body-segment c914. The exemplary method c4000 may additionally or alternatively include installing the first piston assembly c090 in the first piston body c916.

The exemplary method 1000 may additionally or alternatively include, at block c4014, additively manufacturing a first machine body c922. The first machine body c922 may define at least a portion of the first monolithic body c908 or at least a portion of the first monolithic body-segment c912. Additionally, or in the alternative, the first machine body c922 may define at least a portion of the second monolithic body c936 or at least a portion of the second monolithic body-segment c912. The exemplary method c4000 may additionally or alternatively include installing the first load device c092 in the first machine body c922.

The exemplary method 1000 may additionally or alternatively include, at block c4016, additively manufacturing a first regenerator body c926. The first regenerator body c926 may define at least a portion of the first monolithic body c908 or at least a portion of the first monolithic body-segment c912. Additionally, or in the alternative, the first regenerator body c926 may define at least a portion of the second monolithic body c936 or at least a portion of the second monolithic body-segment c912. The exemplary method c4000 may additionally or alternatively include installing the first regenerator body c926 in the first monolithic body c908 or at least a portion of the first monolithic body-segment c912.

The exemplary method 1000 may additionally or alternatively include, at block c4018, additively manufacturing a first chiller body c928. The first chiller body c928 may define at least a portion of the first monolithic body c908 or at least a portion of the first monolithic body-segment c912. Additionally, or in the alternative, the first chiller body c928 may define at least a portion of the second monolithic body c936 or at least a portion of the second monolithic body-segment c912. The exemplary method c4000 may additionally or alternatively include installing the first chiller body c928 in the first monolithic body c908 or at least a portion of the first monolithic body-segment c912.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the system A10 provided herein without undue experimentation. For example, build features, such as trusses, grids, build surfaces, or other supporting features, or material or fluid ingress or egress ports, may be added or modified from the present geometries to facilitate manufacture of embodiments of the system A10 based at least on a desired manufacturing process or a desired particular additive manufacturing process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While certain embodiments of the present disclosure may not be limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Also, the additive manufacturing methods described above provide much more complex and intricate shapes and contours of the components described herein to be formed with a very high level of precision. For example, such components may include thin additively manufactured layers, cross sectional features, and component contours. As another example, additive manufacturing may provide heat exchanger surface areas, volumes, passages, conduits, or other features that may desirably improve heat exchanger efficiency or performance, or overall engine or system performance. In addition, the additive manufacturing process provides the manufacture of a single component having different materials such that different portions of the component may exhibit different performance characteristics. The successive, additive steps of the manufacturing process provide the construction of these novel features. As a result, the components described herein may exhibit improved functionality and reliability.

Figure 14:
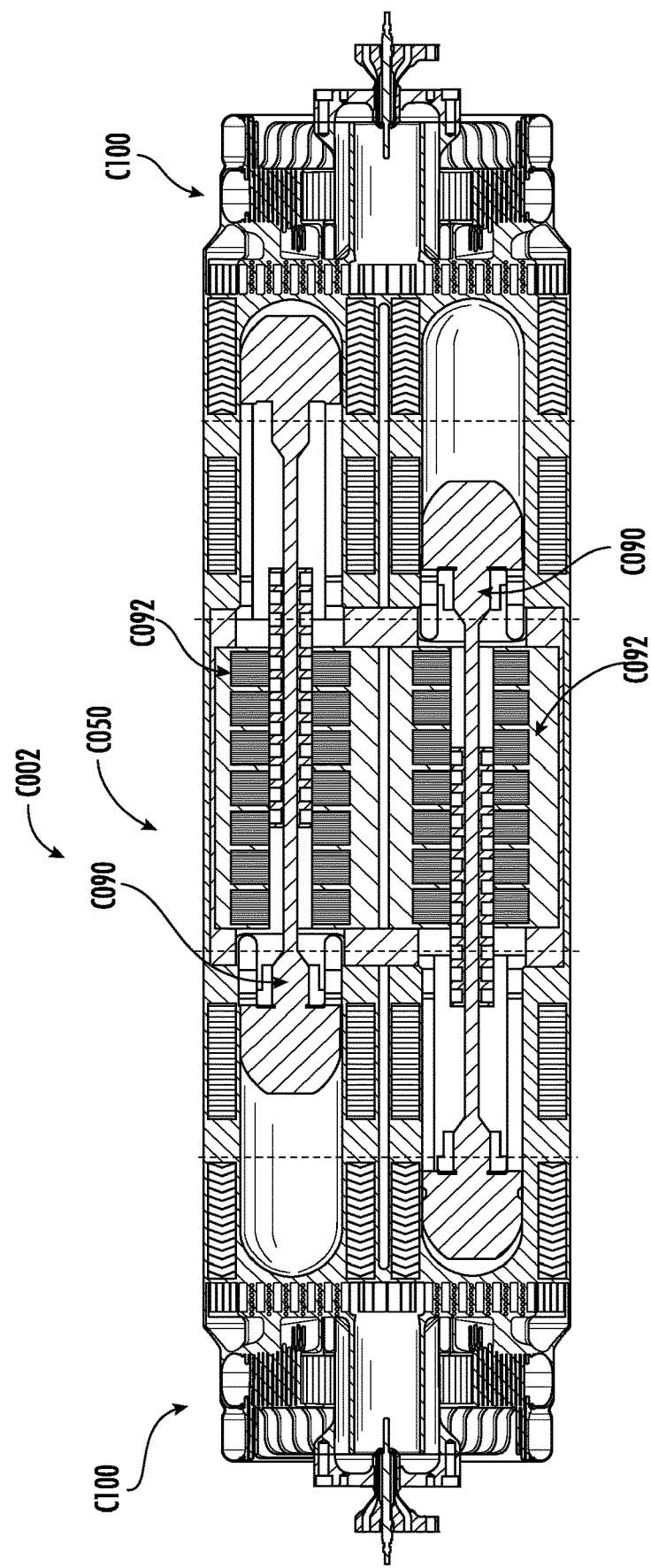
FIG. 14 schematically depicts a cross-sectional view of an exemplary closed-cycle engine, which may be a regenerative heat engine and/or a Stirling engine.

An exemplary engine c002 is shown in FIG. 14. The engine c002 may be a closed cycle engine, such as a regenerative heat engine and/or a Stirling engine; however other engines including other closed-cycle engines and/or regenerative heat engines are also contemplated and the scope of the present disclosure embraces any engine. A closed-cycle engine c002 may include a heater body c100 and an engine body c050. In the embodiment shown, a closed-cycle engine c002 may include an engine body c050 and a heater body c100 disposed on opposite sides of the engine body c050. For example, a first heater body c100 may be disposed at a first side of an engine body c050 and a second heater body c100 may be disposed at a second side of an engine body c050. In still other embodiments, a plurality of engine bodies c050 may be provided and/or a single heater body c100 or a multitude of heater bodies c100 may be provided. The closed-cycle engine c002 may include a piston assembly c090 and a load device c092 operably inserted within an engine body c050 and/or a heater body c100.

The closed-cycle engine c002 may be provided in the form of an engine assembly that includes one or more monolithic bodies or monolithic body-segments as described herein. A monolithic body and/or a monolithic body-segment may be fabricated using an additive manufacturing technology and may be void of any seams, joints, or the like characteristic of separately fabricated components. By way of example, an exemplary closed-cycle engine c002 may be assembled from an engine assembly that includes a first heater body c100 and a first engine body c050. The first heater body may define a first portion of a first monolithic body or a first monolithic body-segment, and the first engine body may define a second portion of the first monolithic body or a second monolithic body-segment operably coupled or operably couplable to the first heater body.

Figure 15:
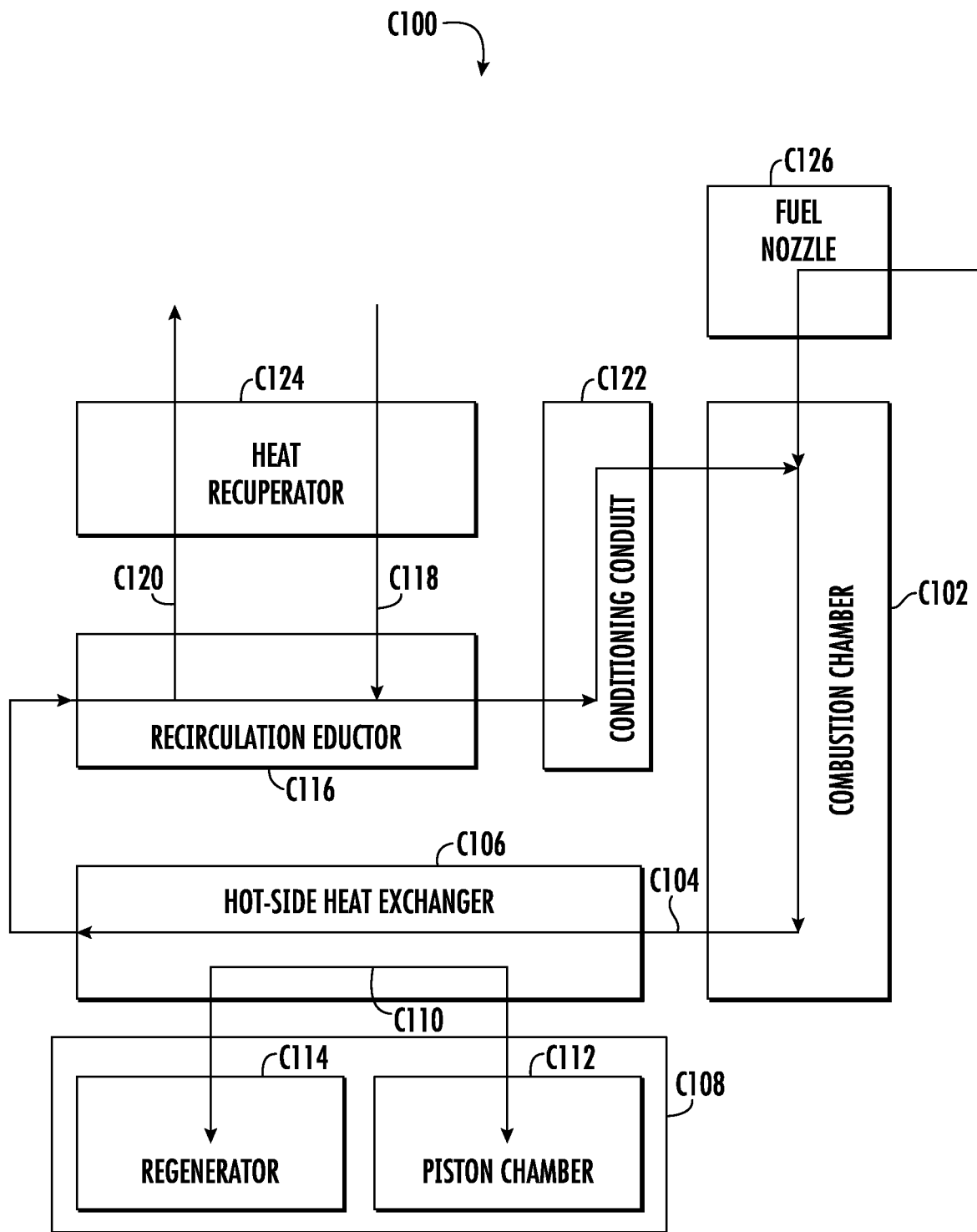
FIG. 15 schematically depicts an exemplary heater bodies, which, for example, may be included in the closed-cycle engine shown in FIG. 14.
Figure 16:
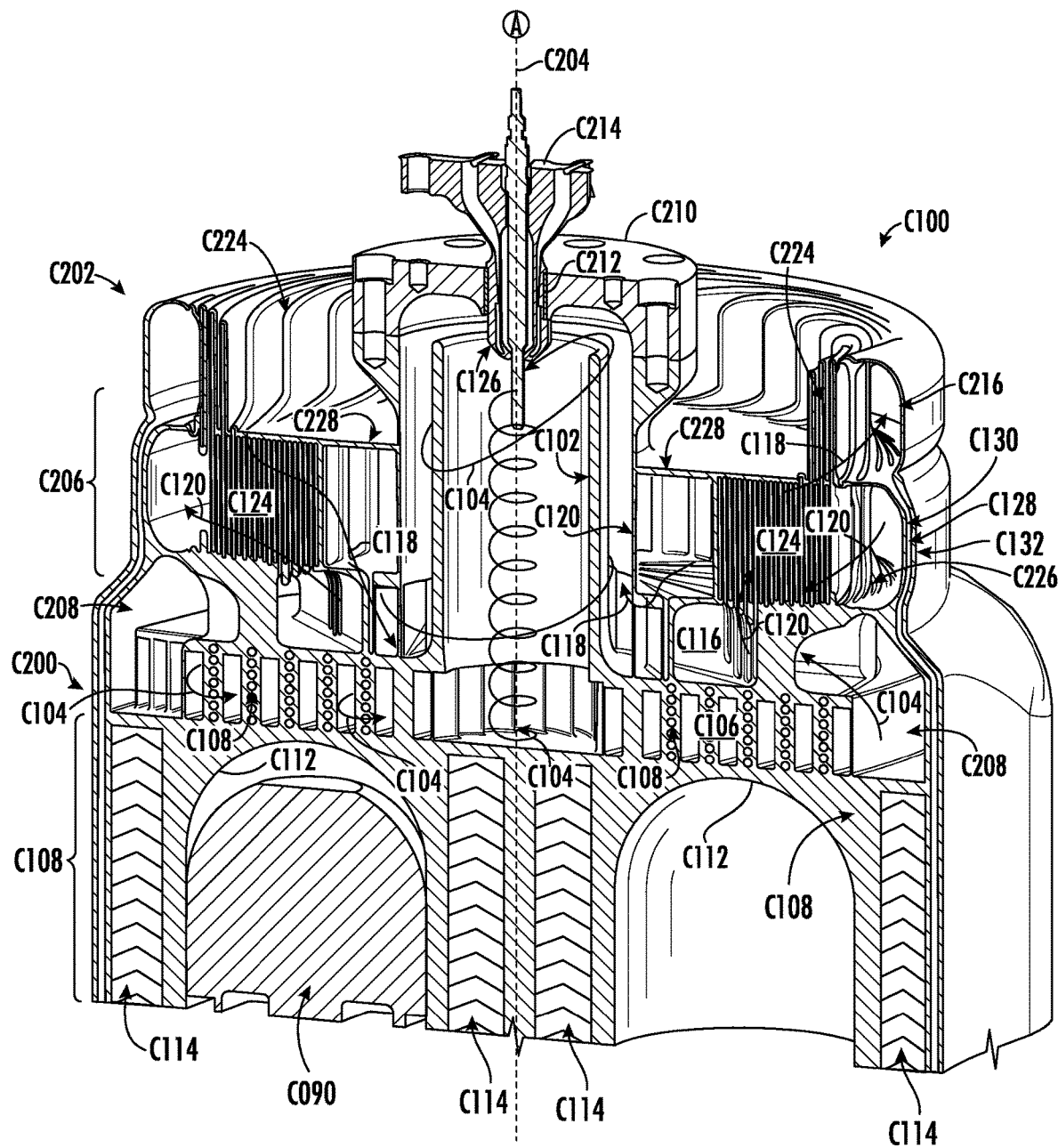
FIG. 16 schematically depicts a cross-sectional perspective view of an exemplary heater body, which, for example, may be included in the closed-cycle engine shown in FIG. 14.
Figure 17:
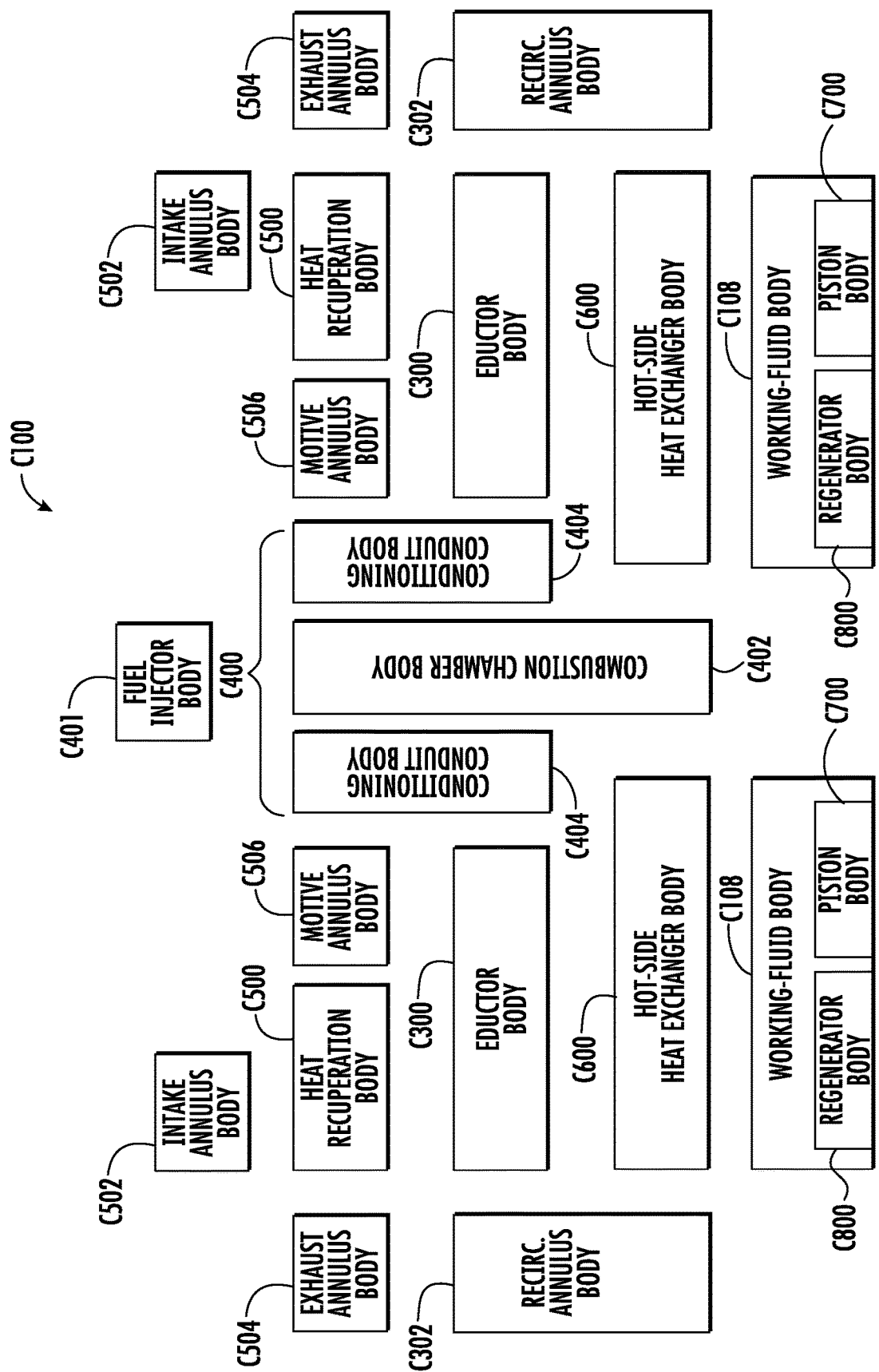
FIG. 17 schematically depicts exemplary monolithic bodies, which may include monolithic body portions and/or monolithic body-segments.

Now turning to FIGS. 15, 16, and 17 exemplary heater bodies c100 will be described. The presently disclosed heater bodies c100 may be used to supply heat to a closed-cycle engine c002 such as a regenerative heat engine and/or a Stirling engine. However, it will be appreciated that the presently disclosed heater bodies c100 may be used as a heating source in a number of other settings, all of which are within the scope of the present disclosure. In some embodiments, at least a portion of the heater body c100 may define at least a portion of a closed-cycle engine c002, such as a monolithic body or a monolithic body-segment of such a closed-cycle engine c002. For example, the monolithic body may be an additively manufactured monolithic body, or the monolithic body-segment may be an additively manufactured monolithic body-segment. However, in addition or as an alternative to additive manufacturing technology, it will be appreciated that the monolithic body or various monolithic body-segments of a closed-cycle engine c002 may be formed using any desired technology, all of which are within the scope of the present disclosure.

As shown, an exemplary heater body c100 may include a combustion chamber c102 and a recirculation pathway c104 configured to recirculate combustion gas through the combustion chamber c102. The recirculation pathway c104 may include a hot-side heat exchanger c106 configured to transfer heat from circulating combustion gas to a heat input source, such as a working-fluid body c108 defining a heat transfer region having a thermally conductive relationship with at least a portion of the hot-side heat exchanger c106. For example, heat from the combustion gas may be transferred to the heat transfer region via an engine-working fluid disposed within a working-fluid pathway c110. The working-fluid pathway c110 may be defined at least in part by the hot-side heat exchanger c106 and/or at least in part by the working-fluid body c108. The hot-side heat exchanger c106 may define a portion of the recirculation pathway c104. The heat transfer region may define a region having a have a thermally conductive relationship with the heating fluid pathway.

The heat transfer region defined by the working-fluid body c108 may include a solid body and/or a fluid pathway defined at least in part by the solid body. In an exemplary embodiment, the hot-side heat exchanger c106 may include a plurality of heating fluid pathways that have a heat transfer relationship with a plurality of heat transfer regions. For example, the plurality of heat transfer regions have a thermally conductive relationship with a corresponding portion of the plurality of heating fluid pathways. Additionally, or in the alternative, the heat transfer regions may have a thermally convective relationship with a heating fluid flowing through the heating fluid pathways. The heat transfer regions may be circumferentially spaced about the longitudinal axis of the heater body c100. Respective ones of the plurality of heat transfer regions may include a solid body and/or a fluid pathway defined at least in part by the solid body.

The working-fluid body c108 may include one or more portions of a closed-cycle engine c002, such as a piston chamber c112 (e.g., a hot piston chamber) and/or a regenerator body c114. A fluid pathway defined the working-fluid body c108 may fluidly communicate with the piston chamber and the regenerator body c114. The engine-working fluid disposed within the working-fluid pathway c110 may be an engine-working fluid, such as an inert gas, which may flow in an alternating fashion between the piston chamber c112 and the regenerator body c114. The hot-side heat exchanger c106 may be provided in the form of a heat exchanger body. The heat exchanger body may define a monolithic body portion of the heater body c100 or a monolithic body-segment operably coupled or operably couplable to a monolithic heater body c100 or to one or more other monolithic body-segments that make up the heater body c100.

In an exemplary embodiment, transferring heat from the combustion gas in the hot-side heat exchanger c106 at block c154 may include transferring heat to a working-fluid body c108. The working-fluid body c108 may include a solid body and/or fluid in a fluid pathway defined at least in part by the solid body. The heat transferring to the working-fluid body c108 may come from combustion gas flowing through a plurality of heating fluid pathways defined at least in part by the hot-side heat exchanger c106. The heat may be transferred to respective ones of a plurality of heat transfer regions that have a thermally conductive relationship with a corresponding portion of the plurality of heating fluid pathways. The working-fluid body c108 may include a plurality of working-fluid pathways, and the exemplary method c150 may include flowing fluid through the working-fluid pathways as heat transfers thereto from the hot-side heat exchanger c106. In some embodiments, the working-fluid pathways may fluidly communicate with a piston chamber and a regenerator of a closed-cycle engine c002, and the exemplary method may include flowing fluid through the working-fluid pathways alternatingly between the regenerator and the piston chamber.

An exemplary heater body c100 may additionally or alternatively include a working-fluid body c108. A working-fluid body c108 may include any one or more bodies that receive a heat input from the hot-side heat exchanger body c600. An exemplary working-fluid body c108 may include one or more piston bodies c700 and/or one or more regenerator bodies c800. An exemplary working-fluid body c108 may additionally or alternatively include one or more working-fluid pathways c110, such as one or more working-fluid pathways c110 fluidly communicating with at least one piston body c700 and/or at least one regenerator body c800. A working-fluid body c108 may be monolithically integrated with the hot-side heat exchanger body c600. In some embodiments, the working-fluid body c108 may define at least a portion of a plurality of working-fluid pathways. Additionally, or in the alternative, in some embodiments the hot-side heat exchanger body c600 may define at least a portion of the plurality of working-fluid pathways.

Now referring to FIG. 17 exemplary monolithic bodies defining at least a portion of a heater body c100 will be described. Exemplary monolithic bodies may be formed as one single monolithic body. Various portions of a monolithic body are sometimes referred to as monolithic body portions. Additionally, or in the alternative, exemplary monolithic bodies may include a plurality of segments combinable to form a monolithic body. Such segments are sometimes referred to herein as monolithic body-segments. As shown in FIG. 17, an exemplary heater body c100 may include a combustor body c400, a fuel injector body c401, a hot-side heat exchanger body c600, an eductor body c300, a heat recuperator body c500, and/or a working-fluid body c108. The combustor body c400, the fuel injector body c401, the hot-side heat exchanger body c600, the eductor body c300, the heat recuperator body c500, and/or the working-fluid body c108 may respectively define monolithic body portions of the heater body c100 and/or monolithic body-segments of the heater body c100.

An exemplary heater body c100 may include a combustor body c400. The combustor body c400 may include a combustion chamber body c402 defining at least a portion of a combustion chamber c102. The combustion chamber body c402 and/or the combustion chamber c102 may be disposed annularly about an axis c204. The combustor body c400 may additionally include a conditioning conduit body c404 defining at least a portion of a conditioning conduit c122 circumferentially surrounding the combustion chamber c102. The combustion chamber body c402 and the conditioning conduit body c404 may be monolithically integrated with the heater body c100 at a distal portion of the heater body c100 such that the conditioning conduit may fluidly communicate with the combustion chamber c102 at a distal portion of the combustion chamber c102. For example, the conditioning conduit body c404 may be monolithically integrated with the combustion chamber body c402. Alternatively, the combustion chamber body c402 and the conditioning conduit body c404 may define monolithic body-segments operably couplable to one another and/or to the heater body c100 or another monolithic body-segment thereof so as to provide an integrally formed combustor body c400.

An exemplary heater body c100 may additionally or alternatively include a fuel injector body c401. The fuel injector body c401 may be monolithically integrated with the heater body c100 at a distal portion c202 of the heater body c100, such as at a distal portion c202 of the combustion chamber c102. For example, the fuel injector body c401 may be monolithically integrated with the combustor body c400 (e.g., with the combustion chamber body c402 and/or the conditioning conduit body c404). Alternatively, the fuel injector body c401 and the combustor body c400 (e.g., the combustion chamber body c402 and/or the conditioning conduit body c404) may define monolithic body-segments operably couplable to one another and/or to the heater body c100 or another monolithic body-segment thereof.

An exemplary heater body c100 may additionally or alternatively include a hot-side heat exchanger body c600. The hot-side heat exchanger body c600 may include a plurality of heating fluid pathways and a plurality of heat transfer regions. The plurality of heating fluid pathways may be circumferentially spaced about an inlet plenum fluidly communicating with the plurality of heating fluid pathways. In some embodiments, respective ones of the plurality of heating fluid pathways may define a spiral pathway. Respective ones of the plurality of heat transfer regions may have a heat transfer relationship with a corresponding semiannular portion of the plurality of heating fluid pathways.

The hot-side heat exchanger body c600 may be monolithically integrated with the heater body c100 at a proximal portion c200 of the heater body c100 such that the combustion chamber c102 may fluidly communicate with the plurality of heating fluid pathways at a proximal portion c200 of the combustion chamber c102. For example, the hot-side heat exchanger body c600 may be monolithically integrated with the combustor body c400 (e.g., with the combustion chamber body c402 and/or the conditioning conduit body c404). Alternatively, the hot-side heat exchanger body c600 and the combustor body c400 (e.g., the combustion chamber body c402 and/or the conditioning conduit body c404) may define monolithic body-segments operably couplable to one another and/or to the heater body c100 or another monolithic body-segment thereof.

An exemplary heater body c100 may additionally or alternatively include an eductor body c300. The eductor body c300 may be monolithically integrated with the hot-side heat exchanger body c600 and/or the combustor body c400 (e.g., the conditioning conduit body c404) such that the plurality of heating fluid pathways may fluidly communicate with a radially or concentrically outward portion of the an education pathway defined by the eductor body c300. In some embodiments, the exemplary heater body c100 may include a recirculation annulus body c302 configured to provide fluid communication between the plurality of heating fluid pathways of the hot-side heat exchanger body c600 and the combustor body c400 (e.g., the conditioning conduit body c404).

An exemplary heater body c100 may additionally or alternatively include a heat recuperator body c500. The heat recuperator body c500 may be monolithically integrated with the eductor body c300. In some embodiments, the exemplary heater body c100 may include an intake annulus body c502, an exhaust annulus body c504, and/or a motive annulus body c506. The intake annulus body c502 may be monolithically integrated with the heat recuperator body c500 such that the intake annulus body c502 and the heat recuperator body c500 define at least a portion of an intake air pathway c118. The exhaust annulus body c504 may be monolithically integrated the heat recuperator body c500 such that the exhaust annulus body c504 and the heat recuperator body c500 define at least a portion of the exhaust pathway c120. The motive annulus body c502 may be monolithically integrated with the heat recuperator body c500 and the eductor body c300 such that the motive annulus body defines at least a portion of the intake air pathway c118 between the heat recuperator body c500 and the eductor body c300.

An exemplary heater body c100 may additionally or alternatively include a working-fluid body c108. A working-fluid body c108 may include any one or more bodies that receive a heat input from the hot-side heat exchanger body c600. An exemplary working-fluid body c108 may include one or more piston bodies c700 and/or one or more regenerator bodies c800. An exemplary working-fluid body c108 may additionally or alternatively include one or more working-fluid pathways c110, such as one or more working-fluid pathways c110 fluidly communicating with at least one piston body c700 and/or at least one regenerator body c800. A working-fluid body c108 may be monolithically integrated with the hot-side heat exchanger body c600. In some embodiments, the working-fluid body c108 may define at least a portion of a plurality of working-fluid pathways. Additionally, or in the alternative, in some embodiments the hot-side heat exchanger body c600 may define at least a portion of the plurality of working-fluid pathways.

Now referring to FIG. 18 exemplary hot-side heat exchanger bodies c600 will be described. The presently disclosed hot-side heat exchanger bodies c600 may define part of a heater body c100 and/or a closed-cycle engine c002. For example, a hot-side heat exchanger body c600 may define at least a portion of a monolithic body or a monolithic body-segment. Such monolithic body or monolithic body-segment may define at least a portion of the heater body c100 and/or the closed-cycle engine c002. Additionally, or in the alternative, the presently disclosed hot-side heat exchanger bodies c600 may be provided as a separate component, whether for use in connection with a heater body c100, a closed-cycle engine c002, or any other setting whether related or unrelated to a heater body c100 or a closed-cycle engine c002. At least a portion of the hot-side heat exchanger body c600 may define a hot-side heat exchanger c106. While the heater bodies c100 depicted in the figures may show one hot-side heat exchanger body c600 and/or one hot-side heat exchanger c106, it will be appreciated that a heater body c100 may include a plurality of hot-side heat exchanger bodies c600 and/or a plurality of hot-side heat exchangers c106. For example, a heater body c100 may include one or more hot-side heat exchanger bodies c600, and/or a hot-side heat exchanger body c600 may include one or more hot-side heat exchangers c106.

Figure 18:
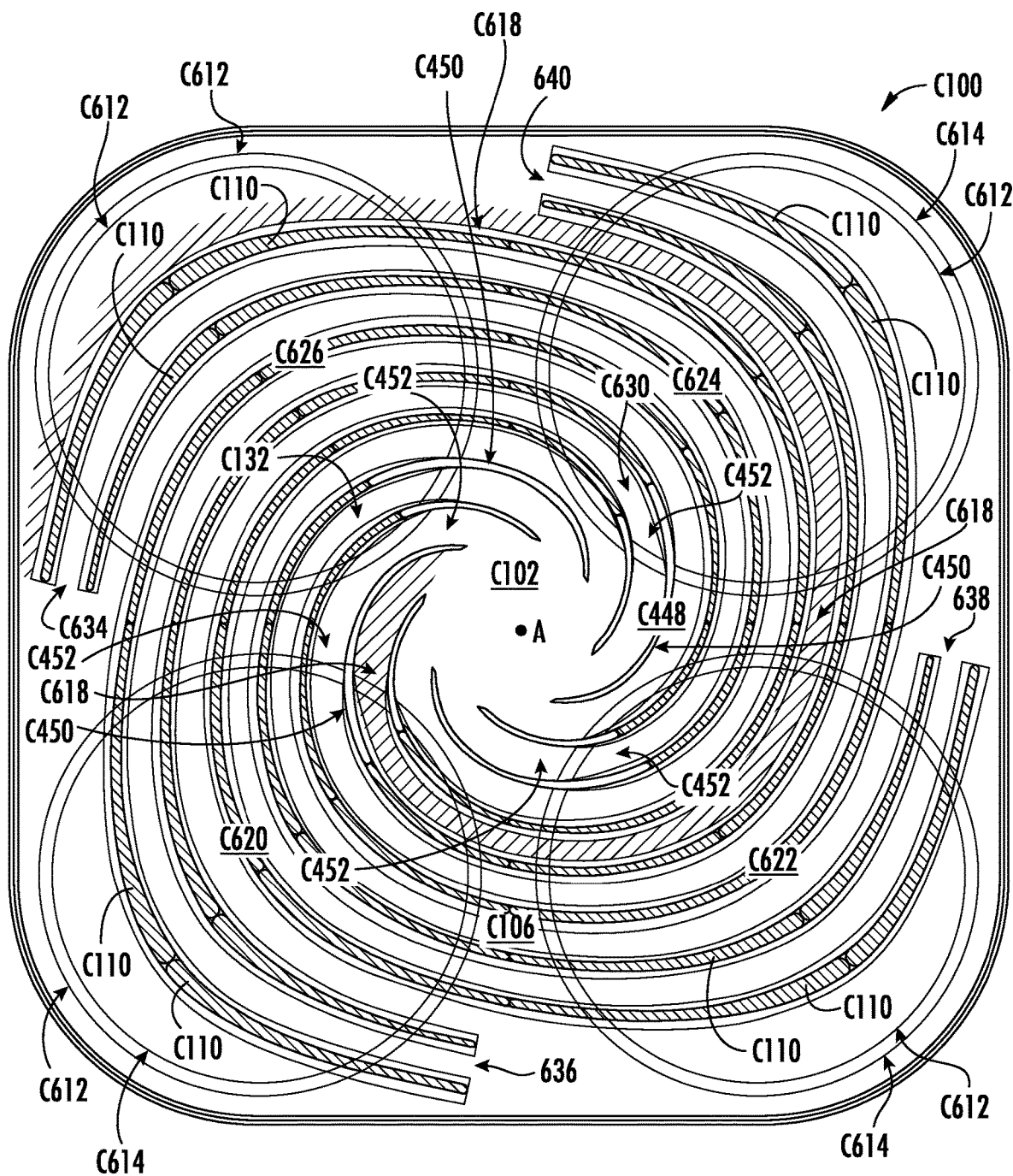
FIG. 18 shows a top cross-sectional view of the exemplary heat exchanger body, with a plurality of heat transfer regions indicated.

As shown, for example, in FIG. 18, the hot-side heat exchanger body c600 and/or a working-fluid body c108 may define a plurality of heat transfer regions c612. The plurality of heat transfer regions c612 may correspond to respective portions of a working-fluid body c108. A respective heat transfer region c612 may encompass a portion of the hot-side heat exchanger body c600 and/or a portion of the working-fluid body c108. Respective ones of the plurality of heat transfer regions c612 have a thermally conductive relationship with a corresponding portion c614 of the plurality of heating fluid pathways c602, such as a semiannular portion c614 of the plurality of heating fluid pathways c602.

Respective ones of the plurality of heat transfer regions c612 may include a heat input region, at least one heat extraction region, and a plurality of working-fluid pathways c110. The heat input region may include a piston body c700 and the heat extraction region may include a regenerator body c800.

In some embodiments, a heat transfer region c612 may include at last a portion of a working-fluid body c108. For example, a heat transfer region c612 may include at least a portion of a piston body c700 and/or at least a portion of a regenerator body c800. Additionally, or in the alternative, a heat transfer region c612 include one or more working-fluid pathways c110 that have a thermally conductive relationship with a corresponding portion c614 (e.g., a semiannular portion) of at least some of the plurality of heating fluid pathways c602. For example, the heat transfer region c612 may include one or more working-fluid pathways c110 defined at least in part within a corresponding one or more heating wall c616 of a hot-side heat exchanger c106. Such working-fluid pathways c110 may define a pathway for an engine-working fluid to flow through the hot-side heat exchanger c106, such as through the one or more heating walls c616 thereof. Where a working-fluid pathway c110 flows through a hot-side heat exchanger c106, the heat transfer region c612 may include a portion of the working-fluid pathway within or defined by the hot-side heat exchanger c106, such as within a region of one or more heating wall c616 of the hot-side heat exchanger c106 corresponding to the heat transfer region c612.

As shown, for example, in FIG. 18, at least some of the working-fluid pathways c110 may be radially or concentrically adjacent to one another. Additionally, or in the alternative, as also shown, at least some of the working-fluid pathways c110 may be semiannular to one another. The working-fluid pathways c110 may fluidly communicate between the heat input region and the at least one heat extraction region. The plurality of heating fluid pathways c602 may be disposed radially or concentrically adjacent to corresponding respective ones of the plurality of working-fluid pathways c110, such as radially or concentrically adjacent to respective ones of a plurality of semiannular working-fluid pathways c110. Respective ones of the plurality of heating fluid pathways c602 may have a thermally conductive relationship with corresponding respective ones of the plurality of working-fluid pathways c110.

In some embodiments, a heat transfer region c622 may include a piston body c700 and/or a regenerator body c800, and/or a plurality of working-fluid pathways c110 fluidly communicating between the piston body c700 and/or the regenerator body c800. When a closed-cycle engine c002 includes a plurality of piston bodies, the piston assemblies may have a staggered or offset stroke cycle, such that a first piston and a second piston may be located at different points in respective stroke cycles upon least one point of the stroke cycle. For example, the first piston may be at a top point of the stroke cycle and the second piston may be at a bottom point of the stroke cycle. As another example, the first piston may be at a midpoint of the stroke cycle and the second piston may be at the top point or the bottom point of the stroke cycle. In some embodiments, engine-working fluid flowing from a piston body c700 (e.g., from a piston chamber c112) to a regenerator body c800 may exhibit a temperature that differs from engine-working fluid flowing in the opposite direction, from the regenerator body c800 to the piston body c700 (e.g., to the piston chamber c112).

The engine-working fluid flowing through the working-fluid pathways c110 may exhibit a temperature that depends at least in part on whether the engine-working fluid is flowing towards the regenerator body c800 (e.g., from the piston body c700) or towards the piston body c700 (e.g., from the regenerator body c800). For example, the temperature of the engine-working fluid may exhibit a first temperature when flowing towards the regenerator body c800 (e.g., from the piston body c700) and a second temperature when flowing towards the piston body c700 (e.g., from the regenerator body c800). In some embodiments the first temperature may be greater than the second temperature.

In some embodiments, the heating fluid such as combustion gas and the engine-working fluid may exhibit a temperature gradient that depends at least in part on whether the engine-working fluid is flowing towards the regenerator body c800 (e.g., from the piston body c700) or towards the piston body c700 (e.g., from the regenerator body c800). For example, a first temperature gradient may correspond to engine-working fluid flowing towards the regenerator body c800 (e.g., from the piston body c700) and a second temperature gradient may correspond to engine-working fluid flowing towards the piston body c700 (e.g., from the regenerator body c800). In some embodiments the first temperature gradient may be smaller than the second temperature gradient. In some embodiments the second temperature gradient may be greater than the first temperature gradient. For example, the first temperature gradient may be smaller than the second temperature gradient at least in part because of the temperature of the engine-working fluid flowing towards the regenerator body c800 (e.g., from the piston body c700) being greater than the temperature of engine-working fluid flowing towards the piston body c700 (e.g., from the regenerator body c800).

In some embodiments, the rate and/or quantity of heat transfer from the heating fluid to the engine-working fluid may depend on whether the engine-working fluid is flowing towards the regenerator body c800 (e.g., from the piston body c700) or towards the piston body c700 (e.g., from the regenerator body c800). For example, a first rate and/or quantity of heat transfer from the heating fluid to the engine-working fluid may correspond to engine-working fluid flowing towards the regenerator body c800 (e.g., from the piston body c700) and a second rate and/or quantity of heat transfer from the heating fluid to the engine-working fluid may correspond to engine-working fluid flowing towards the piston body c700 (e.g., from the regenerator body c800). In some embodiments the first rate and/or quantity of heat transfer may be smaller than the second rate and/or quantity of heat transfer. In other words, the second rate and/or quantity of heat transfer may be greater than the first rate and/or quantity of heat transfer. For example, the first rate and/or quantity of heat transfer may be smaller than the second rate and/or quantity of heat transfer at least in part because of the first temperature gradient corresponding to engine-working fluid flowing towards the regenerator body c800 (e.g., from the piston body c700) being smaller than the second temperature gradient corresponding to engine-working fluid flowing towards the piston body c700 (e.g., from the regenerator body c800).

In some embodiments, the heating efficiency of the heater body c100 may be enhanced at least in part by the second rate and/or quantity of heat transfer corresponding to engine-working fluid flowing towards the piston body c700 (e.g., from the regenerator body c800) being greater than the first rate and/or quantity of heat transfer corresponding to engine-working fluid flowing towards the regenerator body c800 (e.g., from the piston body c700). For example, in this way, a relatively larger proportion of the heat input by the heater body c100 may be applied to the engine-working fluid as the engine-working fluid flows towards the piston body c700 and thereby drives the piston downward, performing the downstroke portion of a stroke cycle. The heat input to the engine-working fluid during the downstroke may contribute to the downstroke (e.g., directly) by further heating and thereby further expanding the engine-working fluid. During the upstroke portion of the stroke cycle, a relatively smaller proportion of the heat input by the heater body c100 may be applied to the engine-working fluid, which may reduce or mitigate a potential for heat input to the engine-working fluid to counteract the upstroke by further heating and thereby expanding the engine-working fluid, providing an additional or alternative efficiency enhancement. With a relatively smaller proportion of the heat input by the heater body c100 applied to the engine-working fluid during the upstroke, a smaller portion of the heat input may be transferred to the regenerator body c800. While the regenerator body c800 may be configured to retain heat, at least some heat transferring to the regenerator body c800 may be lost. By transferring a larger proportion of the heat input of the heater body c100 to the engine-working fluid when flowing towards the piston body c700 (e.g., from the regenerator body c800), less heat energy may be lost to the regenerator body c800, thereby providing yet another additional or alternative efficiency enhancement.

In some embodiments, at least a portion of the heater body c100 (e.g., the hot-side heat exchanger body c600 and/or the working-fluid body c108) may be configured such that the temperature gradient between the temperature gradient between the heating fluid and the engine-working fluid is relatively small when the engine-working fluid is flowing towards the regenerator body c800. For example, the temperature gradient between the heating fluid and the engine-working fluid may be minimal when the engine-working fluid is flowing towards the regenerator body c800. With a relatively small and/or minimal temperature gradient, the rate and/or quantity of heat transfer to the engine-working fluid when flowing towards the regenerator body c800 may be minimal or nominal. Additionally, or in the alternative, at least a portion of the heater body c100 (e.g., the hot-side heat exchanger body c600 and/or the working-fluid body c108) may be configured such that the temperature gradient between the temperature gradient between the heating fluid and the engine-working fluid is relatively large when the engine-working fluid is flowing towards the piston body c700. For example, the temperature gradient between the heating fluid and the engine-working fluid may be maximal when the engine-working fluid is flowing towards the piston body c700. With a relatively large and/or maximal temperature gradient, the rate and/or quantity of heat transfer to the engine-working fluid when flowing towards the regenerator body c800 may be maximized.

In some embodiments, the rate and/or quantity of heat transferred from the heating fluid to the engine-working fluid may exhibit a ratio of heat transfer when flowing towards the piston body c700 to heat transfer when flowing towards the regenerator body c800 of from about 1:1 to about 100:1, such as from about 2:1 to about 100:1, such as from about 2:1 to about 10:1, such as from about 10:1 to about 20:1, such as from about 20:1 to about 50:1, or such as from about 50:1 to about 100:1. The ratio may be at least 1:1, such as at least 2:1, such as at least 10:1, such as at least 20:1, such as at least 50:1, or such as at least 90:1. The ratio may be less than 100:1, such as less than 90:1, such as less than 50:1, such as less than 20:1, such as less than 10:1, or such as less than 2:1.

Figure 19:
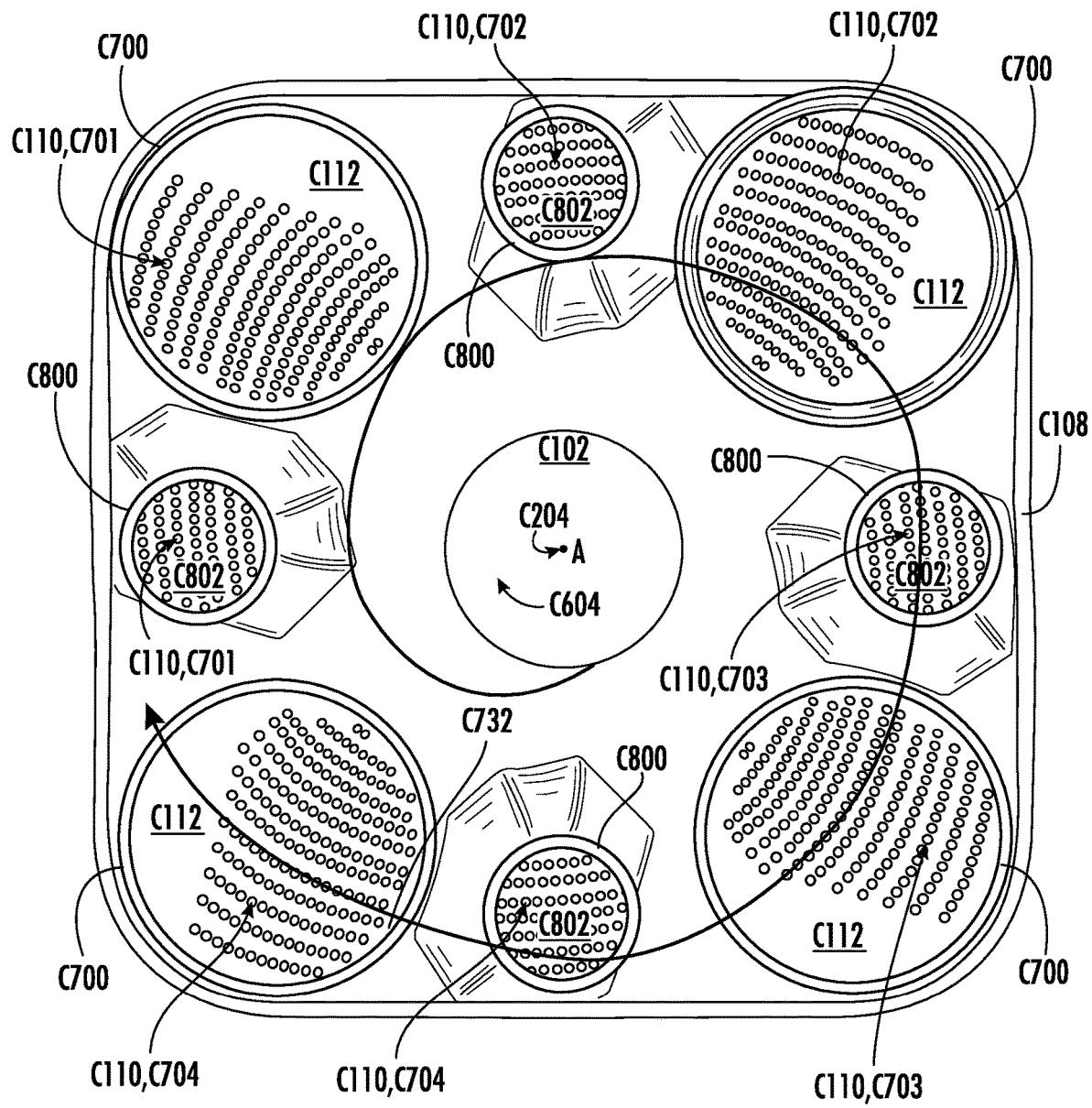
FIG. 19 schematically depicts a bottom cross-sectional view of an exemplary working-fluid body.
Figure 20:
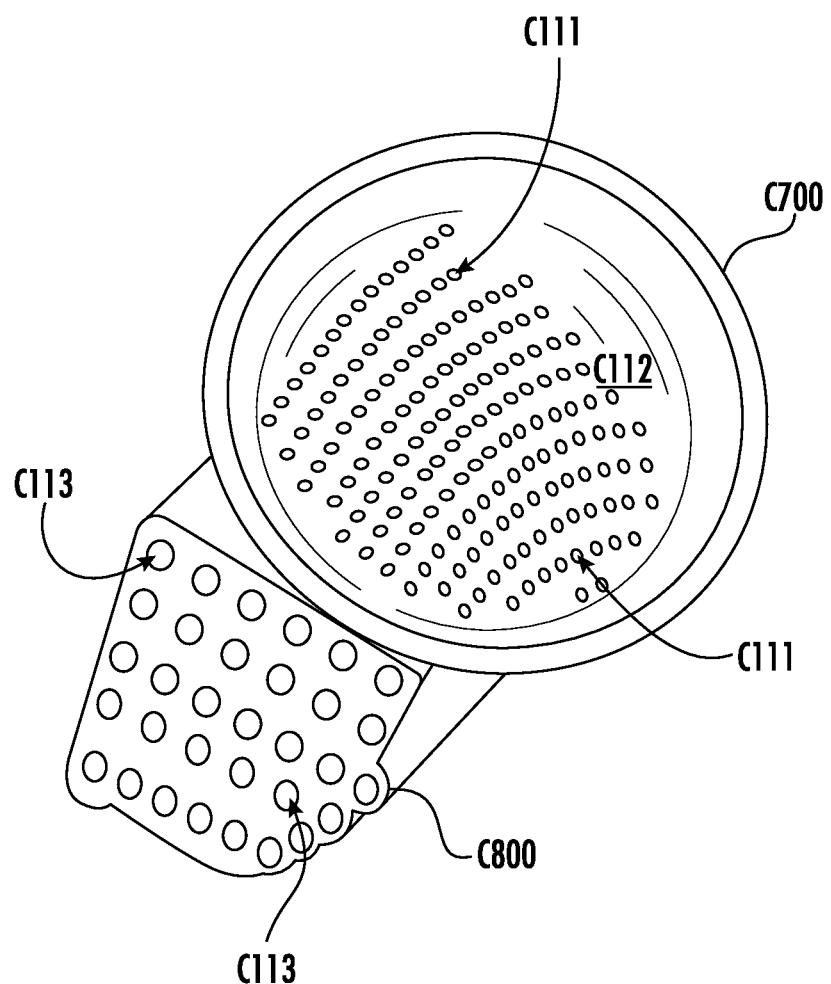
FIG. 20 schematically depicts a bottom perspective view of an exemplary working-fluid body.

Now referring to FIGS. 19 and 20, exemplary working-fluid bodies c108 will be described. The presently disclosed working-fluid bodies c108 may define part of a heater body c100 and/or a closed-cycle engine c002. For example, a working-fluid body c108 may define at least a portion of a monolithic body or a monolithic body-segment. Such monolithic body or monolithic body-segment may define at least a portion of the heater body c100 and/or the closed-cycle engine c002. Additionally, or in the alternative, the presently disclosed working-fluid bodies c108 may be provided as a separate component, whether for use in connection with a heater body c100, a closed-cycle engine c002, or any other setting whether related or unrelated to a heater body c100 or a closed-cycle engine c002. At least a portion of the working-fluid bodies c108 may define a one or more piston bodies c700, one or more regenerator bodies c800, and/or one or more working-fluid pathway c110. It will be appreciated that a heater body c100 may include any desired number of working-fluid bodies c108, including any desired number of piston bodies c700, regenerator bodies c800, and/or working-fluid pathways c110. For example, a heater body c100 may include one or more working-fluid bodies c108, and/or a working-fluid body c108 may include one or more piston bodies c700, regenerator bodies c800, and/or working-fluid pathways c110.

A working-fluid body c108 may define a first portion of a monolithic body and the piston body c700 may defines a second portion of the monolithic body. Alternatively, the piston body c700 may define a monolithic body-segment operably coupled or operably couplable to the working-fluid body c108. Additionally, or in the alternative, a regenerator body c800 may a second portion of the monolithic body, or the regenerator body c800 may define a second monolithic body-segment operably coupled or operably couplable to the piston body 700 and/or the working-fluid body c108.

An exemplary working-fluid body c108 may include a plurality of heat transfer regions c612. Respective ones of the plurality of heat transfer regions may include a plurality of working-fluid pathways c110 fluidly communicating between a heat input region and a heat extraction region. The heat input region may include a piston body c700 and the heat extraction region may include a regenerator body c800.

Now referring to FIG. 19, another exemplary cross-sectional view of a working-fluid body c108 will be described. As shown in FIG. 19, a plurality of piston bodies c700 and a plurality of regenerator bodies c800 may be circumferentially spaced about a longitudinal axis c204 of the working-fluid body c108. The plurality of piston bodies c700 and regenerator bodies c800 may be paired with one another, for example, with a plurality of working-fluid pathways c110 fluidly communication between respective piston body c700 and regenerator body c800 pairs. For example, a first plurality of working-fluid pathways c701 may fluidly communicate between a first piston chamber c112 defined by a first piston body c700 and a first regenerator chamber c802 defined by a first regenerator body c800. A second plurality of working-fluid pathways c702 may fluidly communicate between a second piston chamber c112 defined by a second piston body c700 and a second regenerator chamber c802 defined by a second regenerator body c800. A third plurality of working-fluid pathways c703 may fluidly communicate between a third piston chamber c112 defined by a third piston body c700 and a third regenerator chamber c802 defined by a third regenerator body c800. A fourth plurality of working-fluid pathways c704 may fluidly communicate between a fourth piston chamber c112 defined by a fourth piston body c700 and a fourth regenerator chamber c802 defined by a fourth regenerator body c800.

A flow direction of engine-working fluid flowing through a plurality of working-fluid pathways c110 may be counter-current or co-current relative to a flow direction c732 of heating fluid flowing through the heating fluid pathways c602 adjacent to such working-fluid pathways c110. For example, as shown, engine-working fluid flowing from a piston chamber c112 towards a regenerator chamber c802 may be counter-current to the flow direction c732 of the heating fluid flowing through adjacent heating fluid pathways c602. Engine-working fluid flowing from a regenerator chamber c802 towards a piston chamber c112 may be co-current to the flow direction c732 of the heating fluid flowing through adjacent heating fluid pathways c602. Alternatively, in other embodiments, engine-working fluid may be counter-current to the flow direction c732 of the heating fluid when flowing from a piston chamber c112 towards a regenerator chamber c802 and co-current when flowing from a regenerator chamber c802 towards a piston chamber c112.

In a general sense, heat transfer from a hot fluid to a cold fluid may be greater during counter-current flow relative to co-current flow. For example, with co-current flow, the temperature of the cold fluid may be always less than the temperature of the hot fluid, and as such, heat transfer may be restricted by the discharge temperature of the cold fluid. Conversely, with counter-currently flow, heat transfer is not restricted by the discharge temperature of the cold fluid, which may allow for a greater quantity of heat transfer. On the other hand, with co-current flow, the temperature gradient between a hot fluid and a cold fluid may be greater at an initial zone of heat transfer prior to achieving thermal equilibrium, relative to the temperature gradient at an initial zone of heat transfer with counter-current flow. As such, faster heat transfer may be achieved during non-equilibrium conditions during co-current flow.

In some embodiments, it may be advantageous for heating fluid to flow co-currently relative to engine-working fluid when the engine-working fluid flows from the regenerator body c800 to the piston body c700. For example, the temperature gradient between the engine-working fluid and the heating fluid may be greater when the engine-working fluid flows from the regenerator body c800 towards the piston body c700 relative to engine-working fluid flowing in the opposite direction. Such temperature gradient may be greater, for example, because of heat losses as heat transfers from the engine-working fluid to the regenerator body c800 and back to the engine-working fluid. With a greater temperature gradient existing when engine-working fluid flows from the regenerator body c800 towards the piston body c700, such temperature gradient may facilitate a more rapid heat transfer from the heating fluid to the engine-working fluid. In particular, such temperature gradient may facilitate a more rapid heat transfer to the engine-working fluid as the engine-working fluid flows into the piston body c800, thereby further expanding the engine-working fluid and contributing to the downstroke (e.g., directly) of the piston within the piston chamber. Additionally, or in the alternative, with heating fluid flowing counter-current relative to engine-working fluid flowing from the piston body c700 to the regenerator body c800, the rate of heat transfer from the heating fluid to the engine-working fluid may be less than when the engine-working fluid flows in the opposite direction. As such, relatively less heat transfer may be imparted to the engine-working fluid when flowing into the regenerator body c800 the engine-working fluid flows from the regenerator body c800, further contributing to efficiency of the heater body c100, such as when inputting heat to the closed-cycle engine c002.

Control systems and methods of controlling various systems disclosed herein will now be provided. A control system generates control commands that are provided to one or more controllable devices of the system. The controllable devices execute control actions in accordance with the control commands. Accordingly, the desired output of the system can be achieved.

Figure 21:
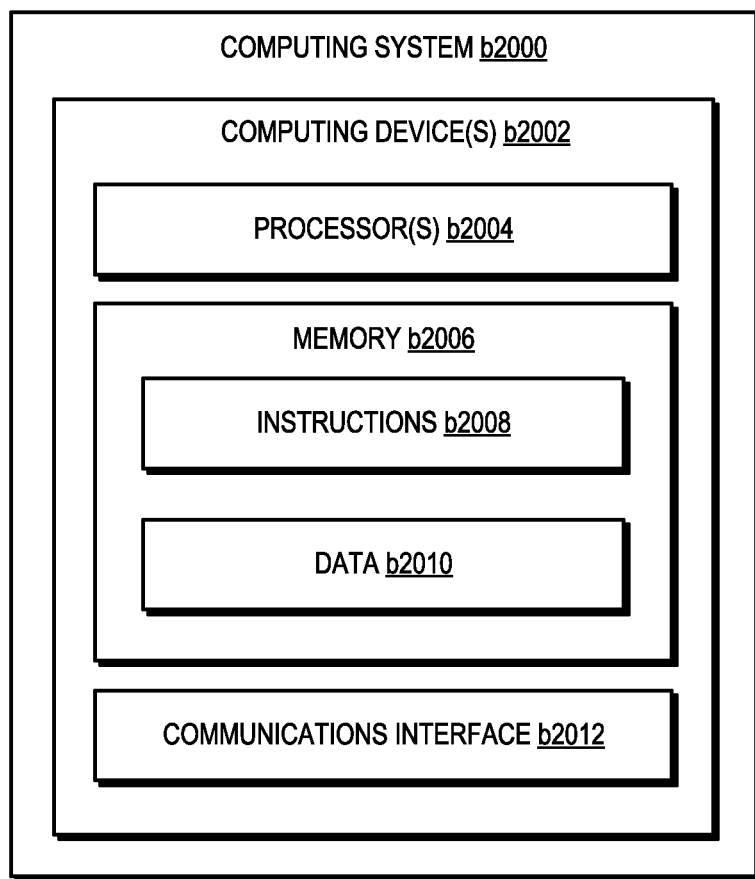
FIG. 21 provides an example computing system in accordance with an example embodiment of the present disclosure.

FIG. 21 provides an example computing system in accordance with an example embodiment of the present disclosure. The one or more controllers, computing devices, or other control devices described herein can include various components and perform various functions of the one or more computing devices of the computing system b2000 described below.

As shown in FIG. 21, the computing system b2000 can include one or more computing device(s) b2002. The computing device(s) b2002 can include one or more processor(s) b2004 and one or more memory device(s) b2006. The one or more processor(s) b2004 can include any suitable processing device, such as a microprocessor, microcontroller, integrated circuit, logic device, and/or other suitable processing device. The one or more memory device(s) b2006 can include one or more computer-readable media, including, but not limited to, non-transitory computer-readable media, RAM, ROM, hard drives, flash drives, and/or other memory devices.

The one or more memory device(s) b2006 can store information accessible by the one or more processor(s) b2004, including computer-readable instructions b2008 that can be executed by the one or more processor(s) b2004. The instructions b2008 can be any set of instructions that when executed by the one or more processor(s) b2004, cause the one or more processor(s) b2004 to perform operations. In some embodiments, the instructions b2008 can be executed by the one or more processor(s) b2004 to cause the one or more processor(s) b2004 to perform operations, such as any of the operations and functions for which the computing system b2000 and/or the computing device(s) b2002 are configured, such as e.g., operations for controlling certain aspects of power generation systems and/or controlling one or more closed cycle engines as described herein. For instance, the methods described herein can be implemented in whole or in part by the computing system b2000. Accordingly, the method can be at least partially a computer-implemented method such that at least some of the steps of the method are performed by one or more computing devices, such as the exemplary computing device(s) b2002 of the computing system b2000. The instructions b2008 can be software written in any suitable programming language or can be implemented in hardware. Additionally, and/or alternatively, the instructions b2008 can be executed in logically and/or virtually separate threads on processor(s) b2004. The memory device(s) b2006 can further store data b2010 that can be accessed by the processor(s) b2004. For example, the data b2010 can include models, databases, etc.

The computing device(s) b2002 can also include a network interface b2012 used to communicate, for example, with the other components of system (e.g., via a network). The network interface b2012 can include any suitable components for interfacing with one or more network(s), including for example, transmitters, receivers, ports, controllers b1510, antennas, and/or other suitable components. One or more controllable devices b1534 and other controllers b1510 can be configured to receive one or more commands or data from the computing device(s) b2002 or provide one or more commands or data to the computing device(s) b2002.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine body, comprising:
a piston body comprising a piston chamber;
a regenerator body comprising a regenerator conduit;
a working-fluid heat exchanger body comprising a plurality of working-fluid pathways fluidly communicating between the piston chamber and the regenerator conduit; and
a heater body having a combustor body defining a combustion chamber, and
wherein the engine body comprises a monolithic body defined at least in part by the piston body, the regenerator body, the working-fluid heat exchanger body, and the heater body, at least a portion of the heater body that defines the monolithic body is arranged so as to circumferentially surround the combustion chamber.

2. The engine body of claim 1,
wherein the heater body has a plurality of heating fluid pathways having a heat transfer relationship with the plurality of working-fluid pathways.

3. The engine body of claim 2, wherein the plurality of heating fluid pathways fluidly communicate with the combustion chamber.

4. The engine body of claim 1, wherein the working-fluid heat exchanger body comprises a plurality of heating fluid pathways having a heat transfer relationship with the plurality of working-fluid pathways.

5. The engine body of claim 1, wherein the piston body comprises a plurality of piston chamber apertures fluidly communicating with the piston chamber, wherein the regenerator body comprises a plurality of regenerator apertures fluidly communicating with the regenerator conduit, and wherein the plurality of working-fluid pathways respectively fluidly communicate between respective ones of the plurality of piston chamber apertures and respective ones of the plurality of regenerator apertures.

6. The engine assembly of claim 1, wherein the heater body includes a heating chamber body that defines at least a portion of a recirculation pathway surrounding at least a portion of the working-fluid heat exchanger body.

7. The engine assembly of claim 1, wherein the heater body includes a recirculation annulus body that provides fluid communication between the plurality of heating fluid pathways and the combustor body.

8. The engine assembly of claim 1, wherein the combustion chamber has a length, and wherein the combustion chamber has a same diameter along the length.

9. An engine body, comprising:
a piston body comprising a piston chamber;
a regenerator body comprising a regenerator conduit; and
a heater body comprising a plurality of heating fluid pathways and a plurality of working-fluid pathways, the plurality of heating fluid pathways having a heat transfer relationship with the plurality of working-fluid pathways, the plurality of working-fluid pathways fluidly communicating between the piston chamber and the regenerator conduit, the heater body also having a combustor body defining a combustion chamber;
wherein the engine body comprises a monolithic body defined at least in part by the piston body, the regenerator body, and the heater body, and wherein at least a portion of the heater body that defines the monolithic body is arranged so as to circumferentially surround the combustion chamber.

10. The engine body of claim 9, wherein the combustor body defines a portion of the monolithic body.

11. The engine body of claim 9, wherein the plurality of heating fluid pathways fluidly communicate with the combustion chamber.

12. The engine body of claim 9, wherein the piston body comprises a plurality of piston chamber apertures fluidly communicating with the piston chamber, wherein the regenerator body comprises a plurality of regenerator apertures fluidly communicating with the regenerator conduit, and wherein the plurality of working-fluid pathways respectively fluidly communicate between respective ones of the plurality of piston chamber apertures and respective ones of the plurality of regenerator apertures.

13. An engine assembly, comprising:
a plurality of engine bodies, wherein respective ones of the plurality of engine bodies respectively define a first monolithic body, the first monolithic body comprising:
a piston body comprising a piston chamber,
a regenerator body comprising a regenerator conduit, and
a working-fluid heat exchanger body comprising a plurality of working-fluid pathways fluidly communicating between the piston chamber and the regenerator conduit; and
a heater body defining a second monolithic body comprising a plurality of heating fluid pathways, the heater body includes a combustor body having a combustion chamber body and a conditioning conduit body, the combustor body defines a combustion chamber and the conditioning conduit body circumferentially surrounds the combustion chamber, a conditioning conduit is defined between the combustor body and the conditioning conduit body, the conditioning conduit fluidly communicates with the combustion chamber at a distal portion of the combustion chamber;
wherein the plurality of engine bodies are coupled to the heater body, and wherein the plurality of heating fluid pathways have a heat transfer relationship with at least some of the plurality of working fluid pathways.

14. The engine assembly of claim 13, wherein the combustor body defines at least a portion of the second monolithic body.

15. The engine assembly of claim 13, wherein the plurality of heating fluid pathways fluidly communicate with the combustion chamber.

16. The engine assembly of claim 13, wherein the heater body has a maximum diameter and the first monolithic body has a maximum diameter that is larger than the maximum diameter of the heater body.

17. The engine assembly of claim 13, wherein the combustor body is centrally positioned between at least four piston bodies of respective ones of the plurality of engine bodies when viewed along a lateral direction.

18. The engine assembly of claim 13, further comprising:
a third monolithic body coupled with the first monolithic body, the third monolithic body having a first machine body that defines at least a portion of a generator housing that is configured to receive at least a portion of a load device.

19. The engine assembly of claim 18, further comprising:
a plurality of second engine bodies, wherein respective ones of the plurality of second engine bodies respectively define a fourth monolithic body, the fourth monolithic body comprising:
a piston body comprising a piston chamber,
a regenerator body comprising a regenerator conduit, and
a working-fluid heat exchanger body comprising a plurality of working-fluid pathways fluidly communicating between the piston chamber of the fourth monolithic body and the regenerator conduit of the fourth monolithic body, and
wherein the fourth monolithic body is coupled with the third monolithic body.

20. The engine assembly of claim 19, further comprising:
a second heater body defining a fifth monolithic body that is coupled with the fourth monolithic body.

* * * * *